US008428275B2

(12) United States Patent
Yoshida et al.

(10) Patent No.: US 8,428,275 B2
(45) Date of Patent: Apr. 23, 2013

(54) WIND NOISE REDUCTION DEVICE

(75) Inventors: Masahiro Yoshida, Minamikawachi-gun (JP); Tomoki Oku, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 1105 days.

(21) Appl. No.: 12/142,243

(22) Filed: Jun. 19, 2008

(65) Prior Publication Data

US 2008/0317261 A1 Dec. 25, 2008

(30) Foreign Application Priority Data

Jun. 22, 2007 (JP) ................................ 2007-164745
Aug. 1, 2007 (JP) ................................ 2007-200432
Dec. 26, 2007 (JP) ................................ 2007-334121

(51) Int. Cl.
*H04B 15/00* (2006.01)

(52) U.S. Cl.
USPC ........................................................ 381/94.1

(58) Field of Classification Search .................. 381/94.1
See application file for complete search history.

(56) References Cited

U.S. PATENT DOCUMENTS 4,380,004 A * 4/1983 Coats et al. .................. 340/902
4,956,867 A * 9/1990 Zurek et al. .................. 381/94.7
5,337,367 A * 8/1994 Maeda ......................... 381/94.7
2005/0213778 A1 9/2005 Buck et al.
2005/0238183 A1 10/2005 Ozawa
2007/0058822 A1 3/2007 Ozawa

FOREIGN PATENT DOCUMENTS

JP 05-328480 12/1993
JP 06-253386 A 9/1994
JP 11-24697 A 1/1999
JP 11-069480 3/1999
JP 2001-124621 A 5/2001

(Continued)

OTHER PUBLICATIONS

Japanese Office Action mailed Apr. 17, 2012 for corresponding application No. JP-2007-334121.

(Continued)

*Primary Examiner* — Howard Weiss
(74) *Attorney, Agent, or Firm* — NDQ&M Watchstone LLP

(57) ABSTRACT

In a wind noise reduction device that reduces wind noise contained in an input sound signal to generate a corrected sound signal, when a predetermined band including the band of the wind noise is a first band and a predetermined band higher in frequency than the first band is a second band, the wind noise reduction device includes: a first corrector that has a signal generator generating, based on a sound signal (i) contained in the input sound signal and lying in a band higher in frequency than the first band, a sound signal (ii) lying in the first band and different from a sound signal (iii) contained in the input sound signal and lying in the first band, and that generates a first corrected sound signal based on the sound signal (ii) generated by the signal generator; a second corrector that reduces the signal level of a sound signal (iv) contained in the input sound signal and lying in the second band to thereby generate a second corrected sound signal as a sound signal (v) having the wind noise reduced and lying in the second band; and a corrected sound signal outputter that outputs the corrected sound signal based on the first and second corrected sound signals.

19 Claims, 19 Drawing Sheets

FOREIGN PATENT DOCUMENTS

| | | | |
|---|---|---|---|
| JP | 2004-80464 | A | 3/2004 |
| JP | 2004-289762 | A | 10/2004 |
| JP | 2005-269649 | | 9/2005 |
| JP | 2007-81560 | A | 3/2007 |

OTHER PUBLICATIONS

English Abstract for JP 2001-124621 A, published May 11, 2001.

English Abstract for JP 06-253386 A, published Sep. 9, 1994.

Japan Patent Office, Notification of Reasons for Refusal in Japanese Patent Application No. 2007-164745 mailed Feb. 21, 2012.

Japanese Office Action issued Jan. 22, 2013 in corresponding Japanese application No. 2007-164745.

English Abstract for JP 11-24697 A, published Jan. 29, 1999.

* cited by examiner

WIND NOISE REDUCTION DEVICE

This nonprovisional application claims priority under 35 U.S.C. §119(a) on Patent Application No. 2007-164745 filed in Japan on Jun. 22, 2007, Patent Application No. 2007-200432 filed in Japan on Aug. 1, 2007, and Patent Application No. 2007-334121 filed in Japan on Dec. 26, 2007, the entire contents of all of which are hereby incorporated by reference.

BACKGROUND OF THE INVENTION

1. Field of the Invention

The present invention relates to wind noise reduction devices and wind noise reduction methods for reducing wind noise contained in an input sound signal, and also relates to sound-recording apparatuses, image-sensing apparatuses, and electronic appliances employing such wind noise reduction devices.

2. Description of Related Art

In a sound-recording apparatus equipped with a microphone, when the microphone is exposed to wind, the sound signal is corrupted with wind noise. The wind noise results from the pressure of wind striking the diaphragm of the microphone. Not intrinsic in the sound signal, the wind noise should ideally be eliminated.

To prevent wind noise in outdoor sound recording, it is common to fit the sound-collecting device, such as a microphone, with a wind-shielding device, such as one called "Germer", or to cover the sound-collecting device with urethane. Inconveniently, however, in compact electronic appliances, such as compact video cameras, furnished with sound-recording capability, seeking the compactness of the appliances themselves makes it difficult to fit their integrated microphone with a mechanical wind-shielding device. These appliances thus incorporate, instead of a mechanical wind-shielding device, a wind noise reduction device.

Wind noise lies in a relatively low frequency band, typically concentrating in a band of about 300 Hz and below. This characteristic is exploited by the conventional wind noise reduction device, which reduces wind noise in, mainly, a low-band signal. The typically used method is to split, by use of a high-pass filter (HPF) and a low-pass filter (LPF), the input sound signal into low-band components and higher-band components, then reduce (or eliminate) the low-band signal, and then add the low-band and higher-band components together again.

Some conventionally proposed wind noise reduction devices are additionally provided with a function for checking the presence of wind noise. The check for the presence of wind noise typically exploits the characteristic of wind noise that "wind noise does not exhibit cross-correlation between the left- and right-channel signals composing an input sound signal". Specifically, the cross-correlation between the left- and right-channel signals composing an input sound signal is found and, if the correlation value that indicates the cross-correlation is equal to or smaller than a given threshold value, it is judged that the input sound signal contains wind noise. The correlation value thus found is used not only to check the presence of wind noise but also as an index representing the intensity of the wind noise. For example, there have also been proposed methods that vary, according to the correlation value, the degree to which the low-band signal is reduced.

The low band includes the frequency band of wind noise, and is much affected by wind noise; in addition it also includes the essential elements of sound. In particular, the pitch of the human voice (more precisely the fundamental frequency of that pitch) ranges from about 90 to 160 Hz in males and from about 230 to 370 Hz in females, and thus the essential elements of the human voice, determining its timbre (quality), lie in the low band. The pitch here denotes the fundamental frequency and harmonic components of a signal resulting from the vibration of the vocal cord. If the components in this band including those essential elements are simply reduced or eliminated, even the elements of signal components other than those of wind noise are reduced or eliminated, leading to distorted sound—in the case of the human voice, its volume diminishes and its timbre changes.

Moreover, if wind noise reduction is applied only in the low band and not in the other band, wind noise of relatively high frequencies remains (heard as a sound like something rolling), causing the user to hear unnatural sound.

The configuration of another conventional wind noise reduction device is shown in FIG. 22. The wind noise reduction device of FIG. 22 has largely the same configuration as that of FIG. 11. The wind noise reduction device of FIG. 22 too exploits the characteristics of wind noise that it concentrates in a low band and that it does not exhibit cross-correlation between the left- and right-channel signals. The sound signals from a microphone that collects sound from the left and right sides independently (hereinafter "stereo microphone") are fed to the wind noise reduction device of FIG. 22. The sound signals representing the sound collected by the stereo microphone from the left and right sides are called the L and R signals respectively.

The wind noise reduction device shown in FIG. 22 comprises: a correlation-value calculator 201 that calculates the correlation value between the L and R signals output from the stereo microphone; low-pass filters (LPFs) 202L and 202R that pass the low-band components of the L and R signals respectively; high-pass filters (HPFs) 203L and 203R that pass the high-band components of the L and R signals respectively; attenuation circuits (reduction circuits) 204L and 204R that attenuate (reduce) the low-band components that have passed through the LPFs 202L and 202R respectively; and addition circuit 205L and 205R that add the low-band components from the attenuation circuits 204L and 204R to the high-band components that have passed through the HPFs 203L and 203R respectively.

In the wind noise reduction device configured as described above, the correlation-value calculator 201 calculates the correlation value between the L and R signals, and thereby sets the amount of signal attenuation effected by the attenuation circuits 204L and 204R. Specifically, when the correlation value calculated by the correlation-value calculator 201 is smaller than a predetermined threshold value, it is judged that the signals contain wind noise, and the amount of attenuation effected by the attenuation circuits 204L and 204R is increased. By contrast, when the correlation value calculated by the correlation-value calculator 201 is larger than a predetermined threshold value, it is judged that the signals do not contain wind noise. In this case the attenuation circuits 204L and 204R do not effect signal attenuation (reduction); thus the low-band components that have passed through the LPFs 202L and 202R are, intact, fed to the addition circuit 205L and 205R.

The LPFs 202L and 202R have such a filter characteristic as to pass low-band components down to several kHz, and the HPFs 203L and 203R have such a filter characteristic as to pass high-band components that cannot pass through the LPFs 202L and 202R. Thus the low-band components that pass through the LPFs 202L and 202R contain almost all wind noise components that can be contained in the sound signals. The attenuation circuits 204L and 204R attenuate (reduce) these low-band components, and thus the L and R signals output from the addition circuit 205L and 205R contain almost no wind noise components.

In the conventional wind noise reduction device as exemplified by that of FIG. 22, the cut-off frequencies of the LPFs and HPFs are fixed, and thus wind noise is reduced only in the frequency band in which the LPF pass. In reality, however, a strong wind may produce wind noise in a band beyond the cut-off frequency of the LPFs, in which case the conventional wind noise reduction device cannot satisfactorily reduce the wind noise. For example, when sound signals containing wind noise in a band ranging from DC (direct current) to a frequency Fx as shown in FIG. 23A are fed to the conventional wind noise reduction device, if the cut-off frequency of the LPFs equals fc lower than the frequency Fx, then, as shown in FIG. 23B, the wind noise in the band between the frequencies fc and Fx is not reduced. As a result, wind noise of relatively high frequencies remains (heard as a sound like something rolling).

There has also been proposed a technology that employs a wind pressure sensor disposed beside a microphone to set, according to the wind pressure signal output from the wind pressure sensor, the cut-off frequency below which to cut off low-band components. Inconveniently, however, the additional provision of the wind pressure sensor hampers miniaturization of apparatuses.

SUMMARY OF THE INVENTION

According to a first configuration of the present invention, in a wind noise reduction device that reduces wind noise contained in an input sound signal to generate a corrected sound signal, when a predetermined band including the band of the wind noise is a first band and a predetermined band higher in frequency than the first band is a second band, the wind noise reduction device comprises: a first corrector that has a signal generator generating, based on a sound signal (i) contained in the input sound signal and lying in a band higher in frequency than the first band, a sound signal (ii) lying in the first band and different from a sound signal (iii) contained in the input sound signal and lying in the first band, and that generates a first corrected sound signal based on the sound signal (ii) generated by the signal generator; a second corrector that reduces the signal level of a sound signal (iv) contained in the input sound signal and lying in the second band to thereby generate a second corrected sound signal as a sound signal (v) having the wind noise reduced and lying in the second band; and a corrected sound signal outputter that outputs the corrected sound signal based on the first and second corrected sound signals.

Specifically, for example, the first corrector generates the first corrected sound signal based on the sound signal (iii) contained in the input sound signal and lying in the first band, and the sound signal (ii) generated by the signal generator.

More specifically, for example, the input sound signal is composed of a plurality of channel signals. The wind noise reduction device further comprises: a wind noise checker that checks the degree of effect of the wind noise on the input sound signal based on the cross-correlation, between different channels, among components of the channel signals in a predetermined band including the band of the wind noise. Moreover, the first corrector generates the first corrected sound signal based on the result of the checking by the wind noise checker.

For example, the input sound signal is composed of a plurality of channel signals. The wind noise reduction device further comprises: a wind noise checker that checks the degree of effect of the wind noise on the input sound signal based on the cross-correlation, between different channels, among components of the channel signals in a predetermined band including the band of the wind noise. Moreover, the second corrector generates the second corrected sound signal based on the result of the checking by the wind noise checker.

Alternatively, for example, the input sound signal is fed as a signal on the frequency axis to the wind noise reduction device, and is composed of a plurality of channel signals. Moreover, the second corrector divides the second band of the input sound signal into a plurality of sub-bands to generate the second corrected sound signal on the frequency axis by reducing the signal levels of sound signals (vi) in the sub-bands, and finds, for each of the sub-bands, the cross-correlation, between different channel signals, among the sound signals (vi) in the sub-bands to determine, for each of the sub-bands, the degree of reduction of the signal levels based on the cross-correlation.

For example, the input sound signal is fed as a signal on the time axis to the wind noise reduction device, and is composed of a plurality of channel signals. The first corrected sound signal generated by the first corrector is a signal on the time axis. The wind noise reduction device further comprises: an extractor that extracts, from the input sound signal, components in a predetermined band not including the first band but including the second band; and a time-to-frequency converter that converts, from the time axis to the frequency axis, the signal format of the composite signal of the first corrected sound signal and the signal extracted by the extractor. The second corrector generates the second corrected sound signal on the frequency axis by reducing the signal level of a sound signal in the second band in the composite signal on the frequency axis. Moreover, the corrected sound signal outputter outputs the corrected sound signal on the frequency axis based on: the second corrected sound signal on the frequency axis obtained from the second corrector; and a sound signal containing the first corrected sound signal on the frequency axis obtained from the time-to-frequency converter.

For example, the second corrector divides the second band of the composite signal on the frequency axis into a plurality of sub-bands to generate the second corrected sound signal on the frequency axis by reducing the signal levels of sound signals (vi) in the sub-bands, and finds, for each of the sub-bands, the cross-correlation, between different channel signals, among the sound signals (vi) in the sub-bands to determine, for each of the sub-bands, the degree of reduction of the signal levels based on the cross-correlation.

For example, the input sound signal is composed of a plurality of channel signals. Moreover, the second corrector takes as a band of interest the entire second band or part thereof, averages sound signals in the band of interest contained in the input sound signal corresponding to the plurality of channel signals to thereby reduce the signal level of a sound signal in the band of interest in a channel being affected relatively much by the wind noise, and generates the second corrected sound signal from the signal resulting from the averaging.

For example, the input sound signal is composed of a plurality of channel signals. Moreover, the second corrector takes as a band of interest the entire second band or part thereof, identifies, of sound signals in the band of interest contained in the input sound signal corresponding to the plurality of channel signals, a sound signal having the lowest signal level as a minimum sound signal and another signal as a non-minimum sound signal, replaces the non-minimum sound signal with the minimum sound signal to thereby reduce the signal level of a sound signal in the band of interest in a channel being affected relatively much by the wind noise, and generates the second corrected sound signal from the signal resulting from the replacement.

According to the present invention, a sound-recording apparatus comprises: the wind noise reduction device described above; and a microphone for generating the input sound signal to the wind noise reduction device.

According to the present invention, an image-sensing apparatus comprises: the wind noise reduction device described above; a microphone for generating the input sound signal to the wind noise reduction device; and an image-sensing section for acquiring an image.

According to the present invention, in a wind noise reduction method for reducing wind noise contained in an input sound signal to generate a corrected sound signal, when a predetermined band including the band of the wind noise is a first band and a predetermined band higher in frequency than the first band is a second band, the wind noise reduction method comprises: a signal generation step of generating, based on a sound signal (i) contained in the input sound signal and lying in a band higher in frequency than the first band, a sound signal (ii) lying in the first band and different from a sound signal (iii) contained in the input sound signal and lying in the first band; a first correction step of generating a first corrected sound signal based on the sound signal (ii) generated in the signal generation step; and a second correction step of reducing the signal level of a sound signal (iv) contained in the input sound signal and lying in the second band to thereby generate a second corrected sound signal as a sound signal (v) having the wind noise reduced and lying in the second band. Moreover, the corrected sound signal is generated based on the first and second corrected sound signals.

According to a second configuration of the present invention, in a wind noise reduction device that receives an input sound signal composed of a plurality of channel signals acquired by a plurality of microphones and that reduces wind noise contained in the input sound signal, the wind noise reduction device comprises: a wind noise checker that divides a predetermined band included in the entire frequency band of the input sound signal into n sub-bands (where n is an integer of 2 or more), and that calculates, for each sub-band, a correlation value indicating the cross-correlation between the plurality of channel signals to thereby check, for each sub band, the presence of wind noise; and a signal attenuator that attenuates, of the input sound signal, only a sound signal in a sub-band where wind noise is judged to be present by the wind noise checker. Here, for each sub-band, the correlation value is so calculated as to be smaller the lower the cross-correlation between the plurality of channel signals. Moreover, the wind noise checker has a threshold value set for each sub-band, compares, for each sub-band, the correlation value with the threshold value, and, when the correlation value is smaller than the threshold value in a sub-band of interest, judges that wind noise is present in the sub-band of interest.

Specifically, for example, in the wind noise reduction device of the second configuration, the degree of attenuation by the signal attenuator for each sub-band is determined by an attenuation control value set for each sub-band. Moreover, for each sub-band, the attenuation control value varies according to the correlation value.

The attenuation control value for each sub-band may be set based on a psychological model of the human hearing. In that case, the attenuation control value for each sub-band may be set based on a loudness curve that represents the relationship between the sound pressure level of sounds of different frequencies and their magnitude as perceived by humans. The attenuation control value may be varied according to the correlation value, or may be given a fixed value.

Specifically, for example, in the wind noise reduction device of the second configuration, the degree of attenuation by the signal attenuator for each sub-band is determined by an attenuation control value set for each sub-band. Moreover, for each sub-band, the signal attenuator attenuates an attenuation target sound signal through exponential calculation using the corresponding attenuation control value as an exponent of exponential calculation.

Alternatively, specifically, for example, the degree of attenuation by the signal attenuator for each sub-band is determined by an attenuation control value set for each sub-band. Moreover, for each sub-band, the signal attenuator attenuates an attenuation target sound signal through multiplication using the corresponding attenuation control value as a factor of multiplication.

For example, in the wind noise reduction device of the second configuration, the lower the frequency of a sub-band, the larger the corresponding threshold value is set and, the higher the frequency of a sub-band, the smaller the corresponding threshold value is set.

For example, in the wind noise reduction device of the second configuration, the input sound signal is divided in the time direction every predetermined length of time into frames serving as unit intervals, and the presence of wind noise is checked for each frame. Moreover, for each sub-band, the wind noise checker varies the corresponding threshold value in a frame of interest based on the result of checking of the presence of wind noise in a frame preceding the frame of interest.

For example, in the wind noise reduction device of the second configuration, the n sub-bands include a first sub-band and a second sub-band different from each other, and frequencies belonging to the second sub-band are higher than frequencies belonging to the first sub-band. Moreover, the wind noise checker varies the threshold value for the second sub-band based on the result of checking of presence of wind noise for the first sub-band.

According to the present invention, in an electronic appliance that receives an input sound signal composed of a plurality of channel signals acquired by a plurality of microphones and that records or reproduces a sound signal based on the input sound signal, the electronic appliance comprises: a wind noise reduction device that divides a predetermined band included in the entire frequency band of the input sound signal as expressed on the frequency axis into n sub-bands (where n is an integer of 2 or more), and that performs wind noise reduction processing for each sub-band. Here, used as the wind noise reduction device is the wind noise reduction device of the second configuration.

In a case where the electronic appliance is an apparatus for recording a sound signal, a portion that generates an input sound signal expressed on the frequency axis may include a filter bank. This filter bank is involved in the compression/encoding of the sound signal.

In a case where the electronic appliance is an apparatus for reproducing a sound signal, a portion that generates an input sound signal expressed on the frequency axis may include a demodulation circuit. When the sound signal expressed by a compressed/encoded signal is reproduced, this demodulation circuit decodes the compressed/encoded signal.

The significance and benefits of the invention will be clear from the following description of its embodiments. It should however be understood that these embodiments are merely examples of how the invention is implemented, and that the meanings of the terms used to describe the invention and its features are not limited to the specific ones in which they are used in the description of the embodiments.

DETAILED DESCRIPTION OF PREFERRED EMBODIMENTS

Hereinafter, embodiments of the present invention will be described specifically with reference to the accompanying drawings. Among different drawings, the same parts are identified by common reference signs and, in principle, no overlapping description of the same parts will be repeated.

Embodiment 1

A first embodiment of the invention will be described below. Described first are the features common to, or referred to in the course of the description of, Examples 1 to 5 presented later in connection with the first embodiment.

Figure 1:
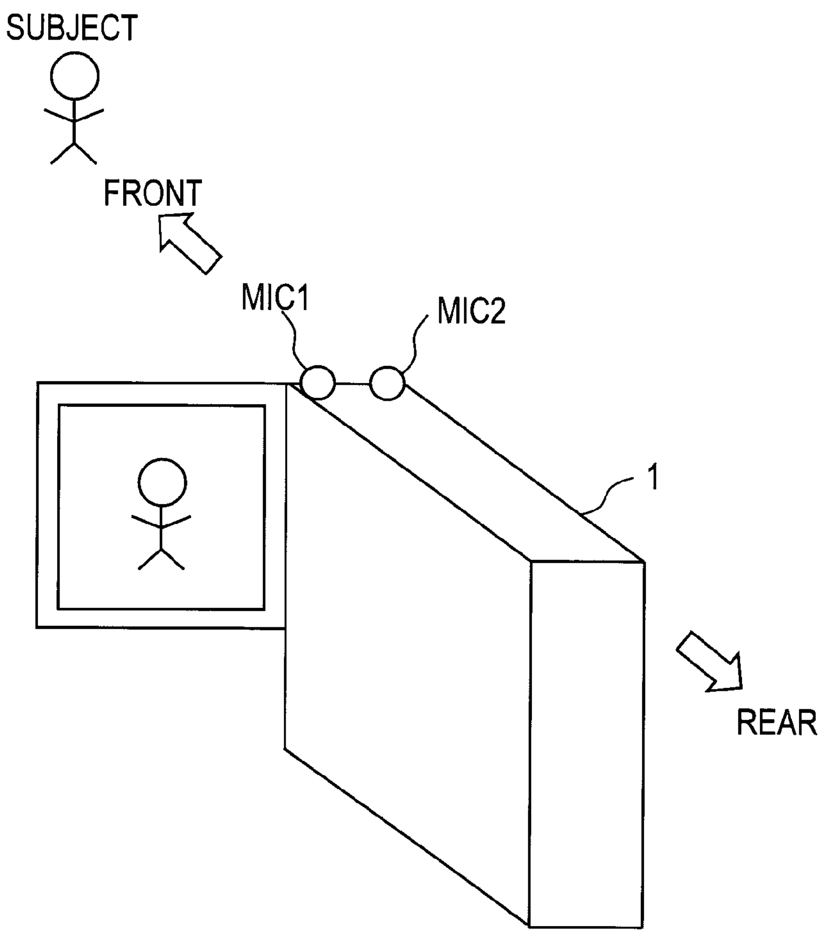
FIG. 1 is a perspective exterior view of an image-sensing apparatus according to a first embodiment (Embodiment 1) of the invention.

FIG. 1 is a perspective exterior view of an image-sensing apparatus 1 according to the first embodiment of the invention. The image-sensing apparatus 1 is a digital video camera capable of recording sound as well. The image-sensing apparatus 1 is provided with a microphone MIC1 in a left part of its main casing, and with a microphone MIC2 in a right part of its main casing. The microphone MIC1 collects sound coming from the left side of the image-sensing apparatus 1, and the microphone MIC2 collects sound coming from the right side of the image-sensing apparatus 1; thus together the microphones MIC1 and MIC2 constitute a stereo (stereophonic, or binaural) microphone. As an arrangement of the microphones MIC1 and MIC2 different from that shown in FIG. 1, they may be arranged, for example, close together on the back side of a plate-shaped sub-casing into which a display unit is fitted (i.e. on the side of the sub-casing opposite from the display unit).

Figure 2:
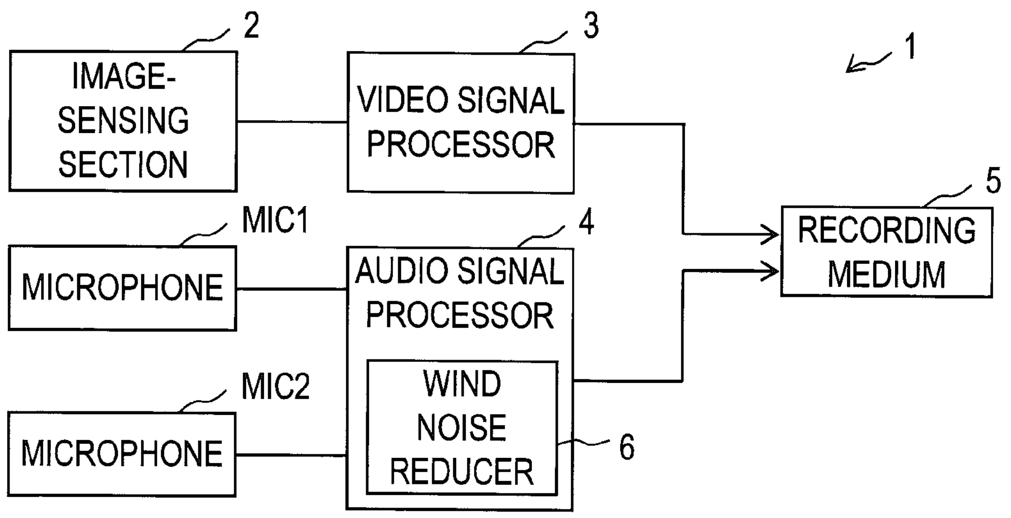
FIG. 2 is a schematic block diagram showing the electrical configuration of the image-sensing apparatus of FIG. 1.

FIG. 2 is a schematic block diagram showing the electrical configuration of the image-sensing apparatus 1. The image-sensing apparatus 1 comprises, in addition to the microphones MIC1 and MIC2, an image-sensing section 2, a video signal processor 3, an audio signal processor 4, and a recording medium 5. Though not illustrated, the image-sensing apparatus 1 further comprises an operated section—including a shutter-release button, a record button, etc.—, a display unit, a speaker, a CPU (central processing unit), etc.

The image-sensing section 2 includes an optical system and a solid-state image sensor such as a CCD (charge-coupled device) or CMOS (complementary metal oxide semiconductor) image sensor. The image-sensing section 2 converts the optical image incoming through the optical system into an electrical signal, and thereby captures the image represented by the electrical signal. Based on the electrical signal, the video signal processor 3 generates a video signal representing the image captured by the image-sensing section 2. According to the operations made on the operated section (unillustrated) provided in the image-sensing apparatus 1, the video signal is recorded to the recording medium 5, such as a memory card or an optical disc.

The microphones MIC1 and MIC2 each convert the sound they have collected into an analog electrical signal and output it. The output signals from the microphones MIC1 and MIC2 are converted into digital signals by an A/D converter (unillustrated) provided in the audio signal processor 4, and the audio signal processor 4 then performs the desired processing on those digital signals. The signals so processed are then, according to the operations made on the operated section (unillustrated) provided in the image-sensing apparatus 1, recorded to the recording medium 5.

The microphones MIC1 and MIC2 each have a diaphragm (unillustrated) as a vibrating member. Each diaphragm is made to vibrate by the vibration of air that constitutes a sound wave, and also by the pressure of wind that acts on it. Thus, while a sound wave and a wind pressure are acting on the diaphragm, it vibrates according to the sound wave and the wind pressure. The microphones MIC1 and MIC2 each convert the vibration of their diagrams into an electrical signal and output it. Of the output signals from the microphones, the noise resulting from a wind pressure is called wind noise. Wind noise is different from noise that reaches the diaphragm as a sound wave.

The audio signal processor 4 comprises a wind noise reducer 6. The wind noise reducer 6 receives an input signal based on the output signals from the microphones, reduces the wind noise contained in the input signal, and then outputs, as an output signal, a sound signal with reduced wind noise.

Wind noise lies in a relatively low frequency band, typically concentrating in a band of about 300 Hz and below. Accordingly, in the wind noise reducer 6 according to the first embodiment, a border is set at 300 Hz, and the frequency band lower than 300 Hz is dealt with as the "low band", in which the processing for reducing wind noise is performed. Though with relatively low intensity, wind noise also occurs in a frequency band of 300 Hz and above, close to the low band. Accordingly, in the wind noise reducer 6, the frequency band of 300 Hz and above is further divided into a medium band and a high band, and, also in the medium band, the processing for reducing wind noise is performed. Specifically, here, as an example, the frequency band equal or higher than 300 Hz but lower than 1.5 kHz is dealt with as the "medium" band, and the frequency band equal or higher than 1.5 kHz is dealt with as the "high" band.

The low band includes the frequency band of wind noise, and is much affected by wind noise; in addition it also includes the essential elements of sound. In particular, the pitch of the human voice (more precisely the fundamental frequency of that pitch) ranges from about 90 to 160 Hz in males and from about 230 to 370 Hz in females, and thus the essential elements of the human voice, determining its timbre (quality), lie in the low band. The pitch here denotes the fundamental frequency and harmonic components of a signal resulting from the vibration of the vocal cord. If the components in this band including those essential elements are simply reduced or eliminated, even the elements of signal components other than those of wind noise are reduced or eliminated, leading to distorted sound—in the case of the human voice, its volume diminishes and its timbre changes.

To avoid this, in the wind noise reducer 6, the processing for reducing wind noise is divided into two stages, of which each is applied to a different band. Performed in one of these stages is signal restoration processing for restoring a signal containing no wind noise, and performed in the other is signal reduction processing for reducing wind noise by reducing a signal level.

Signal restoration processing is applied to the signal in the low band. Since the low band includes not only strong wind noise but also the essential elements of sound, here, noise elimination is performed instead of by reducing the signal level but by restoring a signal containing no wind noise. Signal restoration processing eliminates the need to reduce the signal level, and is thus less likely to cause sound distortion.

Signal reduction processing is applied to the signal in the medium band. The medium band is less affected by wind noise, but, if the processing for reducing wind noise is applied only to the low band and not to the medium band, wind noise of relatively high frequencies remains (heard as a sound like something rolling), causing the user to hear unnatural sound. Even then, here, since the effect of wind noise is smaller, signal reduction is supposed to cause less sound distortion; moreover, also from the perspective of the elements of sound, since the medium band is where the harmonic components of a pitch lie, performing signal reduction does not produce so much distortion as in the low band. This is the reason that signal reduction processing is applied to the signal in the medium band.

Signal restoration processing may be applied also to the medium band. The problem then is that restoring a signal containing no wind noise in the medium band requires high-order harmonic components contained in the signal in the high band, and the feebleness of those high-order harmonic components makes satisfactory restoration difficult. Thus signal reduction processing is suitable for the signal in the medium band.

It does not matter which of signal restoration processing and signal reduction processing is performed first; they may be performed concurrently. Signal restoration processing and signal reduction processing may each be performed either on the time axis or on the frequency axis.

There may be additionally provided a wind noise checker that checks the presence and intensity of wind noise. The wind noise checker checks the presence and intensity of wind noise, for example, by finding the cross-correlation between left and right channels, and the result of the check is used in the signal restoration processing and/or signal reduction processing. A single wind noise checker may be shared between signal restoration processing and signal reduction processing, or two wind noise checkers may be provided and assigned one to each of signal restoration processing and signal reduction processing. In a case where two wind noise checkers are assigned one to each of signal restoration processing and signal reduction processing, they may use the result of the check of each other (a specific example will be described later).

Here, the cross-correlation denotes the mutual correlation between signals compared. In the examples presented below, the correlation value found by predetermined calculation is dealt with as an index representing the cross-correlation; this, however, does not mean to limit the method of evaluating the cross-correlation.

Presented below are Examples 1 to 5 as specific examples of the wind noise reducer 6.

Example 1

First, Example 1 will be described. In Example 1, both signal restoration processing and signal reduction processing are performed on the time axis.

Figure 3:
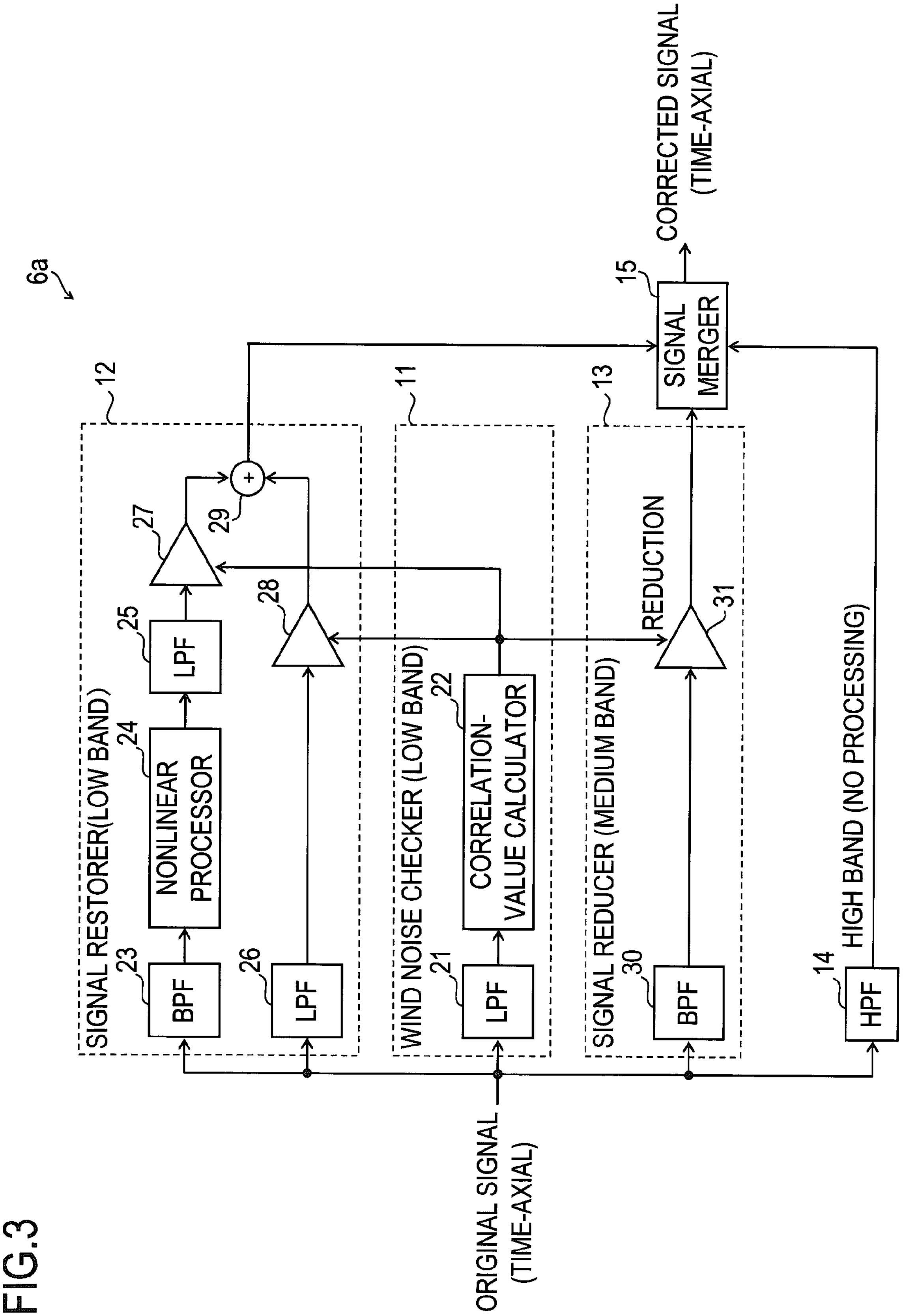
FIG. 3 is an internal block diagram of the wind noise reducer in FIG. 2, in Example 1 of the invention.

FIG. 3 is an internal block diagram of the wind noise reducer 6*a* in Example 1. The wind noise reducer 6*a* is used as the wind noise reducer 6 in FIG. 2. The wind noise reducer 6*a* comprises portions referred to by the reference signs 11 to 15.

The input signal (input sound signal) to the wind noise reducer 6*a* is a sound signal on the time axis (in other words, a sound signal expressed in terms of time regions; hereinafter "time-axial signal") composed of a plurality of channel signals. Specifically, the audio signal processor 4 in FIG. 2 converts, at a predetermined sampling frequency, the analog output signals from the microphones MIC1 and MIC2 into digital signals. Here, the channel signal in which the digital signals corresponding to the output signal from the microphone MIC1 are arranged chronologically is represented by L(t), and the channel signal in which the digital signals corresponding to the output signal from the microphone MIC2 are arranged chronologically is represented by R(t). Moreover, the channel signal corresponding to the output signal from the microphone MIC1 is called the L signal, and the channel signal corresponding to the output signal from the microphone MIC2 is called the R signal. Then the input signal to the wind noise reducer 6*a* in FIG. 3 is composed of the L signal L(t) and the R signal R(t). This input signal is corrected by the wind noise reducer 6*a*. Accordingly, the input signal to the wind noise reducer 6*a* is called the "original signal", and the output signal from the wind noise reducer 6*a* is called the "corrected signal". In the following description, the L signal L(t) and the R signal R(t) are often referred to simply as the signals L(t) and R(t) respectively.

The values of the signals L(t) and R(t) vary across positive and negative values centered around zero. When the diaphragms of the microphones MIC1 and MIC2 do not vibrate, the values of L(t) and R(t) are zero (when any offset or noise component is ignored); the more they vibrate, the larger the amplitudes of L(t) and R(t).

In Example 1, the original signal is fed to each of band-pass filters (hereinafter "BPFs") 23 and 30, low-pass filters (hereinafter "LPFs") 21 and 26, and a high-pass filter (hereinafter "HPF") 14.

The wind noise checker 11 comprises portions referred to by the reference signs 21 and 22. The LPF 21 extracts from the input signal to it the predetermined-band components, and outputs them. The band in which the LPF 21 extracts includes the frequency band of wind noise, and is typically the same as the "low band" mentioned above. This, however, does not mean that the band in which the LPF 21 extracts needs to be exactly the same as the "low band" mentioned above; instead the LPF 21 may extract, for example, in a frequency band of 200 Hz or lower.

It should be noted that the different portions within the wind noise reducer 6*a* perform necessary signal processing on each of the plurality of channel signals individually. Specifically, for example, the LPF 21 extracts, from each of the L signal L(t) and the R signal R(t), the predetermined-band components, and outputs them. This is true also with the wind noise reducer 6*b* and the wind noise reducer 6*c* described later, except, naturally, for that portion (in this example, the correlation-value calculator 22) that calculates a correlation value by cross-correlation calculation.

Figure 4:
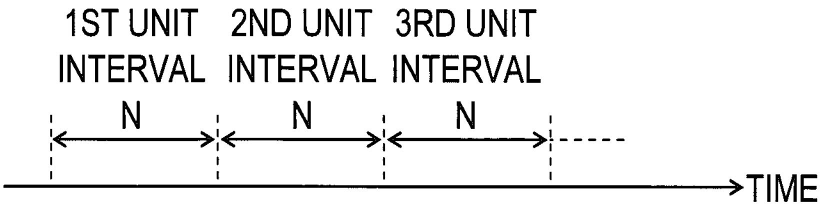
FIG. 4 is a diagram showing unit intervals for signal processing, in Example 1 of the invention.

The correlation-value calculator 22 finds the correlation value that indicates the cross-correlation between the channel signals output from the LPF 21, that is, the correlation value, between the channels, among the band components extracted by the LPF 21. Specifically, the original signal, and the time-axial sound signal based on the original signal, are handled in segments of predetermined intervals. As shown in FIG. 4, it is assumed that time passes from a 1st unit interval, a 2nd, a 3rd, and so forth, each unit interval including N discrete signals (N samples of signals). Thus a single unit interval includes N L signals L(t) and N R signals R(t).

Based on the signals L(t) and R(t) output from the LPF 21, the correlation-value calculator 22 calculates, for each unit interval, a correlation value K[p] according to formula (1) below. Here, p represents the number of the unit interval. In formula (1), $L_i$ and $R_i$ represent the values of the i-th L signal L(t) and the i-th R signal R(t), respectively, within a time interval of interest. Needless to say, since the signals L(t) and R(t) are fed via the LPF 21 to the correlation-value calculator 22, the values of $L_i$ and $R_i$ in formula (1) depend on the output values from the LPF 21.

$$K[p] = 2 \times \frac{1}{N} \sum_{i=0}^{N-1} \left( \frac{L_i \times R_i}{L_i^2 + R_i^2} \right) \tag{1}$$

Wind noise exhibits no cross-correlation between the left and right channels. If, therefore, the original signal contains relatively much wind noise, the correlation value is relatively small; if the original signal contains relatively little wind noise, the correlation value is relatively large. Thus the correlation value K[p] takes a value commensurate with the intensity of wind noise in the p-th unit interval. Exploiting this, the wind noise checker 11 checks, based on the correlation value calculated by the correlation-value calculator 22, the degree of effect of wind noise in each unit interval. The result of this check is used in the processing by the signal restorer 12 and the signal reducer 13.

The signal restorer 12 comprises portions referred to by the reference signs 23 to 29. Exploiting the fact that vocal, instrumental, and other sounds contain harmonics, the signal restorer 12 generates, from the medium-band signal of the original signal, a restored signal in the low band.

To say a sound has harmonics is to say its frequency spectrum contains overtones, and this is true with most of vocal, instrumental, and other sounds. Specifically, in the frequency spectrum of a sound, when the frequency of its lowest component is f0, then the frequency spectrum of the sound consist of components of, in addition to the frequency f0, the frequencies f0×2, f0×3, f0×4, and so forth. In this case, the component of the frequency f0 is called the fundamental wave component, and the components of the frequencies f0×2, f0×3, f0×4, and so forth are called the 2nd, 3rd, 4th, . . . harmonic components. Of these harmonic components, those of relatively high orders are called high-order harmonic components (or high harmonic components), and those of relatively low orders are called low-order harmonic components.

It is known that, in a signal containing harmonics, the fundamental wave component, or low-order harmonic components, can be generated from high-order harmonic components, and that such generation can be achieved by use of nonlinear processing such as squaring, full-wave rectification, or half-wave rectification (see, for example, JP-A-H8-130494, JP-A-H8-278800, and JP-A-H9-55778).

The signal restorer 12 in FIG. 3 can generate a restored signal by use of any well-known method. As a specific example, in the signal restorer 12, the portions referred to by the reference signs 23 to 25 generate a restored signal. Each of these portions will now be described.

The BPF 23 extracts from the input signal to it the predetermined-band components, and outputs them. For the purpose of restoring a signal in the low band, the band in which the BPF 23 extracts is the same as the "medium band" mentioned above. This, however, does not mean that the band in which the BPF 23 extracts needs to be exactly the same as the "medium band" mentioned above.

The nonlinear processor 24 performs nonlinear processing on the signal that has passed through the BPF 23 (the signal extracted by the BPF 23). The nonlinear processing here is, for example, squaring, full-wave rectification (absolute value processing), or half-wave rectification. When squaring is used, the nonlinear processor 24 squares the signal having passed through the BPF 23, and outputs the result. In a case where the human voice is collected by the microphones MIC1 and MIC2, the signal having passed through the BPF 23 contains the harmonic components of the pitch signal of the sound, and squaring this signal generates a signal containing frequencies corresponding to the differences and sums between the frequencies of those harmonic components. Thus squaring generates harmonic components (the fundamental wave component, or high harmonic components) on both the low- and high-frequency sides of the pass band of the BPF 23. In a case where squaring is used, the generated harmonic components have amplitudes squared as compared with those of the desired harmonic components. Thus, in a case where squaring is used, the nonlinear processor 24 further performs normalization on the squared signal obtained by squaring the signal having passed through the BPF 23, so as to output a squared signal with a thus adjusted amplitude.

The same applies in a case where, as nonlinear processing, full-wave rectification (absolute value processing) or half-wave rectification is used. For example, in a case where full-wave rectification is used, the nonlinear processor 24 calculates the absolute value of the signal having passed through the BPF 23, and outputs the result.

The signal restorer 12 uses, of the signal restored, only the signal components in the low band. Thus the LPF 25 passes only the low-band components of the output signal of the nonlinear processor 24. The output signal of the LPF 25 is a low-band sound signal as restored from the medium-band sound signal of the original signal. Since almost no wind noise is contained in the medium band, from which restoration is performed, the restored low-band sound signal contains almost no wind noise. Thus the portions referred to by the reference signs 23 to 25 restore a low-band sound signal with reduced wind noise as compared with the low-band sound signal of the original signal.

On the other hand, the signal restorer 12 makes the LPF 26 prepare an original low-band signal. Specifically, the signal restorer 12 makes the LPF 26, which passes only the low-band components of the input signal to it, output only the low-band components of the original signal.

The multipliers 27 and 28 and the adder 29 perform, according to the correlation value calculated by the correlation-value calculator 22, weighted addition of the output signal values from the LPFs 25 and 26, so as to generate the output signal (a first corrected sound signal) of the signal restorer 12. When the output signal value from the LPF 26 in the p-th unit interval is represented by $LPF\_OUT_O(t)$, and the output signal value from the LPF 25 in the p-th unit interval is represented by $LPF\_OUT_R(t)$, then the output signal value $OUT_{12}(t)$ of the signal restorer 12 corresponding to the p-th unit interval is given by formula (2) below.

$$OUT_{12}(t)=LPF\_OUT_O(t)\times K[p]+LPF\_OUT_R(t)\times(1-K[p]) \quad (2)$$

Specifically, when the correlation value is relatively large, it is judged that there is relatively weak wind noise; accordingly, the degree of contribution of the original low-band signal to the output signal of the signal restorer 12 is increased. By contrast, when the correlation value is relatively small, it is judged that there is relatively strong wind noise; accordingly, the degree of contribution of the restored signal (the low-band signal of the restored signal) to the output signal of the signal restorer 12 is increased.

As will be understood from its calculation formula (1) given previously, the correlation value K[p] fulfills the inequality "$0\leqq K[p]\leqq 1$", and this is the reason that K[p] is used intact to calculate $OUT_{12}(t)$. In a case where K[p] does not fulfill "$0\leqq K[p]\leqq 1$", formula (2) needs to be modified appropriately. For any other purpose, the calculation formula of $OUT_{12}(t)$ may be modified in various ways. In such cases, the calculation formula of $OUT_{12}(t)$ should be modified such that, when the correlation value K[p] is relatively large, the degree of contribution of $LPF\_OUT_O(t)$ to $OUT_{12}(t)$ is relatively large and that of $LPF\_OUT_R(t)$ is relatively small, and that, when the correlation value K[p] is relatively small, the degree of contribution of $LPF\_OUT_O(t)$ to $OUT_{12}(t)$ is relatively small and that of $LPF\_OUT_R(t)$ is relatively large. For example, it is possible to find the arithmetic product of the value obtained by multiplying K[p] by a predetermined coefficient and $LPF\_OUT_O(t)$, find the arithmetic product of the value obtained by multiplying (1−K[p]) by a predetermined coefficient and $LPF\_OUT_R(t)$, and add up these arithmetic products to find $OUT_{12}(t)$. It is also possible, when, with respect to a unit interval of interest, the correlation value is larger than a predetermined reference threshold value, to judge that there is no wind noise and use the output signal of the LPF 26 intact as the output signal of the signal restorer 12.

The signal reducer 13 comprises portions referred to by the reference signs 30 and 31. The BPF 30 extracts from the input signal to it the medium-band components, and outputs them. The multiplier 31, for each unit interval, reduces the level of the signal having passed through the BPF 30 (i.e. the medium-band sound signal extracted from the original signal) by a reduction factor commensurate with the correlation value calculated by the correlation-value calculator 22, and outputs the reduced signal as the output signal of the signal reducer 13. The level of a signal denotes the amplitude (intensity) of the signal.

Here, when, based on the correlation value, the effect of wind noise is judged to be large, the level is reduced to a large degree, and, when, based on the correlation value, the effect of wind noise is judged to be small, the level is reduced to a moderate degree. Specifically, in a case where the p-th unit interval is currently of interest, as the correlation value K[p] decreases, the reduction factor for the p-th unit interval is increased so that the level is reduced to a larger degree (put reversely, as the correlation value K[p] increases, the reduction factor for the p-th unit interval is decreased). The signal reduction performed by the multiplier 31 appropriately reduces the wind noise contained in the output signal (a second corrected signal) of the signal reducer 13.

So long as the same result is obtained, the signal reduction here may be performed by any method. For example, it is possible to multiply the output signal of the BPF 30 by the correlation value calculated by the correlation-value calculator 22, or by a coefficient commensurate with the correlation value.

The HPF 14 passes only the high-band components of the input signal to it.

The signal merger 15 adds up the output signal of the signal restorer 12, which is the low-band sound signal with wind noise reduced by signal restoration processing, the output signal of the signal reducer 13, which is the medium-band sound signal with wind noise reduced by signal reduction processing, and the output signal of the HPF 14, and outputs the result of the addition as the output signal of the wind noise reducer 6*a* (i.e. the corrected signal). In Example 1, like the original signal, this corrected signal too is a time-axial sound signal composed of a plurality of channel signals.

In a case where the signal restorer 12, the signal reducer 13, and the HPF 14 produce different delays, the differences among these delays needs to be canceled by delay processing within the signal merger 15 or in the stage preceding it before the addition processing by the signal merger 15. This is true with the weighted addition processing by the multipliers 27 and 28 and the adder 29. Though the correlation value needs to be calculated before the signal restoration processing by the signal restorer 12 and the signal reduction processing by the signal reducer 13, there is no particular restriction on which of signal restoration processing and signal reduction processing is to be performed first.

The audio signal processor 4 in FIG. 2 performs predetermined encoding processing (sound compression processing) on the corrected signal output from the signal merger 15, and records the resulting signal to the recording medium 5. The predetermined encoding here is, for example, AAC (Advanced Audio Coding) conforming to the MPEG (Moving Picture Experts Group) standards.

The description above does not in principle discuss the processing of the L and R signals separately, but it should be noted that, as mentioned previously, the different portions within the wind noise reducer 6a perform necessary signal processing on each of the plurality of channel signals individually.

Specifically, the LPF 21 extracts, from each of the L and R signals composing the original signal, the predetermined-band components (typically, the low-band components), and outputs them. The BPF 23 extracts, from each of the L and R signals composing the original signal, the predetermined-band components (typically, the medium-band components), and outputs them. The nonlinear processor 24 performs nonlinear processing individually on each of the L and R signals fed to it via the BPF 23, and the LPF 25 passes only the low-band components of each of the L and R signals having gone through the nonlinear processing. The LPF 26 passes only the low-band components of each of the L and R signals composing the original signal. The multipliers 27 and 28 and the adder 29 performs weighted addition of the L signal output from the LPF 25 and the L signal output from the LPF 26, and performs weighted addition of the R signal output from the LPF 25 and the R signal output from the LPF 26.

The BPF 30 extracts, from each of the L and R signals composing the original signal, the medium-band components, and outputs them. The multiplier 31 reduces the level of each of the L and R signals having passed through the BPF 30 by a reduction factor commensurate with the correlation value (the correlation value that determines the reduction factor is common to the L and R signals).

The HPF 14 passes only the high-band components of the L and R signals composing the original signal. The signal merger 15 adds up the L signal in the output signal of the signal restorer 12, the L signal in the output signal of the signal reducer 13, and the L signal in the output signal of the HPF 14, and adds up the R signal in the output signal of the signal restorer 12, the R signal in the output signal of the signal reducer 13, and the R signal in the output signal of the HPF 14, so as to generate the corrected signal.

The wind noise checker 11 may be omitted from the wind noise reducer 6a. In a case where the wind noise checker 11 is omitted, the multipliers 27 and 28 and the adder 29 perform weighted addition of the output signal values of the LPFs 25 and 26 in a prescribed ratio to generate the output signal of the signal restorer 12 (the first corrected sound signal). Thus, in this case, K[p] in formula (2) above remains fixed. Moreover, in a case where the wind noise checker 11 is omitted, the multiplier 31 reduces the level of the signal having passed through the BPF 30 by a prescribed reduction factor, and outputs the reduced signal as the output signal of the signal reducer 13. In a case where the wind noise checker 11 is omitted, the input signal to the wind noise reducer 6a may be a monaural (monophonic) signal composed of a single channel signal.

In the example described above, the BPF 23, the nonlinear processor 24, and the LPF 25 perform necessary processing on the L and R signals individually to generate one restored signal for the R signal and another for the L signal. Alternatively, it is also possible to generate from the L and R signals composing the original signal a monaural signal, and generate based on the monaural signal a monaural restored signal. Monauralizing of signals may be performed at any stage during the process of generating the restored signal from the original signal. Typically, at the stage preceding the BPF 23, the L and R signals composing the original signal are averaged to generate a monaural signal, which is then fed to the BPF 23. The resulting monaural restored signal is used as a restored signal for both the L and R signals. Generating a monaural restored signal from a monaural signal requires only one channel, and thus helps simplify the processing. Little stereophonic effect is felt in the low band, and thus the use of a monaural restored signal poses no serious problem. This technical feature—generating a monaural restored signal—may be applied to any other examples described later.

In the configuration shown in FIG. 3, the LPFs 25 and 26 are provided at the stage preceding the adder 29. Alternatively, it is also possible to omit the LPFs 25 and 26 from the signal restorer 12, and provide an LPF (unillustrated) having a function equivalent to that of the LPF 25 or 26 at the stage succeeding the adder 29 (the same is true with FIG. 9 described later). This too permits the signal restorer 12 to output a signal equivalent to that it outputs when provided with the LPFs 25 and 26.

Modified Examples of Signal Reduction Processing: In the signal reduction processing described above, by use of the multiplier 31, the level of the signal having passed through the BPF 30 is reduced by a reduction factor commensurate with the correlation value K[p]. This, however, is not meant to limit the method of reducing the signal level. Below will be described, in connection with the signal reduction processing in Example 1, a first and a second example of modified signal reduction processing. In the following description, the channel corresponding to the L signal is called the L channel, and the channel corresponding to the R signal is called the R channel.

First, the first modified signal reduction processing will be described. In this signal reduction processing, the signal reducer 13 compares the correlation value K[p] with a predetermined threshold value $K_{THA}$. As described previously, the correlation value K[p] indicates the degree of effect of wind noise in the p-th unit interval. On the other hand, the threshold value $K_{THA}$ indicates the reference degree of effect to be contrasted with that degree of effect. When the correlation value K[p] is smaller than the threshold value $K_{THA}$, it is judged that the effect of wind noise in the p-th unit interval is relatively large; when the correlation value K[p] is larger than the threshold value $K_{THA}$, it is judged that the effect of wind noise in the p-th unit interval is relatively small (the same is true with the second modified signal reduction processing).

And when the correlation value K[p] is smaller than the threshold value $K_{THA}$, the signal reducer 13 averages the L and R signals having passed through the BPF 30, and feeds the monaural signal resulting from the averaging as the output signal of the signal reducer 13 to the signal merger 15. When the signal values of the L and R signals having passed through the BPF 30 in the p-th unit interval are represented by $BPF\_OUT_L(t)$ and $BPF\_OUT_R(t)$ respectively, and the signal values of the L and R signals output from the signal reducer 13 in the p-th unit interval are represented by $BPF\_OUT_L'(t)$ and $BPF\_OUT_R'(t)$ respectively, then, when the correlation value K[p] is smaller than the threshold value $K_{THA}$, the signal reducer 13 outputs a signal expressed as "$BPF\_OUT_L'(t)=BPF\_OUT_R'(t)=(BPF\_OUT_L(t)+BPF\_OUT_R(t))/2$".

Wind noise is produced randomly in each channel by turbulent air flow, and thus the effect of wind noise can be large in one channel and small in another. The averaging above makes the effect of wind noise even between the different channels, and thereby reduces the noise level in a channel that is being affected relatively much by wind noise.

Figure 12:
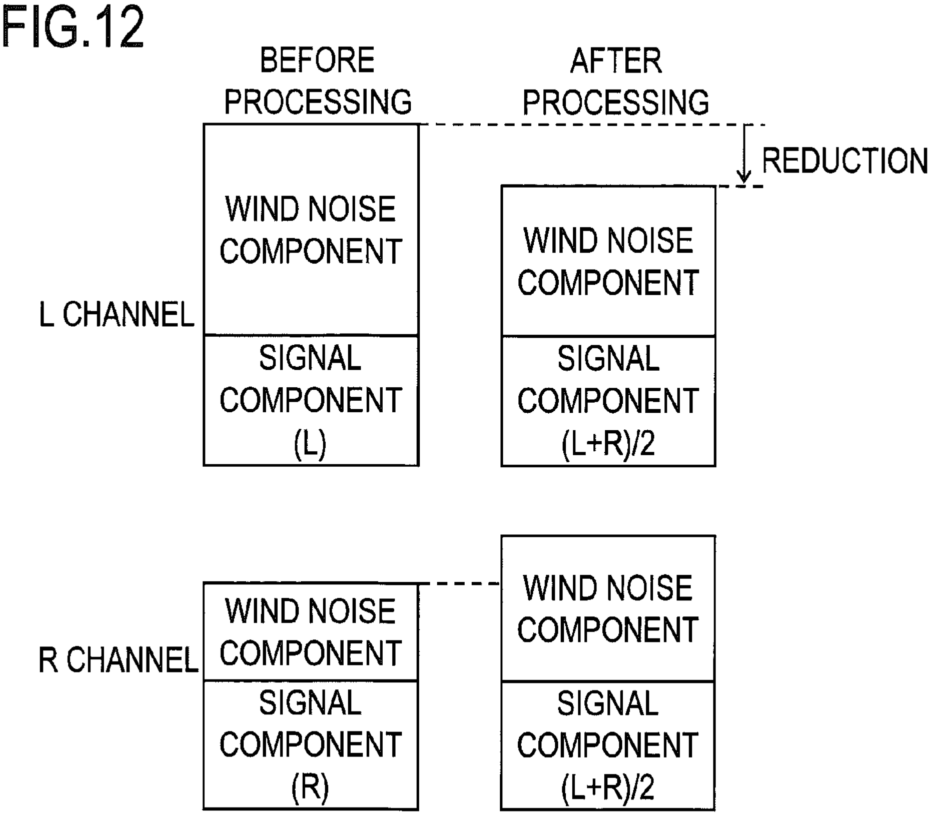
FIG. 12 is a conceptual diagram illustrating the first modified signal reduction processing, in Example 1 of the invention.

FIG. 12 is a conceptual diagram of signal reduction processing involving such averaging. The p-th unit interval will be discussed. In the example shown in FIG. 12, the effect of wind noise is relatively large in the L channel and relatively small in the R channel. Accordingly, the signal level of the L signal having passed through the BPF 30 is higher than that of the R signal having passed through the BPF 30. In this case, the above averaging averages the wind noise components contained in the L and R signals having passed through the BPF 30, and as a result, of the signal having passed through the BPF 30, the L signal comes to have a reduced signal level.

By contrast, when the correlation value K[p] is larger than the predetermined threshold value $K_{THA}$, preferably, the above averaging is not performed, and the L and R signals having passed through the BPF 30 are, intact, fed, as the L and R signals to be output from the signal reducer 13, to the signal merger 15. Alternatively, "unmodified" signal reduction processing using the multiplier 31 may be performed. Specifically, when the correlation value K[p] is larger than the predetermined threshold value $K_{THA}$, by use of the multiplier 31, the signal levels of the L and R signals having passed through the BPF 30 are reduced by a reduction factor commensurate with the correlation value K[p], and the resulting signals are used as the output signal of the signal reducer 13.

When the correlation value K[p−1] calculated for the (p−1)-th unit interval is larger than the threshold value $K_{THA}$ and simultaneously the correlation value K[p] calculated for the p-th unit interval is smaller than the threshold value $K_{THA}$, rapid monauralizing of signals may cause discontinuity in the obtained signal. In such a case, gradual monauralizing is preferred. This prevents discontinuity in the obtained signal. Specifically, in such a case, preferably, for example, the following processing is performed. Here, the interval border denotes the time point bordering between the (p−1)-th unit interval and the p-th unit interval. The ratio in which the signal values $BPF\_OUT_L(t)$ and $BPF\_OUT_R(t)$ are mixed is gradually varied such that, for the 1st to 5th samples of signals starting at the interval border, $$BPF\_OUT_L'(t)=BPF\_OUT_L(t)\times 0.9+BPF\_OUT_R(t)\times 0.1 \text{ and simultaneously}$$

$$BPF\_OUT_R'(t)=BPF\_OUT_L(t)\times 0.1+BPF\_OUT_R(t)\times 0.9;$$

for the 6th to 10th samples of signals starting at the interval border, $$BPF\_OUT_L'(t)=BPF\_OUT_L(t)\times 0.8+BPF\_OUT_R(t)\times 0.2 \text{ and simultaneously}$$

$$BPF\_OUT_R'(t)=BPF\_OUT_L(t)\times 0.2+BPF\_OUT_R(t)\times 0.8;$$

. . .

for the 50th to 60th samples of signals starting at the interval border, $$BPF\_OUT_L'(t)=BPF\_OUT_L(t)\times 0.55+BPF\_OUT_R(t)\times 0.45 \text{ and simultaneously}$$

$$BPF\_OUT_R'(t)=BPF\_OUT_L(t)\times 0.45+BPF\_OUT_R(t)\times 0.55; \text{ and}$$

for the 61st and following samples of signals starting at the interval border, $$BPF\_OUT_L'(t)=BPF\_OUT_L(t)\times 0.5+BPF\_OUT_R(t)\times 0.5 \text{ and simultaneously}$$

$$BPF\_OUT_R'(t)=BPF\_OUT_L(t)\times 0.5+BPF\_OUT_R(t)\times 0.5.$$

(In this specific example, the number of samples belonging to a single unit interval is 61 or more.)

Described above is the processing for avoiding discontinuity in the obtained signal which is performed when the correlation value K[p−1] calculated for the (p−1)-th unit interval is larger than the threshold value $K_{THA}$ and simultaneously the correlation value K[p] calculated for the p-th unit interval is smaller than the threshold value $K_{THA}$. The reverse case can be coped with by processing on the same principle. Specifically, when the correlation value K[p−1] calculated for the (p−1)-th unit interval is smaller than the threshold value $K_{THA}$ and simultaneously the correlation value K[p] calculated for the p-th unit interval is larger than the threshold value $K_{THA}$, preferably, processing reverse to the above processing is performed to return gradually from monaural to stereo signals.

Next, the second modified signal reduction processing will be described. When the first modified signal reduction processing is used, as will be understood from FIG. 12, the signal reduction processing increases the wind noise component in a channel that is relatively little affected by wind noise (in FIG. 12, the R channel). To avoid this, the second modified signal reduction processing replaces, of the signals of the left and right channels, the one having the higher signal level with the one having the lower signal level.

Specifically, in the second modified signal reduction processing, the signal reducer 13 compares the correlation value K[p] with a predetermined threshold value $K_{THA}$. When the correlation value K[p] is smaller than the threshold value $K_{THA}$, the signal reducer 13 identifies, of the L and R signals having passed through the BPF 30, the one having the lower signal level as the minimum sound signal and the other as the non-minimum sound signal, and replaces the non-minimum sound signal with the minimum sound signal. Specifically, when the correlation value K[p] is smaller than the threshold value $K_{THA}$, if, of the L and R signals having passed through the BPF 30, the R signal is identified as the minimum sound signal, the signal reducer 13 outputs a signal expressed as "$BPF\_OUT_L'(t)=BPF\_OUT_R'(t)=BPF\_OUT_R(t)$".

Here, preferably, the comparison of signal levels for identifying the minimum and non-minimum sound signals is performed not for each sample signal but for a plurality of samples of signals. For example, for each of the L and R signals having passed through the BPF 30, the average power in the p-th unit interval is calculated, and, based on which has the higher or lower average power, the minimum and non-minimum sound signals are identified. In this case, the one having the lower power average is dealt with as the minimum sound signal in the p-th unit interval, and the one having the higher power average is dealt with as the non-minimum sound signal in the p-th unit interval.

Figure 13:
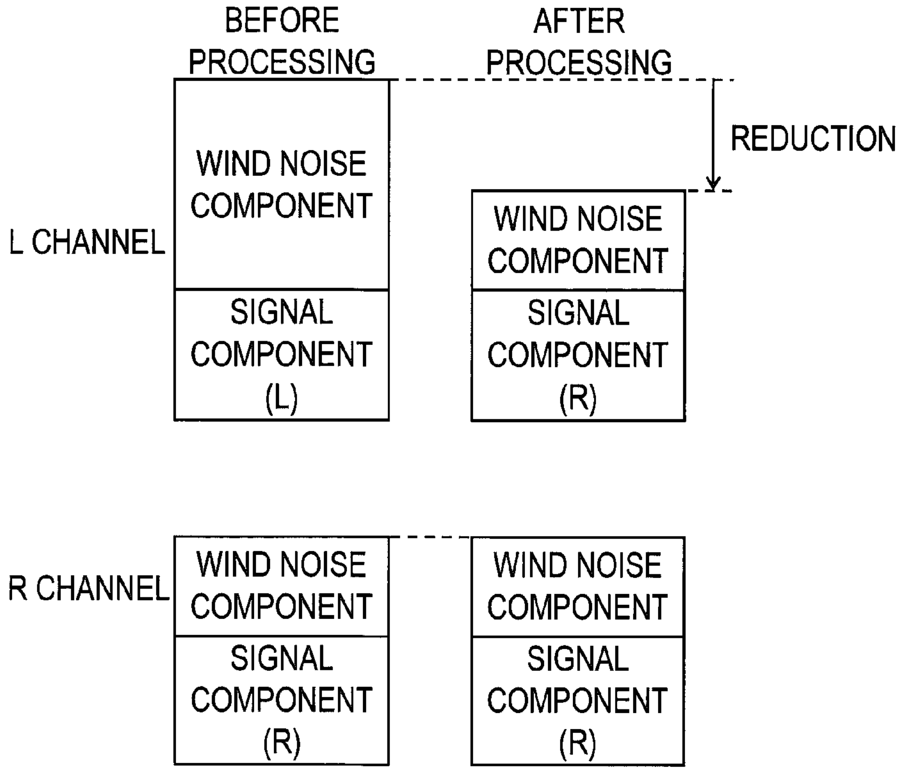
FIG. 13 is a conceptual diagram illustrating the second modified signal reduction processing, in Example 1 of the invention.

FIG. 13 is a conceptual diagram of signal reduction processing involving such replacement. The p-th unit interval will be discussed. In the example shown in FIG. 13, the effect of wind noise is relatively large in the L channel and relatively small in the R channel. Accordingly, the signal level of the L signal having passed through the BPF 30 is higher than that of the R signal having passed through the BPF 30. In this case, the above replacement reduces the wind noise component contained in the L signal having passed through the BPF 30 (no change in the R signal). In this way, it is possible, without increasing the noise level in a channel that is being affected relatively little by wind noise, to reduce the noise level in a channel that is being affected relatively much by wind noise.

By contrast, when the correlation value K[p] is larger than the predetermined threshold value $K_{THA}$, preferably, the above replacement is not performed, and the L and R signals having passed through the BPF 30 are, intact, fed, as the L and R signals to be output from the signal reducer 13, to the signal merger 15. Alternatively, "unmodified" signal reduction processing using the multiplier 31 may be performed. Specifically, when the correlation value K[p] is larger than the predetermined threshold value $K_{THA}$, by use of the multiplier 31, the signal levels of the L and R signals having passed through the BPF 30 are reduced by a reduction factor commensurate with the correlation value K[p], and the resulting signals are used as the output signal of the signal reducer 13.

When the correlation value K[p−1] calculated for the (p−1)-th unit interval is larger than the threshold value $K_{THA}$ and simultaneously the correlation value K[p] calculated for the p-th unit interval is smaller than the threshold value $K_{THA}$, rapid signal replacement may cause discontinuity in the obtained signal. In such a case, gradual replacement is preferred. This prevents discontinuity in the obtained signal. Specifically, for example, in such a case and when the minimum sound signal is the R signal, preferably, the following processing is performed. The ratio in which the signal values $BPF\_OUT_L(t)$ and $BPF\_OUT_R(t)$ are mixed is gradually varied such that, for the 1st to 5th samples of signals starting at the interval border, $$BPF\_OUT_L'(t)=BPF\_OUT_L(t)\times 0.9+BPF\_OUT_R(t)\times 0.1$$

for the 6th to 10th samples of signals starting at the interval border, $$BPF\_OUT_L'(t)=BPF\_OUT_L(t)\times 0.8+BPF\_OUT_R(t)\times 0.2$$

. . .

for the 40th to 45th samples of signals starting at the interval border, $$BPF\_OUT_L'(t)=BPF\_OUT_L(t)\times 0.1+BPF\_OUT_R(t)\times 0.9$$

for the 46th and following samples of signals starting at the interval border, $$BPF\_OUT_L'(t)=BPF\_OUT_R(t),$$

until eventually $BPF\_OUT_L'(t)$ and $BPF\_OUT_R(t)$ become equal. (In this specific example, the number of samples belonging to a single unit interval is 46 or more.) On the other hand, throughout the p-th unit interval, $BPF\_OUT_R'(t)=BPF\_OUT_R(t)$.

Described above is the processing for avoiding discontinuity in the obtained signal which is performed when the correlation value K[p−1] calculated for the (p−1)-th unit interval is larger than the threshold value $K_{THA}$ and simultaneously the correlation value K[p] calculated for the p-th unit interval is smaller than the threshold value $K_{THA}$. The reverse case can be coped with by processing on the same principle. Specifically, when the correlation value K[p−1] calculated for the (p−1)-th unit interval is smaller than the threshold value $K_{THA}$ and simultaneously the correlation value K[p] calculated for the p-th unit interval is larger than the threshold value $K_{THA}$, preferably, processing reverse to the above processing is performed to return gradually from the state with signal replacement to the state without signal replacement.

Example 2

Next, Example 2 will be described. In Example 2, both signal restoration processing and signal reduction processing are performed on the frequency axis.

Figure 5:
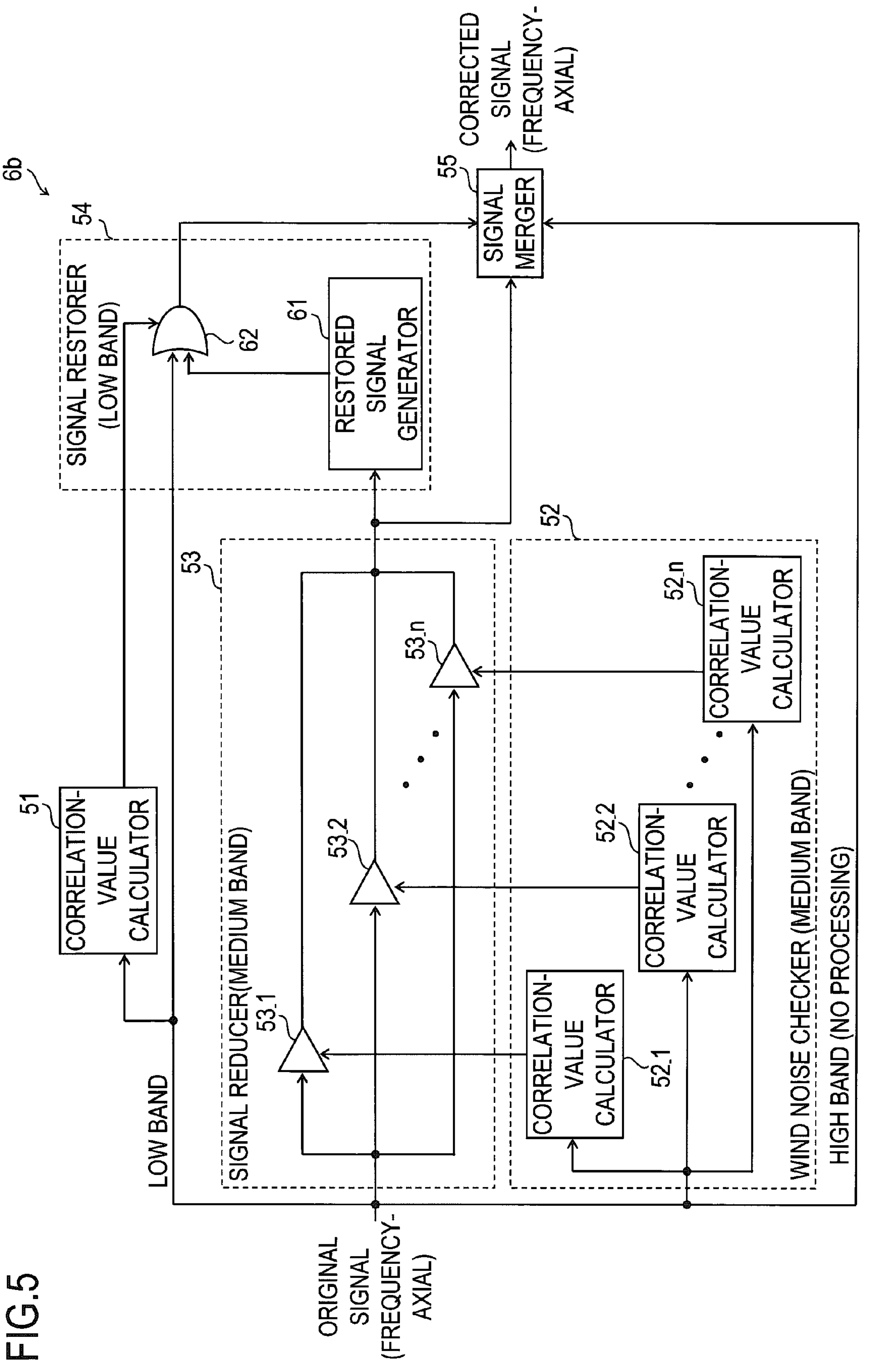
FIG. 5 is an internal block diagram of the wind noise reducer in FIG. 2, in Example 2 of the invention.

FIG. 5 is an internal block diagram of the wind noise reducer **6*b* in Example 2. The wind noise reducer 6*b* is used as the wind noise reducer 6 in FIG. 2. The wind noise reducer 6*b* comprises: a correlation-value calculator 51 functioning as a wind noise checker for the low band; a wind noise checker 52 for the medium band; a signal reducer 53, a signal restorer 54; and a signal merger 55. The wind noise checker 52 comprises n correlation-value calculators 52_1, 52_2, . . . , 52_*n*, and the signal reducer 53 comprises n multipliers 53_1, 53_2, . . . , 53_*n* (where n is an integer of 2 or more). The signal restorer 54 comprises a restored signal generator 61 and a signal selector 62**.

The input signal (input sound signal) to the wind noise reducer **6*b* is a sound signal on a frequency axis (in other words, a sound signal expressed in terms of frequency regions; hereinafter "frequency-axial signal") composed of a plurality of channel signals. The input signal to the wind noise reducer 6*b* is obtained by performing time-to-frequency conversion on the input signal (composed of L(t) and R(t)) to the wind noise reducer 6*a* in FIG. 3**, which is a time-axial sound signal, and thereby converting it into a frequency-axial sound signal. The time-to-frequency conversion here is achieved by, for example, DFT (discrete Fourier transform) or DCT (discrete cosine transform).

Through the time-to-frequency conversion above, the L and R signals L(t) and R(t) sampled at time intervals of Δt in the direction of the time axis are converted into L and R signals L(f) and R(f) sampled at frequency intervals of Δf in the direction of the frequency axis. The channel signal corresponding to L(t) and L(f) is called the L signal, and the channel signal corresponding to R(t) and R(f) is called the R signal.

The input signal to the wind noise reducer **6*b* in FIG. 5 is composed of the L signal L(f) and the R signal R(f) as described above. This input signal is corrected by the wind noise reducer 6*b*. Accordingly, the input signal to the wind noise reducer 6*b* is called the "original signal", and the output signal from the wind noise reducer 6*b*** is called the "corrected signal". In the following description, the L signal L(f) and the R signal R(f) are often referred to simply as the signals L(f) and R(f) respectively.

Figure 6:
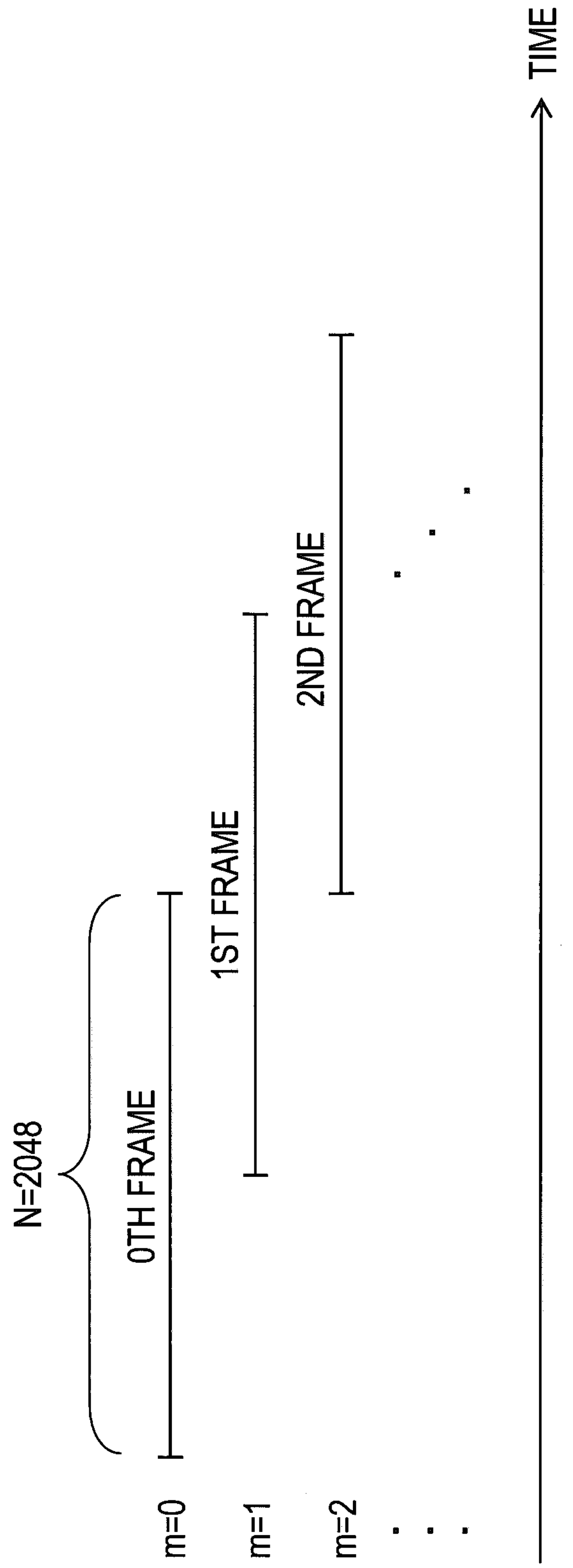
FIG. 6 is a diagram showing the relationship among different frames as units for encoding processing, in Example 2 of the invention.

For the sake of concreteness, the following description assumes that, for time-to-frequency conversion, MDCT (modified discrete cosine transform) is used. In a case where MDCT is used, each channel signal on the time axis is divided into frames as units for encoding processing. Each frame may contain one or more blocks and, here, it is assumed that each frame consists of a single block. The number of a frame (i.e. the number of a block) is represented by m, and the m-th frame starting at zero is referred to as the m-th frame, with m being an integer of 0 or more. FIG. 6 shows the relationship among different frames. Time passes from the 0th frame, the 1st frame, the 2nd frame, and so forth. Each block overlaps with the previous one by half in length. In the example under discussion, since each frame consists of a single block, each frame too overlaps with the previous one by half the length of one frame.

It is also assumed that N samples of signals L(t) are converted to M samples of signals L(f), that N samples of signals R(t) are converted to M samples of signals R(f), and that N=2048 and M=1024. Moreover, it is assumed that the sampling frequency is 48 kHz, and that Δt mentioned above is the reciprocal of 48 kHz. Let us introduce a variable k to represent the frequency number. Since M=1024, k is an integer of 0 or more but 1023 or less; moreover, since Δt=1/48 kHz, the frequency intervals of the frequency spectrum represented by L(f) and R(f), that is, the frequency interval between the frequencies numbered (k−1) and k, is about 23 Hz. Thus the upper limit of the low band, namely 300 Hz, corresponds to k=13, and the upper limit of the medium band, namely 1.5 kHz, corresponds to k=64.

Now the signals L(f) and R(f) can be expressed in terms of MDCT coefficients $L_{m,k}$ and $R_{m,k}$. The MDCT coefficient $L_{m,k}$ represents the signal strength of the frequency component of the signal L(f) having the frequency numbered k in the m-th frame, and the MDCT coefficient $R_{m,k}$ represents the signal strength of the frequency component of the signal R(f) having the frequency numbered k in the m-th frame.

Of the signals L(f) and R(f) composing the original signal, the signals whose frequency bands belong to the low band are fed to the correlation-value calculator 51. Specifically, the MDCT coefficients $L_{m,k}$ and $R_{m,k}$ within the range of $0 \leqq k \leqq 13$ are fed to the correlation-value calculator 51. For each frame, the correlation-value calculator 51 calculates the correlation value $K_A[m]$ according to formula (3) below. $K_A[m]$ represents the correlation value for the m-th frame. $K_A[m]$ takes a value of 0 or more but 1 or less. Needless to say, in a case where signals are handled on the frequency axis as in this example, signals exist at prescribed frequency intervals, and therefore there is no need for LPFs etc. as are needed in Example 1.

$$K_A[m] = 2 \times \frac{1}{14} \sum_{i=0}^{13} \left( \frac{L_{m,i} \times R_{m,i}}{L_{m,i}^2 + R_{m,i}^2} \right) \tag{3}$$

Wind noise does not exhibit cross-correlation between the left and right channels. Thus, when the original signal contains relatively much wind noise, the correlation value is relatively small and, when the original signal contains relatively little wind noise, the correlation value is relatively large. The correlation value $K_A[m]$ has a value commensurate with the intensity of wind noise in the m-th frame. Exploiting this, the correlation-value calculator 51, functioning as the wind noise checker for the low band, checks, based on the correlation value, the degree of effect of wind noise on each frame. The result of the check is used in the processing by the signal restorer 54.

Of the signals L(f) and R(f) composing the original signal, the signals whose frequency bands belong to the medium band are fed to the wind noise checker 52 and to the signal reducer 53. Specifically, the MDCT coefficients $L_{m,k}$ and $R_{m,k}$ within the range of $14 \leqq k \leqq 64$ are fed to the wind noise checker 52 and to the signal reducer 53. The input signal to the wind noise checker 52 and to the signal reducer 53 is the subdivided into n parts. That is, the medium band is subdivided into n sub-bands, and, for each of these sub-bands, wind noise checking and signal reduction are performed.

Specifically, the MDCT coefficients $L_{m,k}$ and $R_{m,k}$ within the range of $14 \leqq k \leqq k_1$ are fed to the correlation-value calculator 52_1 and to the multiplier 53_1;

the MDCT coefficients $L_{m,k}$ and $R_{m,k}$ within the range of $k_1 < k \leqq k_2$ are fed to the correlation-value calculator 52_2 and to the multiplier 53_2;

. . .

the MDCT coefficients $L_{m,k}$ and $R_{m,k}$ within the range of $k_{n-1} < k \leqq k_n$ are fed to the correlation-value calculator 52_*n* and to the multiplier 53_*n*.

Here, $14 < k_1 < k_2 < \ldots < k_{n-1} < k_n = 64$.

The wind noise checker 52 calculates the correlation value for each of the n sub-bands. Specifically, for each frame, the correlation-value calculator 52_1 calculates the correlation value $K_{B1}[m]$ according to formula (4-1) below; for each frame, the correlation-value calculator 52_2 calculates the correlation value $K_{B2}[m]$ according to formula (4-2) below; . . . ; for each frame, the correlation-value calculator 52_*n* calculates the correlation value $K_{Bn}[m]$ according to formula (4-n) below. The correlation values $K_{B1}[m]$, $K_{B2}[m]$, . . . $K_{Bn}[m]$ are those for the m-th frame. $K_{B1}[m]$, $K_{B2}[m]$, . . . , $K_{Bn}[m]$ indicate the cross-correlation between the L and R signals in the corresponding bands respectively, each taking a value of 0 or more but 1 or less.

$$K_{B1}[m] = 2 \times \frac{1}{(k_1 - 14 + 1)} \sum_{i=14}^{k_1} \left( \frac{L_{m,i} \times R_{m,i}}{L_{m,i}^2 + R_{m,i}^2} \right) \tag{4-1}$$

$$K_{B2}[m] = 2 \times \frac{1}{(k_2 - k_1)} \sum_{i=k_1+1}^{k_2} \left( \frac{L_{m,i} \times R_{m,i}}{L_{m,i}^2 + R_{m,i}^2} \right) \tag{4-2}$$

$$\ldots$$

$$K_{Bn}[m] = 2 \times \frac{1}{(k_n - k_{n-1})} \sum_{i=k_{n-1}+1}^{k_n} \left( \frac{L_{m,i} \times R_{m,i}}{L_{m,i}^2 + R_{m,i}^2} \right) \tag{4-n}$$

For the m-th frame, the multiplier 53_1 reduces the level of the input signal to it (i.e. the values of the MDCT coefficients $L_{m,k}$ and $R_{m,k}$ within the range of $14 \leqq k \leqq k_1$) by a reduction factor commensurate with the $K_{B1}[m]$, and outputs the reduced signal.

Likewise, for the m-th frame, the multiplier 53_2 reduces the level of the input signal to it (i.e. the values of the MDCT coefficients $L_{m,k}$ and $R_{m,k}$ within the range of $k_1 < k \leqq k_2$) by a reduction factor commensurate with the $K_{B2}[m]$, and outputs the reduced signal.

Likewise, for the m-th frame, the multiplier 53_*n* reduces the level of the input signal to it (i.e. the values of the MDCT coefficients $L_{m,k}$ and $R_{m,k}$ within the range of $k_{n-1} < k \leqq k_n$) by a reduction factor commensurate with the $K_{Bn}[m]$, and outputs the reduced signal.

All the other multipliers within the signal reducer 53 operate similarly.

Here, when j is an integer of 1 or more but n or less, if the correlation value $K_{Bj}[m]$ indicates that the effect of wind noise is large, the multiplier 53_*j* reduces the level to a large degree; if the correlation value $K_{Bj}[m]$ indicates that the effect of wind noise is small, the multiplier 53_*j* reduces the level to a moderate degree. That is, as the correlation value $K_{Bj}[m]$ decreases, the multiplier 53_*j* increases the reduction factor corresponding to the m-th frame; as the correlation value $K_{Bj}[m]$ increases, the multiplier 53_*j* decreases the reduction factor corresponding to the m-th frame. The higher the reduction factor, the larger the degree to which the multiplier 53_*j* reduces the level. Specifically, the level reduced here is, in a case where j=1, the values of the MDCT coefficients $L_{m,k}$ and $R_{m,k}$ within the range of $14 \leqq k \leqq k_1$.

So long as the same result is obtained, the signal reduction here may be performed by any method. For example, it is possible to multiply the input signal to the multiplier 53_*j* by the correlation value calculated by the correlation-value calculator 52_*j*, or by a coefficient commensurate with the correlation value. It is also possible, when the correlation value $K_{Bj}[m]$ is larger than a predetermined threshold value, to judge that there is no wind noise and use the input signal to the multiplier 53_*j* intact as the output signal from it.

In the medium band, what part of it is affected by wind noise varies depending on the intensity of wind and other factors. To cope with this, the medium band is subdivided into sub-bands and, for each of these sub-bands, the degree of effect of wind noise is evaluated through calculation of a correlation value. Then, for each of the sub-bands, the degree of signal level reduction is adjusted according to the degree of effect of wind noise. In this way, signal reduction is performed only in sub-bands affected by wind noise, or signal reduction is performed to a larger degree in sub-bands affected more by wind noise. As a result, it is possible, without performing signal reduction unnecessarily, to reduce wind noise in the medium band.

The output signals from the multipliers 53_1, 53_2, . . . , 53_*n* are merged together, and the medium-band MDCT coefficient resulting from the merging is, as the output signal of the signal reducer 53 (i.e. the second corrected sound signal), to the restored signal generator 61 and to the signal merger 55.

Figure 7:
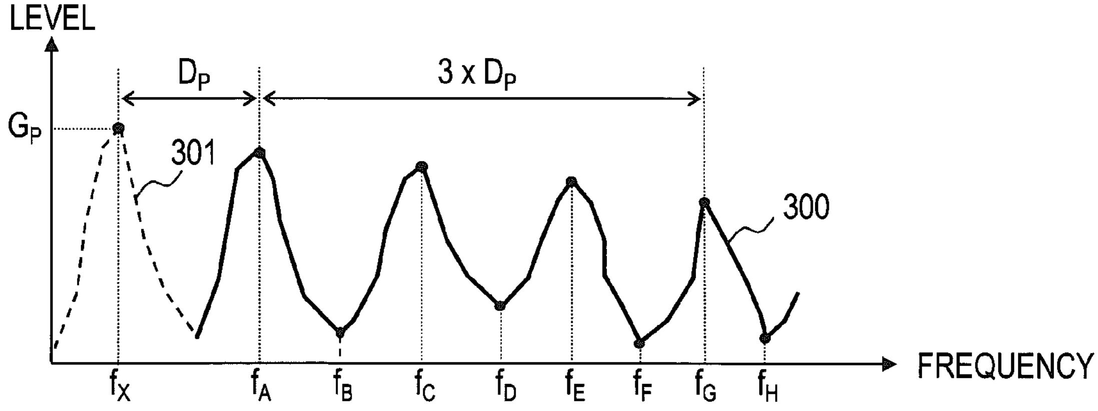
FIG. 7 is a frequency spectrum diagram illustrating the method by which the restored signal generator in FIG. 5 restores a signal.

The restored signal generator 61 predicts, from the harmonic structure in the medium band as contained in the output signal of the signal reducer 53, the harmonic structure in the low band, and thereby restores the frequency-axial sound signal in the low band. The method of the restoration here will now be described with respect to a frame of interest, with reference to FIG. 7. In FIG. 7, the serrated solid line 300 represents the frequency spectrum in the medium band in the frame of interest as fed to the restored signal generator 61. In this example (Example 2), the frequency spectrum 300 is defined by the output signal of the signal reducer 53.

In FIG. 7, the horizontal axis represents the frequency, and the vertical axis represents the level of the frequency spectrum. The level of the frequency spectrum is given by the values of the MDCT coefficients. FIG. 7 shows a case in which the frame of interest includes a pitch. When the frame of interest includes a pitch, the frequency spectrum varies periodically, running between minima and maxima (local minima and maxima) periodically. Suppose now that the frequency spectrum 300 has maxima at frequencies $f_A$, $f_C$, $f_E$, and $f_G$ and minima at frequencies $f_B$, $f_D$, $f_F$, and $f_H$. Here, $f_A<f_B<f_C<f_D<f_E<f_F<f_G<f_H$.

The restored signal generator 61 detects from the frequency spectrum 300 the frequencies $f_A$, $f_B$, $f_C$, $f_D$, $f_E$, $f_F$, $f_G$, and $f_H$, and calculates the difference between every two mutually adjacent of the minima and maxima. If any difference is larger than a predetermined difference threshold value, the frequency component that has the maximum corresponding to that difference is judged to be a harmonic component (with respect to the pitch). For example, the difference obtained by subtracting the level at the frequency $f_B$ from the level at the frequency $f_A$ in the frequency spectrum 300 is compared with the just-mentioned difference threshold value; if the former is equal to or larger than the latter, the component of the frequency $f_A$ is judged to be a harmonic component and, if the former is smaller than the latter, the component of the frequency $f_A$ is judged not to be a harmonic component. The frequencies corresponding to the other maxima and minima are handled similarly.

Suppose now that the frequencies $f_A$, $f_C$, $f_E$, and $f_G$ are judged to be harmonic components (those with respect to the pitch). In this case, the restored signal generator 61 predicts from the frequency differences between the mutually adjacent harmonic components the pitch interval Dp. For example, the average of the frequency difference ($f_A-f_C$), ($f_C-f_E$), and ($f_E-f_G$) is taken as the pitch interval Dp. Moreover, the restored signal generator 61 predicts from the level of the frequency spectrum 300 at the frequencies $f_A$, $f_C$, $f_E$, and $f_G$ the level Gp of the pitch.

Figure 8:
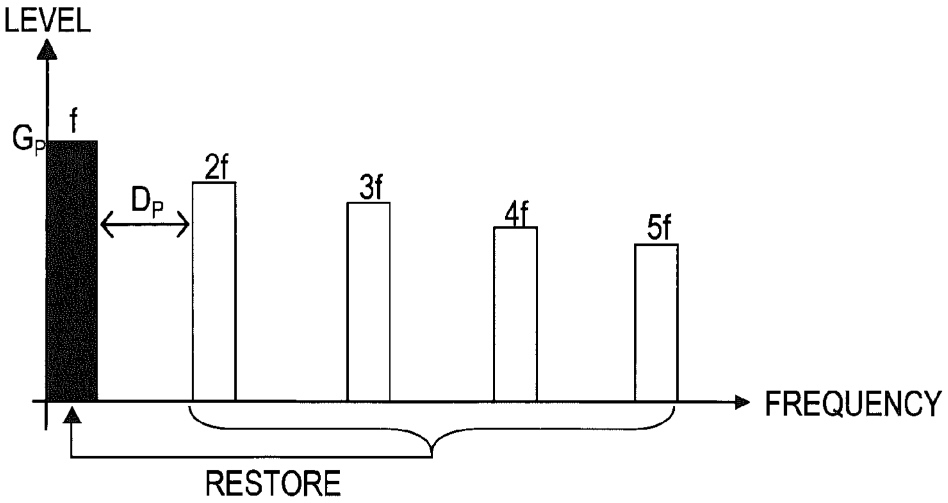
FIG. 8 is a diagram illustrating the method by which the restored signal generator in FIG. 5 restores a signal.

From pitch information including the predicted pitch interval Dp and pitch level Gp, the restored signal generator 61 predicts a signal in the low band and generates a restored signal. Specifically, it predicts that the fundamental frequency of the pitch exists at the frequency $f_X$ ($=f_A-Dp$) lower by the pitch interval Dp than the frequency of the lowest-frequency harmonic component within the medium band, and restores at that frequency $f_X$ a signal component of the pitch with the level Gp. How the restoration here is achieved is shown in FIGS. 7 and 8. In FIG. 7, the serrated broken line 301 represents the frequency spectrum of the frequency-axial restored signal in the low band as generated by the restored signal generator 61.

The level Gp is calculated by interpolating the level of the frequency spectrum 300 at the frequencies $f_A$, $f_C$, $f_E$, and $f_G$ with lines or curves on a coordinate plane representing the frequency spectrum 300. For example, in a case where the level at the frequencies $f_A$, $f_C$, $f_E$, and $f_G$ is found to have a value of 10, 8, 6, and 4 respectively, Gp is predicted to be 12.

The part of the restored signal other than at the frequency $f_X$ (i.e. the shape of the serrated line of the frequency spectrum 301 in FIG. 7) is predicted such that the level gradually decreases the farther away from the frequency $f_X$. In the prediction here, the frequency spectrum 300 may be taken into consideration. For example, the part of the restored signal other than at the frequency $f_X$ may be predicted with consideration given to the spectrum shape between the mutually adjacent maxima and minima in the frequency spectrum 300. For example, it is possible to expand the spectrum shape of the frequency spectrum 300 between the frequencies $f_B$ and $f_D$ in the level direction in the ratio of the level Gp to the level at the frequency $f_C$ (in the above specific example, 12/8=1.5) and use the resulting spectrum shape as that of the frequency spectrum 301. In the example shown in FIGS. 7 and 8, only one pitch is restored; in a case where the calculated pitch interval Dp is small, the restored signal may be generated such that a plurality of pitches lie in the low band.

The signal selector 62 receives the low-band signal in the original signal and the restored signal generated by the restored signal generator 61, and, for each frame, selects and outputs one of these signals according to the correlation value $K_A[m]$ calculated by the correlation-value calculator 51. Both the low-band signal in the original signal and the restored signal generated by the restored signal generator 61 are expressed in terms of the MDCT coefficients $L_{m,k}$ and $R_{m,k}$ in the range of $0 \leqq k \leqq 13$, but usually the values of the MDCT coefficients $L_{m,k}$ and $R_{m,k}$ differ between the two signals.

Specifically, when the m-th frame is of interest, the signal selector 62 compares the correlation value $K_A[m]$ with a predetermined threshold value; if the correlation value $K_A[m]$ is equal to or smaller than the predetermined threshold value, the signal selector 62 judges that there is wind noise, and thus selects and outputs the restored signal corresponding to the m-th frame and, if the correlation value $K_A[m]$ is larger than the predetermined threshold value, the signal selector 62 judges that there is no wind noise, and thus selects and outputs the low-band signal in the original signal corresponding to the m-th frame. The output signal of the signal selector 62 is used as the output signal of the signal restorer 54 (i.e., the first corrected sound signal).

The signal merger 55 receives the output signals of the signal restorer 54 and the signal reducer 53, and also receives the high-band signal in the original signal intact. For each frame, the signal merger 55 merges together the output signal of the signal restorer 54, which represents the sound signal in the low band, the output signal of the signal reducer 53, which represents the sound signal in the medium band with wind noise reduced by signal reduction processing, and the signal in the high band in the original signal, and outputs the signal resulting from the merging as the output signal of the wind noise reducer 6*b* (i.e. the corrected signal). In Example 2, like the original signal, this corrected signal too is a frequency-axial sound signal composed of a plurality of channel signals.

In the audio signal processor 4 in FIG. 2, the corrected signal output from the signal merger 55 is quantized (by the AAC encoding method) so as to be converted into a bit stream as an encoded audio signal. This encoded audio signal (bit stream) is recorded to the recording medium 5 in FIG. 2.

Although the above description on principle does not discuss the signal processing of the L and R signals separately, as mentioned previously, the different portions within the wind noise reducer 6*b* perform necessary signal processing on each of the plurality of channel signals individually.

Specifically, the multiplier 53_*j* performs signal reduction processing on each of the L and R signals in the medium band in the original signal according to the correlation value calculated by the correlation-value calculator 52_*j* (as mentioned previously, j is an integer of 1 or more but n or less). The restored signal generator 61 creates pitch information of each of the L and R signals composing the output signal of the signal reducer 53, and generates a restored signal of the L and R signals according to their respective pitch information. According to the correlation value calculated by the correlation-value calculator 51, the signal selector 62 selects and outputs either the L and R signals in the low band in the original signal or the L and R signals in the restored signal. The signal merger 55 merges together the L signal in the output signal of the signal restorer 54, the L signal in the output signal of the signal reducer 53, and the L signal in the high band in the original signal, and merges together the R signal in the output signal of the signal restorer 54, the R signal in the output signal of the signal reducer 53, and the R signal in the high band in the original signal, so as to generate the corrected signal.

In this example (Example 2), the restored signal is generated based on the output signal of the signal reducer 53 (i.e. the signal in the medium band having undergone signal reduction processing); instead it is also possible to generate the restored signal based on the signal in the medium band in the original signal. In this case, preferably, instead of the output signal from the signal reducer 53, the signal in the medium band in the original signal is fed to the restored signal generator 61. First performing signal reduction processing to reduce wind noise and then extracting pitch information, however, yields more accurate information, and thus it is preferable to adopt the configuration shown in FIG. 5.

The correlation-value calculator 51 may be omitted from the wind noise reducer 6*b*. In a case where the correlation-value calculator 51 is omitted, the signal selector 62 too is omitted, and the signal restorer 54 unconditionally outputs the restored signal generated by the restored signal generator 61. Likewise, the wind noise checker 52 can be omitted from the wind noise reducer 6*b*. In a case where the wind noise checker 52 is omitted, the multiplier 53_*j* reduces the level of the signal in the medium band in the original signal by a prescribed reduction factor, and outputs the reduced signal. In a case where the correlation-value calculator 51 and the wind noise checker 52 are omitted, the input signal to the wind noise reducer 6*b* may be a monaural signal composed of a single channel signal.

In the above example, the wind noise reducer 6*b* is provided with, independently of each other, a correlation-value calculator 51 functioning as a wind noise checker for the low band and a wind noise checker 52 for the medium band, and the result of the check by the former is reflected only in the processing by the signal restorer 54, and the result of the check by the latter is reflected only in the processing by the signal reducer 53. Alternatively, the check result of each side may be used by the other side in the following manner. For example, it is possible to determine the reduction factor in the multiplier 53_*j* in the m-th frame based on the correlation value $K_A[m]$ calculated by the correlation-value calculator 51 and the correlation value $K_{Bj}[m]$ calculated by the correlation-value calculator 52_*j*. More specifically, for example, the reduction factor is increased not only as the correlation value $K_{Bj}[m]$ decreases but also as $K_A[m]$ decreases. Likewise, it is possible to make the signal selector 62 perform selection in the m-th frame based on the correlation value $K_A[m]$ calculated by the correlation-value calculator 51 and the correlation value $K_{Bj}[m]$ calculated by the correlation-value calculator 52_*j*.

The above description deals with an example of configuration where, by the signal selector 62, either the low-band signal in the original signal or the restored signal generated by the restored signal generator 61 is selectively output to the signal merger 55. Alternatively, it is also possible to use as the output signal of the signal restorer 54 a signal obtained by mixing the two signals. As the method for the mixing here, the one described in connection with Example 1 can be used. For example, preferably, in the m-th frame, the ratio in which the low-band signal in the original signal and the restored signal from the restored signal generator 61 are mixed is determined based on the correlation value $K_A[m]$.

Modified Examples of Signal Reduction Processing: In the signal reduction processing described above, by use of the multiplier 53_*j*, the level of each of the L and R signals in the medium band in the original signal is reduced, and the reduced signal is fed to the signal merger 55. Alternatively, processing as described below may be performed. Below will be described, in connection with the signal reduction processing in Example 2, a third and a fourth example of modified signal reduction processing. The third and fourth modified signal reduction processing are respectively versions adapted to Example 2 of the first and second modified signal reduction processing described in connection with Example 1.

The third modified signal restoration processing will now be described. For the sake of concreteness, first, of the n sub-bands, the one corresponding to the correlation-value calculator 52_1 will be taken as of interest. In the third modified signal reduction processing, the signal reducer 53 compares the correlation value $K_{B1}[m]$ calculated by the correlation-value calculator 52_1 with a predetermined threshold value $K_{THB1}$. As described previously, the correlation value $K_{B1}[m]$ indicates the degree of effect of wind noise in a particular band in the m-th frame. On the other hand, the threshold value $K_{THB1}$ represents the reference degree of effect to be contrasted with that degree of effect. When the correlation value $K_{B1}[m]$ is smaller than the threshold value $K_{THB1}$, it is judged that the effect of wind noise in the particular band in the m-th frame is relatively large; when the correlation value $K_{B1}[m]$ is larger than the threshold value $K_{THB1}$, it is judged that the effect is relatively small (the same is true with the correlation values $K_{B2}[m]$ to $K_B[m]$, and this applies to the fourth modified signal reduction processing as well).

When the correlation value $K_{B1}[m]$ is smaller than the threshold value $K_{THB1}$, the signal reducer 53 averages the MDCT coefficients $L_{m,k}$ and $R_{m,k}$ in the range of $14 \leqq k \leqq k_1$ included in the original signal to calculate the MDCT coefficient $(L_{m,k}+R_{m,k})/2$, and deals with this MDCT coefficient $(L_{m,k}+R_{m,k})/2$ as the MDCT coefficients $L_{m,k}$ and $R_{m,k}$ in the range of $14 \leqq k \leqq k_1$ to be output from the signal reducer 53.

By contrast, when the correlation value $K_{B1}[m]$ is larger than the threshold value $K_{THB1}$, the signal reducer 53 does not perform the above averaging, and deals with the MDCT coefficients $L_{m,k}$ and $R_{m,k}$ in the range of $14 \leqq k \leqq k_1$ included in the original signal intact as the MDCT coefficients $L_{m,k}$ and $R_{m,k}$ in the range of $14 \leqq k \leqq k_1$ to be output from the signal reducer 53 (alternatively, the previously described signal reduction processing by the multiplier 53_1 may be performed).

The above processing is performed for each of the n sub-bands individually. Let us introduce a variable j for generalization. The MDCT coefficients $L_{m,k}$ and $R_{m,k}$ in the range of $k_{j-1} < k \leqq k_j$ to be output from the signal reducer 53 are referred to as MDCT coefficients $L_{m,k}'$ and $R_{m,k}'$. It is assumed that, as mentioned previously, $14 < k_1 < k_2 < \ldots < k_{n-1} < k_n = 64$, and in addition that "$k_0 = 13$".

For each of j=1, 2, . . . , n, the signal reducer 53 compares the correlation value $K_{Bj}[m]$ calculated by the correlation-value calculator 52_*j* with a predetermined threshold value $K_{THBj}$. When the correlation value $K_{Bj}[m]$ is smaller than the threshold value $K_{THBj}$, the signal reducer 53 averages the MDCT coefficients $L_{m,k}$ and $R_{m,k}$ in the range of $k_{j-1} < k \leqq k_j$ included in the original signal to calculate the MDCT coefficient $(L_{m,k}+R_{m,k})/2$, and outputs this MDCT coefficient $(L_{m,k}+R_{m,k})/2$ as the MDCT coefficients $L_{m,k}'$ and $R_{m,k}'$ in the range of $k_{j-1} < k \leqq k_j$. By contrast, when the correlation value $K_{Bj}[m]$ is larger than the threshold value $K_{THBj}$, the signal reducer 53 does not perform the above averaging, and outputs the MDCT coefficients $L_{m,k}$ and $R_{m,k}$ in the range of $k_{j-1} < k \leqq k_j$ included in the original signal intact as the MDCT coefficients $L_{m,k}'$ and $R_{m,k}'$ in the range of $k_{j-1} < k \leqq k_j$ (alternatively, the previously described signal reduction processing by the multiplier 53_*j* may be performed).

The above averaging makes the effect of wind noise even between the different channels, and thereby reduces the noise level in a channel that is being affected relatively much by wind noise. Moreover, performing signal reduction processing for each sub-band helps efficiently reduce the noise level only in a band affected by wind noise.

The fourth modified signal restoration processing will now be described. For the sake of concreteness, first, of the n sub-bands, the one corresponding to the correlation-value calculator 52_1 will be taken as of interest. In the fourth modified signal reduction processing, the signal reducer 53 compares the correlation value $K_{B1}[m]$ calculated by the correlation-value calculator 52_1 with a predetermined threshold value $K_{THB1}$. When the correlation value $K_{B1}[m]$ is smaller than the threshold value $K_{THB1}$, the signal reducer 53 identifies, of the MDCT coefficients $L_{m,k}$ and $R_{m,k}$ in the range of $14 \leqq k \leqq k_1$ included in the original signal, the one having the smaller signal level (i.e. whichever MDCT coefficient has the smaller absolute value) as the minimum sound signal and the other (i.e. whichever MDCT coefficient has the larger absolute value) as the non-minimum sound signal, and replaces the non-minimum sound signal with the minimum sound signal.

Specifically, when the correlation value $K_{B1}[m]$ is smaller than the threshold value $K_{THB1}$, if, of the MDCT coefficients $L_{m,k}$ and $R_{m,k}$ in the range of $14 \leqq k \leqq k_1$ included in the original signal, for example, the MDCT coefficient $R_{m,k}$ is identified as the minimum sound signal, this MDCT coefficient $R_{m,k}$ representing the minimum sound signal is output as the MDCT coefficient $L_{m,k}'$ in the range of $14 \leqq k \leqq k_1$ and as the MDCT coefficient $R_{m,k}'$ in the range of $14 \leqq k \leqq k_1$.

By contrast, when the correlation value $K_{B1}[m]$ is larger than the threshold value $K_{THB1}$, the above replacement is not performed, and the MDCT coefficients $L_{m,k}$ and $R_{m,k}$ in the range of $14 \leqq k \leqq k_1$ included in the original signal are intact output as the MDCT coefficients $L_{m,k}'$ and $R_{m,k}'$ in the range of $14 \leqq k \leqq k_1$ (alternatively, the previously described signal reduction processing by the multiplier 53_1 may be performed).

The above processing is performed for each of the n sub-bands individually. Let us introduce a variable j for generalization. For each of j=1, 2, . . . , n, the signal reducer 53 compares the correlation value $K_{Bj}[m]$ calculated by the correlation-value calculator 52_*j* with a predetermined threshold value $K_{THBj}$. When the correlation value $K_{Bj}[m]$ is smaller than the threshold value $K_{THBj}$, the signal reducer 53 identifies, of the MDCT coefficients $L_{m,k}$ and $R_{m,k}$ in the range of $k_{j-1} < k \leqq k_j$ included in the original signal, the one having the smaller signal level (whichever MDCT coefficient has the smaller absolute value) as the minimum sound signal and the other (whichever MDCT coefficient has larger absolute value) as the non-minimum sound signal, and replaces the non-minimum sound signal with the minimum sound signal. The signal reducer 53 then outputs the MDCT coefficients after this replacement as the MDCT coefficients $L_{m,k}'$ and $R_{m,k}'$ in the range of $k_{j-1} < k \leqq k_j$.

By contrast, when the correlation value $K_{Bj}[m]$ is larger than the threshold value $K_{THBj}$, the signal reducer 53 does not perform the above replacement, and outputs the MDCT coefficients $L_{m,k}$ and $R_{m,k}$ in the range of $k_{j-1} < k \leqq k_j$ included in the original signal intact as the MDCT coefficients $L_{m,k}'$ and $R_{m,k}'$ in the range of $k_{j-1} < k \leqq k_j$ (alternatively, the previously described signal reduction processing by the multiplier 53_*j* may be performed).

The above replacement makes it possible, without increasing the noise level in a channel that is being affected relatively little by wind noise, to reduce the noise level in a channel that is being affected relatively much by wind noise. Moreover, performing signal reduction processing for each sub-band helps efficiently reduce the noise level only in a band affected by wind noise.

The MDCT coefficients $L_{m,k}'$ and $R_{m,k}'$ in the range of $14 \leqq k \leqq 64$ obtained through the third or fourth modified signal reduction processing are merged together, and the medium-band MDCT coefficients resulting from the merging are fed, as the output signal of the signal reducer 53, to the restored signal generator 61 and to the signal merger 55.

The threshold value $K_{THBj}$ may be varied based on the result of the calculation by the correlation-value calculator 51 functioning as the wind noise checker for the low band. Specifically, for example, the threshold value $K_{THBj}$ is varied such that, the smaller the correlation value $K_A[m]$ found by the correlation-value calculator 51, the more likely the averaging or replacement described above is performed. That is, as the correlation value $K_A[m]$ decreases, the threshold value $K_{THBj}$ to be compared with the correlation value $K_{Bj}[m]$ is increased.

Example 3

Next, Example 3 will be described. In the Example 3, signal restoration processing is performed on the time axis, then time-to-frequency conversion is performed, and then signal reduction processing is performed on the frequency axis. The different kinds of processing are performed each in a region (a time region or frequency region) in which they can be realized more easily. In this way, it is possible to form a higher-accuracy, lighter-processing-load wind noise reducer.

Figure 9:
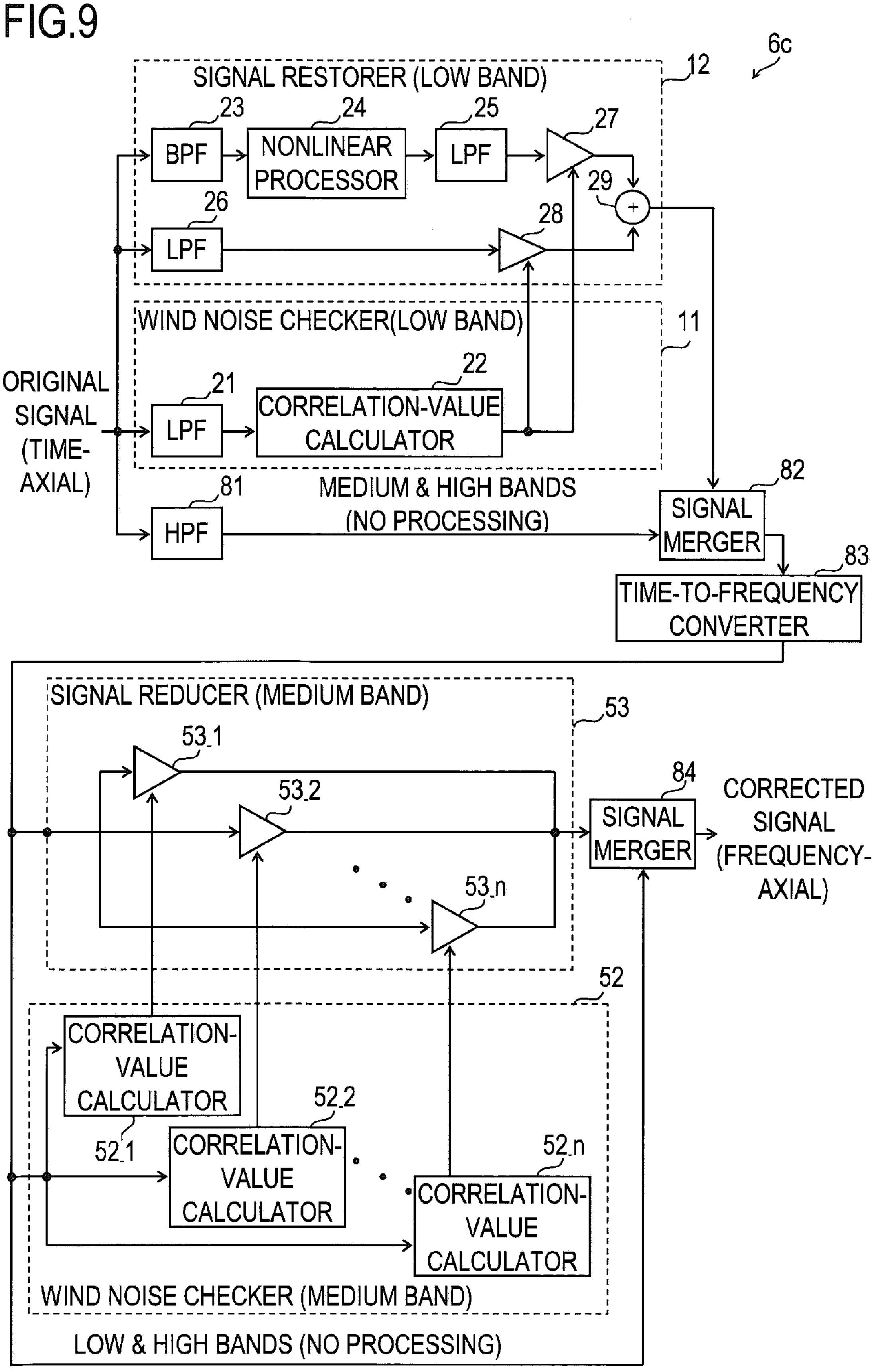
FIG. 9 is an internal block diagram of the wind noise reducer in FIG. 2, in Example 3 of the invention.

FIG. 9 is an internal block diagram of the wind noise reducer 6*c* in Example 3. The wind noise reducer 6*c* is used as the wind noise reducer 6 in FIG. 2. The wind noise reducer 6*c* comprises: a wind noise checker 11 functioning as a wind noise checker for the low band; a signal restorer 12; a wind noise checker 52 functioning as a wind noise checker for the medium band; a signal reducer 53; a HPF 81; a signal merger 82, a time-to-frequency converter 83; and a signal merger 84.

The input signal (input sound signal) to the wind noise reducer 6*c* is the same as that to the wind noise reducer 6*a* of FIG. 3, namely the L(t) and R(t). This input signal is corrected by the wind noise reducer 6*c*. Accordingly, the input signal to the wind noise reducer 6*c* is called the "original signal", and the output signal of the wind noise reducer 6*c* is called the "corrected signal".

In Example 3, the original signal is fed to each of the BPF 23, the LPFs 21 and 26, and the HPF 81.

The wind noise checker 11 and the signal restorer 12 in the wind noise reducer 6*c* are the same as those in the wind noise reducer 6*a* of FIG. 3. Specifically, according to the correlation value calculated by the wind noise checker 11, the signal restorer 12 performs weighted addition of the low-band signal of the original signal and the low-band signal of the restored signal, and thereby generates the output signal of the signal restorer 12 (i.e. the first corrected sound signal).

The HPF 81 passes only the medium-band and high-band components of the input signal to it.

The signal merger 82 adds up the output signal of the signal restorer 12, which represents the low-band sound signal with wind noise reduced by signal restoration processing, and the output signal of the HPF 81, and outputs the signal resulting from the addition to the time-to-frequency converter 83. In a case where the signal restorer 12 and the HPF 81 produce different delays, the differences among these delays needs to be canceled by delay processing within the signal merger 82 or in the stage preceding it before the addition processing by the signal merger 82. This is true with the weighted addition processing by the multipliers 27 and 28 and the adder 29.

The sound signal output from the signal merger 82 is a time-axial sound signal composed of L and R signals. The values of the L and R signals composing the output signal of the signal merger 82 differ from those of the L and R signals composing the original signal; in the following description, however, for the sake of convenience, the L and R signals composing the output signal of the signal merger 82 too will be represented by L(t) and R(t).

The time-to-frequency converter 83 converts the output signal of the signal merger 82 into a frequency-axial signal by time-to-frequency conversion. The time-to-frequency conversion here is similar to that described in connection with Example 2. Specifically, by time-to-frequency conversion, the time-to-frequency converter 83 converts, the L and R signals L(t) and R(t) composing the output signal of the signal merger 82, which are sampled at time intervals of $\Delta t$ in the direction of the time axis, into L and R signals L(f) and R(f) sampled at frequency intervals of $\Delta f$ in the direction of the frequency axis, and outputs the results. Since signal restoration processing has already been performed in the low band at the stage preceding the time-to-frequency converter 83, the values of the low-band components of the L and R signals L(f) and R(f) resulting from the conversion here differ from those of the original signal (the L and R signals L(f) and R(f) in Example 2) to the wind noise reducer 6*b* in FIG. 5; in Example 3, however, for the sake of convenience, the L and R signals output from the time-to-frequency converter 83 will be represented by L(f) and R(f).

Moreover, for the sake of concreteness, the following description assumes that the time-to-frequency converter 83 achieves time-to-frequency conversion by MDCT (modified discrete cosine transform) as in Example 2. In addition, the specific example of MDCT described in connection with Example 2 is applied also here (along with the specific values of N, M, m, K, etc.). Then the L and R signals L(f) and R(f) composing the output signal of the time-to-frequency converter 83 can be expressed in terms of MDCT coefficients $L_{m,k}$ and $R_{m,k}$.

Of the L and R signals L(f) and R(f) composing the output signal of the time-to-frequency converter 83, the signal whose frequency band belong to the medium band is fed to the wind noise checker 52 and to the signal reducer 53. Specifically, the MDCT coefficients $L_{m,k}$ and $R_{m,k}$ in the range of $14 \leqq k \leqq 64$ are fed to the wind noise checker 52 and to the signal reducer 53.

The wind noise checker 52 and the signal reducer 53 in the wind noise reducer 6*c* are the same as those in the wind noise reducer 6*b* of FIG. 5. Specifically, the medium band is subdivided into n sub-bands, and, for each of the sub-bands, the medium band of the output signal of the time-to-frequency converter 83 is reduced by a reduction factor commensurate with the correlation value calculated by the wind noise checker 52. The so reduced signals, that is, the output signals of the multipliers 53_1, 53_2, . . . , 53-*n*, are merged together, and the medium-band MDCT coefficients resulting from the merging are, as the output signal of the signal reducer 53 (i.e. the second corrected sound signal), to the signal merger 84. The merging together of the output signals of the multipliers 53_1, 53_2, . . . , 53_*n* may be regarded as being performed in the signal merger 84.

Of the L and R signals L(f) and R(f) composing the output signal of the time-to-frequency converter 83, the one whose frequency band belong to the low and high bands is fed intact to the signal merger 84. For each frame, the signal merger 84 merges the low- and high-band signal fed directly from the time-to-frequency converter 83 with the output signal of the signal reducer 53, and the outputs the signal resulting from the merging as the output signal of the wind noise reducer 6*c* (i.e. the corrected signal). In Example 3, this corrected signal is a frequency-axial sound signal composed of a plurality of channel signals.

In the audio signal processor 4 in FIG. 2, the corrected signal output from the signal merger 84 is quantized by the AAC encoding method so as to be converted into a bit stream as an encoded audio signal. This encoded audio signal (bit stream) is recorded to the recording medium 5 in FIG. 2.

Although the above description on principle does not discuss the signal processing of the L and R signals separately, as mentioned previously, the different portions within the wind noise reducer 6*c* perform necessary signal processing on each of the plurality of channel signals individually.

Specifically, the HPF 81 passes, of the original signal, only the medium- and high-band components of the L signal and the medium- and high-band components of the R signal. The signal merger 82 adds up the L signal in the output signal of the signal restorer 12 and the L signal in the output signal of the HPF 81, and adds up the R signal in the output signal of the signal restorer 12 and the R signal in the output signal of the HPF 81. The time-to-frequency converter 83 performs time-to-frequency conversion on each of the time-axial L and R signals fed to it. The signal merger 84 merges together the L signal in the output signal of the signal reducer 53 and the low- and high-band L signal in the output signal of the time-to-frequency converter 83, and merges together the R signal in the output signal of the signal reducer 53 and the low- and high-band R signal in the output signal of the time-to-frequency converter 83, to thereby generate the corrected signal. The LPF 21 etc. operate as described in connection with Example 1 or 2.

As described in connection with Example 1, the wind noise checker 11 may be omitted from the wind noise reducer 6*c*. In a case where the wind noise checker 11 is omitted, the multipliers 27 and 28 and the adder 29 perform weighted addition of the output signal values of the LPFs 25 and 26 in a prescribed ratio, and thereby generate the output signal of the signal restorer 12 (i.e. the first corrected sound signal). Moreover, as described in connection with Example 2, the wind noise checker 52 may be omitted from the wind noise reducer 6*c*. In a case where the wind noise checker 52 is omitted, the multiplier 53_*j* reduces the level of the signal in the medium band in the output signal of the time-to-frequency converter 83 by a prescribed reduction factor, and outputs the reduced signal. In a case where the wind noise checkers 11 and 52 are omitted, the input signal to the wind noise reducer 6*c* may be a monaural signal composed of a single channel signal.

In the wind noise reducer 6*c*, the wind noise checker 11 for the low band and the wind noise checker 52 for the medium band are provided independently, and the result of the check by the former is reflected only in the processing by the signal restorer 12, and the result of the check by the latter is reflected only in the processing by the signal reducer 53. Alternatively, as described in connection with Example 2, the check result of each side may be used by the other side. Specifically, for example, with respect to a given frame of interest, based on the correlation value calculated by the correlation-value calculator 22 and the correlation value calculated by the correlation-value calculator 52_*j*, the reduction factor in the multiplier 53_*j* in the frame of interest is determined. More specifically, for example, the reduction factor is increased not only as the correlation value calculated by the correlation-value calculator 52_*j* decreases, but also as the correlation value calculated by the correlation-value calculator 22 decreases.

The third and fourth modified signal reduction processing described in connection with Example 2 is applicable to Example 3. Needless to say, in a case where the third or fourth modified signal reduction processing is applied to Example 3, "the output signal and the signal merger 55" in the description of the third and fourth modified signal reduction processing should be read instead as "the output signal of the time-to-frequency converter 83 and the signal merger 84" respectively. Moreover, in a case where the third or fourth modified signal reduction processing is applied to Example 3, the threshold value $K_{THBj}$ may be variably set according to the result of the check by the low-band wind noise checker 11. Specifically, for example, with respect to a given frame of interest, the threshold value $K_{THBj}$ is variably set such that, the smaller the correlation value found by the correlation-value calculator 22, the more likely the averaging or replacement described above is performed. That is, with respect to a given frame of interest, as the correlation value found by the correlation-value calculator 22 decreases, the threshold value $K_{THBj}$ to be compared with the correlation value $K_{Bj}[m]$ is increased.

With Examples 1 to 3, it is possible to eliminate the distortion in the low-band signal resulting from the processing for reducing wind noise. Moreover, also in the medium band, it is possible to reduce the effect of wind noise by signal reduction processing.

The Examples 1 to 3 each offer the following advantages:

The wind noise reducer 6*a* (FIG. 3) of Example 1 permits signal restoration processing and signal reduction processing to be performed concurrently, and requires processing in time regions alone, eliminating the need for time-to-frequency conversion;

The wind noise reducer 6*b* (FIG. 5) of Example 2 performs signal processing in frequency regions, permitting band-by-band processing to be performed intuitively, and allows the medium band, to which signal reduction processing is applied, to be subdivided easily, permitting signal reduction processing to be performed only in a band that is being affected by wind;

The wind noise reducer 6*c* (FIG. 9) of Example 3 can be easily incorporated in an encoder conforming to AAC or the like, proving to be highly practical.

Example 4

As described above, the wind noise reducer 6*c* of Example 3 can be easily incorporated in an encoder conforming to AAC or the like. For example, MDCT can be used for time-to-frequency conversion, and the resulting frequency-axial corrected signal can be used intact in the quantizing processing by the encoder. As an example dealing with incorporation into an encoder, Example 4 will now be described.

Figure 10:
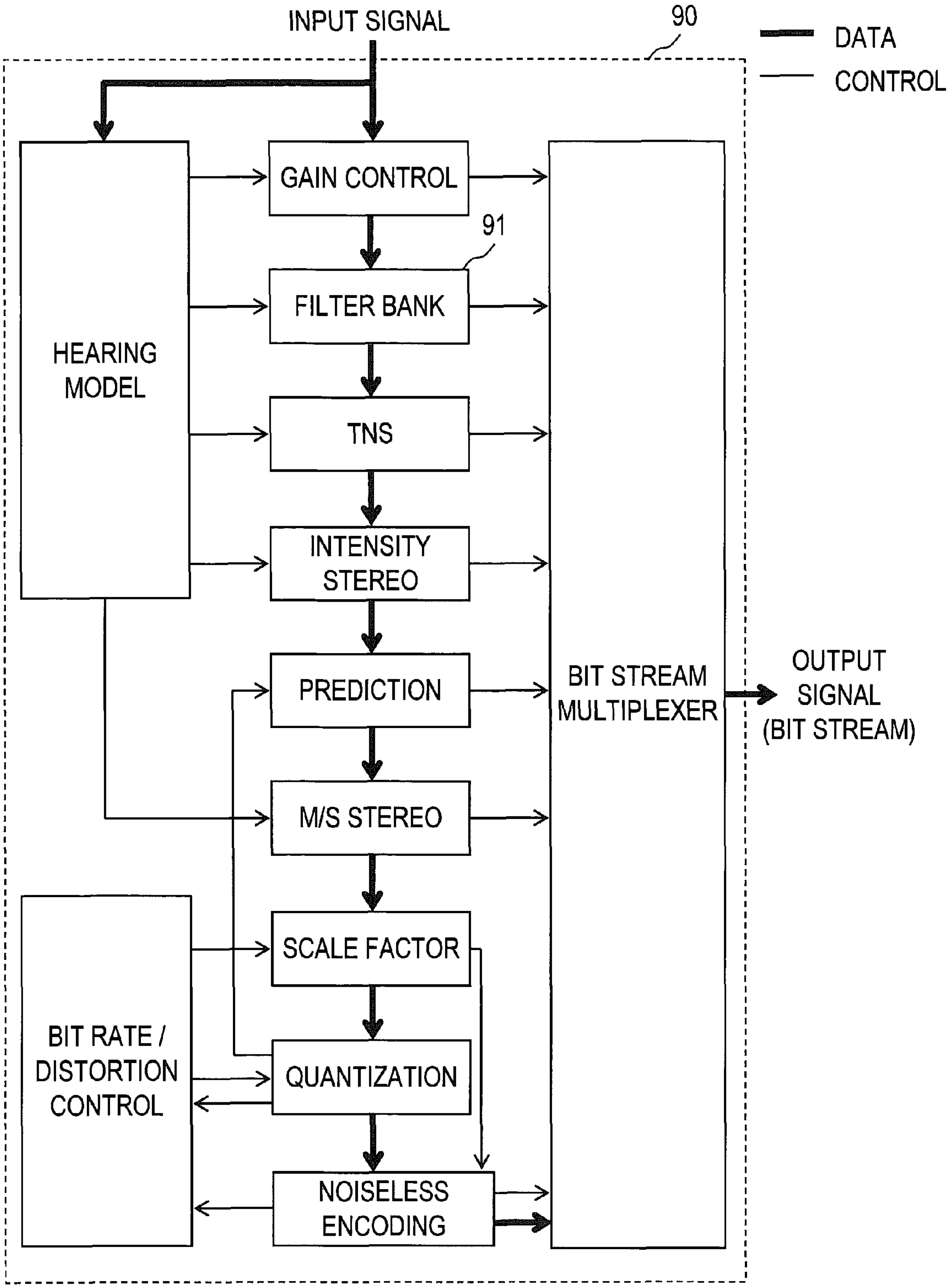
FIG. 10 is an internal block diagram of an AAC encoder usable in combination with the wind noise reducer of FIG. 9.
Figure 11:
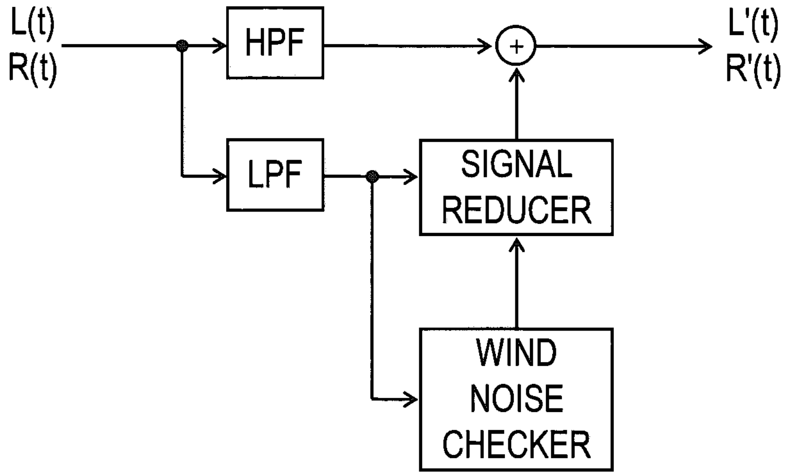
FIG.11 PRIOR ART
FIG. 11 is an internal block diagram of a conventional wind noise reduction device.

An internal block diagram of an AAC encoder 90 usable in combination with the wind noise reducer 6*c* of FIG. 9 is shown in FIG. 10. The AAC encoder 90 is incorporated in the audio signal processor 4 in FIG. 2. The different portions within the AAC encoder 90 operate in conformity with the AAC standard, and therefore no description will be given in this respect. The AAC encoder 90 includes a filter bank 91, which performs modified discrete cosine transform and which thus corresponds to the time-to-frequency converter 83 in FIG. 9.

Provided at the stage preceding the AAC encoder 90 are the wind noise checker 11, the signal restorer 12, the HPF 81, and the signal merger 82 in the wind noise reducer 6*c* in FIG. 9. The output signal of the signal merger 82 is fed to the AAC encoder 90 as the input signal to it. The medium band of the output signal of the filter bank 91, which corresponds to the output signal of the time-to-frequency converter 83, is corrected by the signal reducer 53, and the signal having undergone the correction (i.e. the corrected signal output from the signal merger 84 in FIG. 9) is fed to whichever portion needs the output signal of the filter bank 91 (namely, a TNS (temporal noise shaper) and a bit stream multiplexer). Through that correction, the bit stream output from the AAC encoder 90 is recorded to the recording medium 5 in FIG. 2.

In a case where the wind noise reducer (6*b* or 6*c*) is incorporated in an encoder like the AAC encoder 90, preferably, the band division is done to suit the audio format of the encoder into which it is incorporated. This helps simplify the processing. Specifically, for example, preferably, the MDCT coefficients $L_{m,k}$ and $R_{m,k}$ described in connection with Example 3 are given a form of expression (e.g. what value k can take etc.) comparable with those of the MDCT coefficients used in the encoder.

Moreover, in a case where the wind noise reducer (6*b* or 6*c*) is incorporated in an encoder like the AAC encoder 90, it may occur that time-axial sound signals overlap with each other between adjacent frames. Specifically, for example, in the case of the specific example of MDCT described in connection with Example 2 or 3, as shown in FIG. 6, between adjacent frames, an overlap occurs over 1024 samples of time-axial sound signals. In this case, to make the wind noise checking for the low band equivalent to that for the medium band, it is preferable that the wind noise checker 11 and the signal restorer 12 in the wind noise reducer 6*c* perform processing as described below.

Specifically, for each frame, the correlation-value calculator 22 in the wind noise checker 11 calculates the correlation value according to formula (1) given previously. This is realized by dealing with the "unit intervals" introduced in Example 1 as "frames" adapted to MDCT. This differs from the situation shown in FIG. 4, but adjacent unit intervals overlap with each other over half each unit interval. And, for example, based on the 1st to 2048th sound signals on the time axis, the correlation value for a given frame is calculated, and thereafter, based on the 1025th to 3072nd sound signals on the time axis, the correlation value for the next frame is calculated. The multipliers 27 and 28 and the adder 29 perform weighted addition of the output signal values of the LPFs 25 and 26 for the 1024 samples in the first half (or latter half) of the m-th frame according to formula (2) given previously based on the correlation value that the correlation-value calculator 22 has calculated for the m-th frame, and thereby forms the output signal of the signal restorer 12.

Example 5

In the examples described above, the output signals from the microphones are subjected on a real-time basis to correction processing (signal restoration processing and signal reduction processing) for reducing wind noise, and the resulting corrected signal is recorded to the recording medium 5 in FIG. 2. Here, when to perform correction processing is arbitrary.

For example, a pre-correction time-axial original signal based on the output signals of the microphones MIC1 and MIC2, or a pre-correction frequency-axial original signal, is preliminarily recorded as raw data to the recording medium 5. Needless to say, for this recording, signal processing such as compression processing may be performed as necessary. Then it is possible, for example when sound is reproduced, to reconstruct the pre-correction time-axial or frequency-axial original signal from the raw data and feed the reconstructed original signal to the wind noise reducer (6*a*, 6*b*, or 6*c*) to obtain the corrected signal. To reproduce sound, this corrected signal is output for playback.

As will be clear from the above description, the audio signal processor including the wind noise reducer (6*a*, 6*b*, or 6*c*) may be incorporated in a sound signal reproducing apparatus that reproduces a sound signal from the above raw data. Even in that case, the wind noise reducer functions effectively. That is, the invention can be applied also to sound signal reproducing apparatuses. By recording raw data when sound is collected and leaving the processing for correcting wind noise to a sound signal reproducing apparatus, it is possible to freely switch whether or not to perform the correction at the time of reproduction.

Although the description thus far has dealt with an example where the audio signal processor 4 is provided in an image-sensing apparatus 1, a similar audio signal processor may be provided in any other kind of sound-recording apparatus or apparatus furnished with sound-recording capability. Examples of other kinds of sound-recording apparatus or apparatus furnished with sound-recording capability include, for example, portable sound-recording apparatuses such as IC recorders and cellular phones furnished with sound-recording capability. These apparatuses are provided with the microphones MIC1 and MIC2, the audio signal processor 4, and the recording medium 5 shown in FIG. 2.

Modifications and Variations

The specific values given in the description above are merely examples, which, needless to say, may be modified to any other values. In connection with the first embodiment described above, modified examples or supplementary explanations applicable to it will be given below in Notes 1 to 4. Unless inconsistent, any part of the contents of these notes may be combined with any other.

Note 1: For the sake of concreteness, the above description deals with an example where modified discrete cosine transform (MDCT) is used for time-to-frequency conversion. Needless to say, this is merely example, and any other type of time-to-frequency conversion may be used instead.

Note 2: For the sake of simplicity, the above description deals with an example in which the number of microphones is limited to two and the sound signal composed of two channel signals is corrected. According to the invention, however, the number of microphones is not limited to two. Specifically, the technology described by way of examples above may be applied to a multi-channel signal composed of three or more channel signals based on the output signals of three or more microphones. In a similar manner as, in the examples, signal restoration processing and signal reduction processing are performed for each channel signal, when the technologies described by way of the examples are applied to a multi-channel signal, preferably, signal restoration processing and signal reduction processing are performed, in principle, for each channel signal.

In a case where the technology described by way of examples above is applied to a multi-channel signal composed of a 1st, a 2nd, . . . , and a q-th channel signal, the check for wind noise is performed, preferably, in the following manner (q is an integer of 3 or more).

For example, of the 1st to q-th channel signals, two are selected, and, with these two selected channel signals dealt with as the L and R signals mentioned above, the degree of effect of wind noise is checked through correlation value calculation in a similar manner as in the examples above.

Alternatively, for example, for every combination of two of the 1st to q-th channel signals, the correlation value indicating the cross-correlation between those two channel signals is found, and, based on the maximum value, average value, minimum value, etc. of the correlation values found for different combinations, the degree of effect of wind noise is checked.

Alternatively, for example, the correlation value indicating the cross-correlation among three or more of the 1st to q-th channel signals is found, and, based on this correlation value, the degree of effect of wind noise is checked.

The first to fourth modified signal reduction processing can be applied to a multi-channel signal.

In the case of Example 1, the 1st to q-th channel signals composing the multi-channel signal are fed to the BPF 30. Then, in a case where the first modified signal reduction processing is applied to the multi-channel signal, the degree of effect of wind noise is checked through correlation value calculation. If it is judged that the degree of effect is relatively large, the 1st to q-th channel signals having passed through the BPF 30 are averaged, and, based on the averaged channel signals, the output signal of the signal reducer 13 is formed.

In a case where the second modified signal reduction processing is applied to the multi-channel signal, the degree of effect of wind noise is checked through correlation value calculation, and, if it is judged that the degree of effect is relatively large, the 1st to q-th channel signals having passed through the BPF 30 are compared with one another. Then, of the 1st to q-th channel signals having passed through the BPF 30, the one having the lowest signal level is identified as the minimum sound signal and all the other as the non-minimum sound signals. Then, all the non-minimum sound signals are replaced with the minimum sound signal, and, based on the channel signals after the replacement, the output signal of the signal reducer 13 is formed.

In a case where the third modified signal reduction processing is applied to the multi-channel signal, the medium band is subdivided into n sub-bands, and, for each of the n sub-bands, the degree of effect of wind noise is checked through correlation value calculation. Then, for each of the n sub-bands, whether the degree of effect is large or small is checked and, for a band in which the degree of effect is relatively large, the 1st to q-th frequency-axial channel signals (i.e. the MDCT coefficients) are averaged, and, based on the averaged channel signals, the output signal of the signal reducer 53 is formed.

Also in a case where the fourth modified signal reduction processing is applied to the multi-channel signal, the medium band is subdivided into n sub-bands, and, for each of the n sub-bands, the degree of effect of wind noise is checked through correlation value calculation. Then, for each of the n sub-bands, whether the degree of effect is large or small is checked and, for a band in which the degree of effect is relatively large, which of the 1st to q-th frequency-axial channel signals (i.e. the MDCT coefficients) is larger or smaller than which is evaluated so that the one having the lowest signal level is identified as the minimum sound signal and all the other as the non-minimum sound signals. Then, all the non-minimum sound signals are replaced with the minimum sound signal, and, based on the channel signals after the replacement, the output signal of the signal reducer 53 is formed.

Note 3: The wind noise reducers 6*a*, 6*b*, and 6*c* shown in FIGS. 3, 5, and 9 can be realized in hardware, software, or in a combination of hardware and software. When the wind noise reducer 6*a*, 6*b*, or 6*c* is realized in software, the part of any block diagram corresponding to the portions realized in software serves as a functional block diagram of those portions.

All or part of the functions realized by the wind noise reducer (6*a*, 6*b*, or 6*c*) may be prepared in the form of a program so that, when this program is run on a program executing apparatus (for example, a computer), those functions are realized.

Note 4: For example, it can be said as follows:

A wind noise reduction device according to the invention includes a signal generator that generates by signal restoration processing a sound signal in a low band different from a sound signal in the low band contained in an input sound signal. In the wind noise reducer 6*a* or 6*c*, its portions referred to by the reference signs 23 to 25 form the signal generator; in the wind noise reducer 6*b*, the restored signal generator 61 functions as the signal generator (see FIGS. 3, 5, and 9).

The function of a first corrector that generates a corrected sound signal in the low band is assumed by, in the wind noise reducer 6*a* or 6*c*, the signal restorer 12 and, in the wind noise reducer 6*b*, the signal restorer 54.

The function of a second corrector that generates a corrected sound signal in the medium band is assumed by, in the wind noise reducer 6*a*, the signal reducer 13 and, in the wind noise reducer 6*b* or 6*c*, the signal reducer 53. This second corrector may be regarded as including or not including the wind noise checker 11 (FIG. 3) or the wind noise checker 52 (FIGS. 5 and 9).

Embodiment 2

Next, a second embodiment of the invention will be described, In the second embodiment, the values of the frequencies defining the low, medium, and high bands are different from those in the first embodiment. In the second embodiment, a band lying in the range of 50 Hz to 1 kHz is dealt with as the low band, a band lying in the range of 3 kHz to 5 kHz as the medium band, and a band lying on the high-frequency side of the medium band as the high band. These specific frequency values are merely examples, and may be modified in various ways.

Described first are the features common to, or referred to in the course of the description of, Examples 6 to 9 presented later in connection with the second embodiment.

Figure 14:
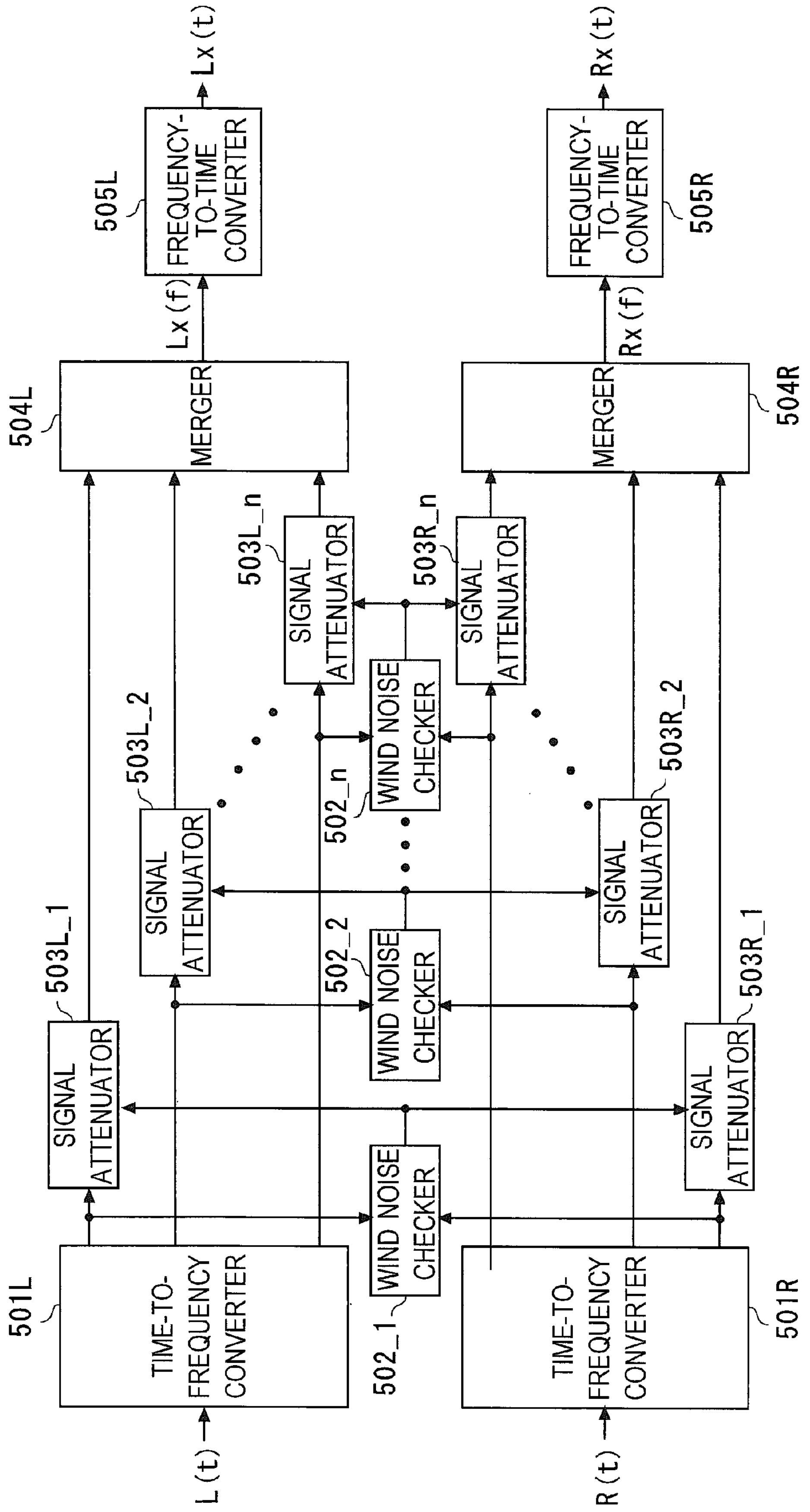
FIG. 14 is a functional block diagram of a wind noise reduction device according to a second embodiment (Embodiment 2) of the invention.

With reference to FIG. 14, the basic configuration of a wind noise reduction device according to the second embodiment will be described. FIG. 14 is a functional block diagram of a wind noise reduction device according to the second embodiment. The wind noise reduction device shown in FIG. 14 receives an L signal L(t) and an R signal R(t), both time-axial signals, acquired by a stereo microphone. Within the wind noise reduction device, these time-axial L and R signals L(t) and R(t) are converted into frequency-axial L and R signals L(f) and R(f).

The wind noise reduction device shown in FIG. 14 comprises: time-to-frequency converters 501 L and 501R that convert the time-axial L and R signals L(t) and R(t) into frequency-axial L and R signals L(f) and R(f) respectively; wind noise checkers 502_1 to 502_*n* that check the presence of wind noise by finding a correlation value in a specified frequency band within the entire frequency band of the L and R signals L(f) and R(f); signal attenuators 503L_1 to 503L_n and 503R_1 to 503R_n that attenuate the L and R signals, respectively, in the specified frequency band by an attenuation factor based on the result of the check by the wind noise checkers 502_1 to 502_*n*; a merger 504L that merges together the L signals from the signal attenuators 503L_1 to 503L_n; a merger 504R that merges together the R signals from the signal attenuators 503R_1 to 503R_n; and frequency-to-time converters 505L and 505R that convert the frequency-axial L signal Lx(f) resulting from the merging by the merger 504L and the frequency-axial R signal Rx(f) resulting from the merging by the merger 504R into time-axial L and R signals Lx(t) and Rx(t).

It should be noted that expressions like "attenuation of a (sound) signal" here are synonymous with expressions like "reduction of a signal level" in the first embodiment. Accordingly, for example, an expression "attenuate an L signal" here can be read as "reduce the level of an L signal".

In the following description, the L signals L(t), L(f), Lx(f), and Lx(t) are often referred to simply as the signals L(t), L(f), Lx(f), and Lx(t), and the R signals R(t), R(f), Rx(f), and Rx(t) are often referred to simply as the signals R(t), R(f), Rx(f), and Rx(t). Moreover, a channel signal corresponding to the L signals L(t), L(f), Lx(f), and Lx(t) is often referred to simply as an L signal, and a channel signal corresponding to the R signals R(t), R(f), Rx(f), and Rx(t) is often referred to simply as an R signal.

In the wind noise reduction device configured as described above, when the signals L(t) and R(t) are fed from the stereo microphone to the time-to-frequency converters 501 L and 501R, the time-to-frequency converters 501 L and 501R perform on those signals time-to-frequency conversion using DFT (discrete Fourier transform), DCT (discrete cosine transform), or the like. Through this time-to-frequency conversion, the signals L(t) and R(t), which are sampled at time intervals of $\Delta t$ in the time-axis direction, are converted into signals L(f) and R(f) that are sampled at frequency intervals of $\Delta f$ in the frequency-axis direction. Here it is assumed that N samples of signals L(t) are converted into M samples of signals L(f), and that N samples of signals R(t) are converted into M samples of signals R(f). For example, N=2048 and M=1024.

The frequency-axial signals L(f) and R(f) output from the time-to-frequency converters 501 L and 501R are each subdivided into n parts (where n is an integer of 2 or more).

Figure 15A:
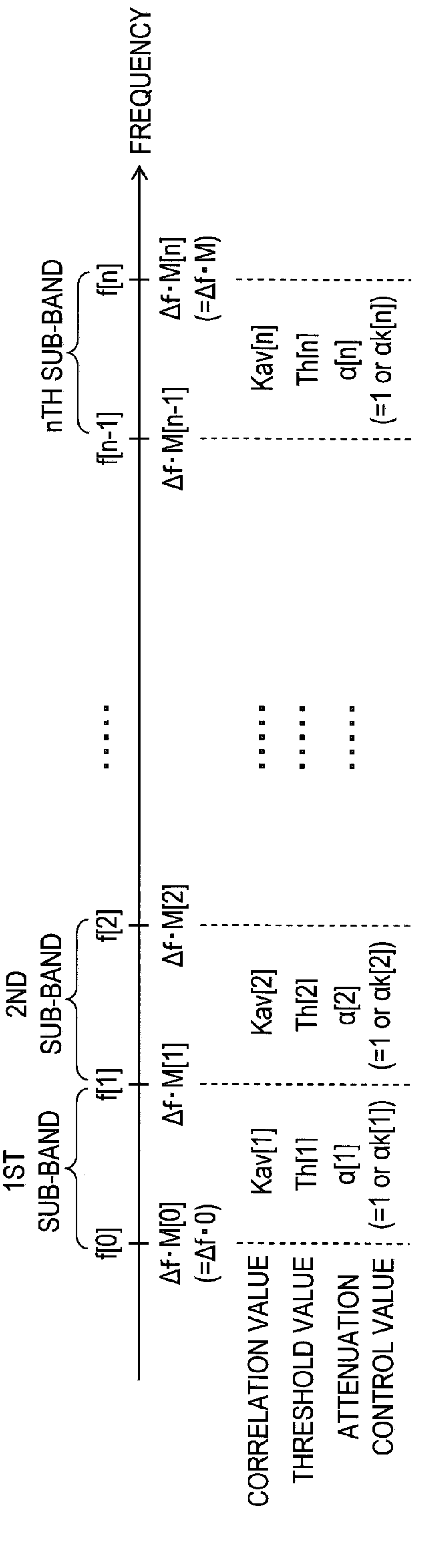
FIG. 15A is a conceptual diagram showing the n sub-bands obtained by dividing the frequency band of a sound signal into n parts, in the second embodiments of the invention.

Let us introduce symbols f[0] to f[n] to represent different frequencies, and suppose now, as shown in FIG. 15A, that f[0]=Δf×M[0]=0, f[1]=Δf×M[1], f[2]=Δf×M[2], . . . , f[n−1]=Δf×M[n−1], f[n]=Δf×M[n] (in the unit of MHz), and that f[0]<f[1]<f[2]< . . . <f[n−1]<f[n]. Here, M[0]=0 and simultaneously M[n]=M.

The band in which the frequency f fulfills "f[0]≦f≦f[1]", the band in which the frequency f fulfills "f[1]≦f≦f[2]", . . . , the band in which the frequency f fulfills "f[n−1]≦f≦f[n]" are referred to as the 1st, 2nd, . . . , n-th sub-bands. FIG. 15A is a conceptual diagram of the n sub-bands. Also shown in FIG. 15A are the symbols representing the correlation value, threshold value, and attenuation control value calculated or set for each sub-band. What these symbols mean will be described later.

Figure 15B:
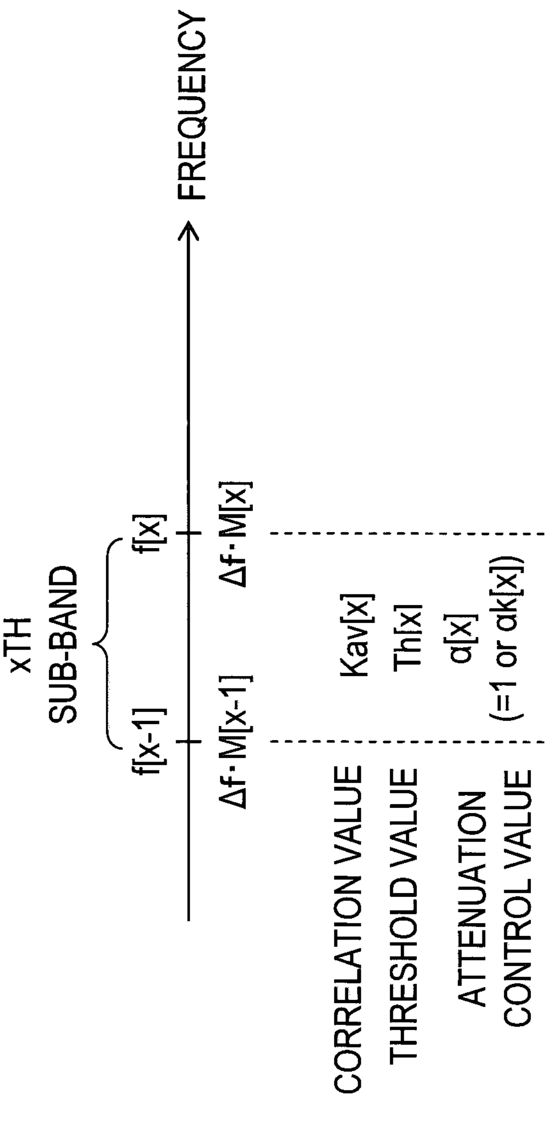
FIG. 15B is a conceptual diagram showing a single sub-band currently of interest, in the second embodiments of the invention.

Of the signals L(f) and R(f) output from the time-to-frequency converters 501 L and 501R, the signals within the 1st sub-band is fed to the wind noise checker 502_1 and to the signal attenuators 503L_1 and 503R_1, the signals within the 2nd sub-band is fed to the wind noise checker 502_2 and to the signal attenuators 503L_2 and 503R_2, . . . , the signals within the n-th sub-band is fed to the wind noise checker 502_*n* and to the signal attenuators 503L_n and 503R_n. That is, of the signals L(f) and R(f) output from the time-to-frequency converters 501 L and 501R, the signals within the x-th sub-band (i.e. the signals of the band components whose frequency f fulfills "f[x−1]<f≦f[x]") is fed to the wind noise checker 502_*x* and to the signal attenuators 503L_x and 503R_x. Here, x is an integer fulfilling the inequality "1≦x≦n". FIG. 15B, corresponding to part of FIG. 15A, is a conceptual diagram showing, as a sub-band of interest, the x-th sub-band alone.

Thus, the wind noise checker 502_1 and the signal attenuators 503L_1 and 503R_1 each receive M[1] samples of signals (i.e. M[1] signals) on the frequency axis;

the wind noise checker 502_2 and the signal attenuators 503L_2 and 503R_2 each receive (M[2]−M[1]) samples of signals on the frequency axis;

the wind noise checker 502_*n* and the signal attenuators 503L_n and 503R_n each receive (M[n]−M[n−1]) samples of signals on the frequency axis.

That is, the wind noise checker 502_*x* receives, as the signals in the x-th sub-band, (M[x]−M[x−1]) samples of signals L(f) and (M[x]−M[x−1]) samples of signals R(f);

the signal attenuator 503L_x receives, as the signals in the x-th sub-band, (M[x]−M[x−1]) samples of signals L(f); and the signal attenuator 503R_x receives, as the signals in the x-th sub-band, (M[x]−M[x−1]) samples of signals R(f).

The symbols f[1] to f[n−1] represent the border frequencies between adjacent ones of the n sub-bands obtained by the subdivision (see FIG. 15A), and M[x] represents the number of samples using the sampling frequency Δf from zero Hertz to the frequency f[x]. Hence Δf×M[x]=f[x].

The operation of the wind noise checkers 502_1 to 502_*n* will now be described. As their representative, the operation of the wind noise checker 502_*x* will be described. As described above, the wind noise checker 502_*x* receives, as the signals in the x-th sub-band, (M[x]−M[x−1]) samples of signals L(f) and (M[x]−M[x−1]) samples of signals R(f). Specifically, it receives L signals L(Δf×(M[x−1]+1)), L(Δf×(M[x−1]+2)), . . . , L(Δf×M[x]) at the frequencies Δf×(M[x−1]+1), Δf×(M[x−1]+2), . . . , Δf×M[x] and R signals R(Δf×(M[x−1]+1)), R(Δf×(M[x−1]+2)), . . . , R(Δf×M[x]) at the frequencies Δf×(M[x−1]+1), Δf×(M[x×1]+2), . . . , Δf×M[x].

First, the wind noise checker 502_*x* calculates the correlation values K[1], K[2], . . . , K[M[x]−M[x−1]] for the frequencies Δf×(M[x−1]+1), Δf×(M[x−1]+2), . . . , Δf×M[x] according to formula (5) below. Formula (5) is for calculating the correlation value K[y] for the frequency Δf×(M[x−1]+y) (where y is an integer). That is, the correlation value K[y] for the frequency Δf×(M[x−1]+y) is calculated based on the L signal L(Δf×(M[x×1]+y)) and R signal R(Δf×(M[x×1]+y)).

$$K[y] = \frac{2\times L(\Delta f\times(M[x-1]+y))\times R(\Delta f\times(M[x-1]+y))}{(L(\Delta f\times(M[x-1]+y)))^2 + (R(\Delta f\times(M[x-1]+y)))^2} \tag{5}$$

Then the thus found correlation values K[1], K[2], . . . , K[M[x]−M[x−1]] are averaged to find the correlation value Kav[x] for the x-th sub-band. Specifically, the correlation value Kav[x] found by the wind noise checker 502_*x* is, as given by formula (6) below, the sum of the correlation values K[1], K[2], . . . , K[M[x]−M[x−1]] for the frequencies Δf×(M[x×1]+1), Δf×(M[x×1]+2), . . . , Δf×M[x], respectively, divided by the number of samples (M[x]−M[x−1]). The correlation value Kav[x] indicates the correlation (cross-correlation) between the L and R signals in the x-th sub-band: the larger the correlation value Kav[x], the higher the correlation; the smaller the correlation value Kav[x], the lower the correlation.

$$Kav[x] = \sum_{y=1}^{M[x]-M[x-1]} K[y]\times\frac{1}{M[x]-M[x-1]} \tag{6}$$

In this way, the correlation value Kav[x] for the band whose frequency f fulfills "f[x−1]<f≦f[x]"), that is, the correlation value Kav[x] for the x-th sub-band, is calculated. Then this correlation value Kav[x] is compared with a threshold value Th[x], and thereby it is checked whether or not wind noise is contained in the x-th sub-band. When the correlation value Kav[x] is larger than the threshold value Th[x] (i.e. when Kav[x]>Th[x] holds), it is judged that the correlation (cross-correlation) between the L and R signals in the x-th sub-band is high and that the L and R signals in the x-th sub-band contain no wind noise; by contrast, when the correlation value Kav[x] is equal to or smaller than the threshold value Th[x] (i.e. when Kav[x]≦Th[x] holds), it is judged that the correlation (cross-correlation) between the L and R signals in the x-th sub-band is low and that the L and R signals in the x-th sub-band contain wind noise.

The correlation value K[j] is the correlation value between the frequency-axial L and R signals at one of the frequencies discrete at intervals of Δf. The wind noise checkers 502__1 to 502__*n* each find the correlation values K[1], K[2], K[3], . . . in increasing order of frequency starting at the lowest frequency fed to the wind noise checkers.

The correlation values Kav[1] to Kav[n] represent the correlation values for the 1st to n-th sub-bands respectively, and the threshold values Th[1] to Th[n] are the threshold values set for the 1st to n-th sub-bands respectively for wind noise checking. How the Th[1] to Th[n] are set will be described later.

In this way, the wind noise checkers 502_1 to **502_*n* check the presence of wind noise based on the relationship between the correlation values Kav[1] to Kav[n] and the threshold values Th[1] to Th[n] respectively. Then, based on the results of the checking, the attenuation control values α[1] to α[n] for the signal attenuation processing performed in the signal attenuators 503L_1 to 503L_n and 503R_1 to 503R_n are set. Specifically, when the wind noise checker 502**_*x* checks the presence of wind noise, based on the result of the checking, the attenuation control value α[x] for the signal attenuation processing performed in the signal attenuators 503L_x and 503R_x is set.

If, in the wind noise checker 502_*x*, it is judged that there is no wind noise, the signal attenuators 503L_x and 503R_x perform no signal attenuation. Specifically, if, in wind noise checker 502_*x*, it is judged that there is no wind noise, the attenuation control value α[x] is set at 1, and thus the signals L(f) and R(f) in the x-th sub-band are, without being attenuated by the signal attenuators 503L_x and 503R_x, fed to the mergers 504L and 504R.

By contrast, if, in the wind noise checker 502_*x*, it is judged that there is wind noise, the attenuation control value α[x] is set at αk[x] (0<αk[x]<1); thus the signals L(f) and R(f) in the x-th sub-band are attenuated by the signal attenuators 503L_x and 503R_x, and the attenuated signals L(f) and R(f) are fed to the mergers 504L and 504R. As will be described later, the value represented by α[x] or αk[x] is used as the exponent (index) for the exponential calculation, or the factor for the multiplication, performed in signal attenuation processing. The closer the value represented by α[x] or αk[x] is to 1, the smaller the degree to which the sound signal is attenuated is; the closer the value is to 0, the larger the degree to which the sound signal is attenuated is.

When the attenuation control values α[1] to α[n] for all the sub-bands are set, according to the set attenuation control values α[1] to α[n], the signal attenuators 503L_1 *to* 503*L*_n perform calculation processing for attenuating the L signals L(f) in the sub-bands respectively and, according to the set attenuation control values α[1] to α[n], the signal attenuators 503R_1 to 503R_n perform calculation processing for attenuating the R signals R(f) in the sub-bands respectively. Now the operation of the signal attenuators 503L_1 to 503L_n and 503R_1 to 503R_n will be described more specifically. Here, as their representatives, the operation of the signal attenuators 503L_x and 503R_x will be described.

The signal attenuator 503L_x receives, of the signal L(f) output from the time-to-frequency converter 501 L, the signal in the x-th sub-band, that is, the L signal whose frequency f fulfills "f[x−1]<f≦f[x]" (see FIG. 15B). The L signal fed to the signal attenuator 503L_x can be expressed as L(Δf×(M[x−1]+1)) to L(Δf×M[x]). The signal attenuator 503L_x performs on the input L signal calculation according to the attenuation control value α[x]. Likewise, the attenuator 503R_x receives, of the signal R(f) output from the time-to-frequency converter 501 R, the signal in the x-th sub-band, that is, the R signal whose frequency f fulfills "f[x−1]<f≦f[x]". The R signal fed to the signal attenuator 503R_x can be expressed as R(Δf×(M[x−1]+1)) to R(Δf×M[x]). The signal attenuator 503R_x performs on the input R signal calculation according to the attenuation control value α[x]. The calculation using the attenuation control value α[x] will be described later.

Specifically, the signal attenuator 503L_x performs attenuation processing by performing calculation according to the attenuation control value α[x] on each of the L signals L(Δf×(M[x−1]+1)), L(Δf×(M[x−1]+2)), . . . , L(Δf×M[x]). The attenuated L signals Lx(Δf×(M[x−1]+1)), Lx(Δf×(M[x×1]+2)), . . . , Lx(Δf×M[x]) are fed to the merger 504L.

Likewise, the signal attenuator 503R_x performs attenuation processing by performing calculation according to the attenuation control value α[x] on each of the R signals R(Δf×(M[x−1]+1)), R(Δf×(M[x−1]+2)), . . . , R(Δf×M[x]). The attenuated R signals Rx(Δf×(M[x×1]+1)), Rx(Δf×(M[x−1]+2)), . . . , Rx(Δf×M[x]) are fed to the merger 504R.

The merger 504L adds up and thereby merges together the L signals in the sub-bands having undergone the calculation processing (including attenuation processing) by the signal attenuators 503L_1 *to* 503*L*_n respectively, and outputs the frequency-axial signal resulting from the addition/merging as an L signal Lx(f). The merger 504R adds up and thereby merges together the R signals in the sub-bands having undergone the calculation processing (including attenuation processing) by the signal attenuators 503R_1 to 503R_n respectively, and outputs the frequency-axial signal resulting from the addition/merging as an R signal Rx(f).

The L signal Lx(f) output from the merger 504L is composed of L signals Lx(Δf×1), Lx(Δf×2), Lx(Δf×3), . . . , and Lx(Δf×M). The L signal Lx(f) constantly varies with time, and the L signals Lx(Δf×1), Lx(Δf×2), Lx(Δf×3), . . . , and Lx(Δf×M) each vary with time. Accordingly, the merger 504L outputs the constantly varying signal Lx(Δf×1) time-sequentially, and outputs the constantly varying signal Lx(Δf×2) time-sequentially. The same is true with the L signals Lx(Δf×3) to Lx(Δf×M).

Likewise, the R signal Rx(f) output from the merger 504R is composed of R signals Rx(Δf×1), Rx(Δf×2), Rx(Δf×3), . . . , and Rx(Δf×M). The R signal Rx(f) constantly varies with time, and the R signals Rx(Δf×1), Rx(Δf×2), Rx(Δf×3), . . . , and Rx(Δf×M) each vary with time. Accordingly, the merger 504R outputs the constantly varying signal Rx(Δf×1) time-sequentially, and outputs the constantly varying signal Rx(Δf×2) time-sequentially. The same is true with the R signals Rx(Δf×3) to Rx(Δf×M).

The frequency-to-time converter 505L converts the frequency-axial L signal Lx(f) output from the merger 504L into a time-axial L signal Lx(t). Likewise, the frequency-to-time converter 505R converts the frequency-axial R signal Rx(f) output from the merger 504R into a time-axial R signal Rx(t). The signals Lx(t) and Rx(t) are, as signals with wind noise reduced, fed out of the wind noise reduction device.

By checking the presence of wind noise and performing wind noise reduction in each of the sub-bands as described above, it is possible to perform optimal reduction processing that suits the strength of wind. Here, there is no need for a wind pressure sensor or the like.

Method of Setting Attenuation Control Value: How the attenuation control value α[x] mentioned above is set will now be described. As described above, with respect to the x-th sub-band, if it is judged that there is no wind noise, the attenuation control value α[x] is set at 1; by contrast, if it is judged that there is wind noise, the attenuation control value α[x] is set at a value αk[x]. As described above, "0<αk[x]<1". How this value αk[x] is determined will be described. In the following description, the value Δk[x] at which the attenuation control value α[x] is set is also referred to as the attenuation control value.

Figure 16:
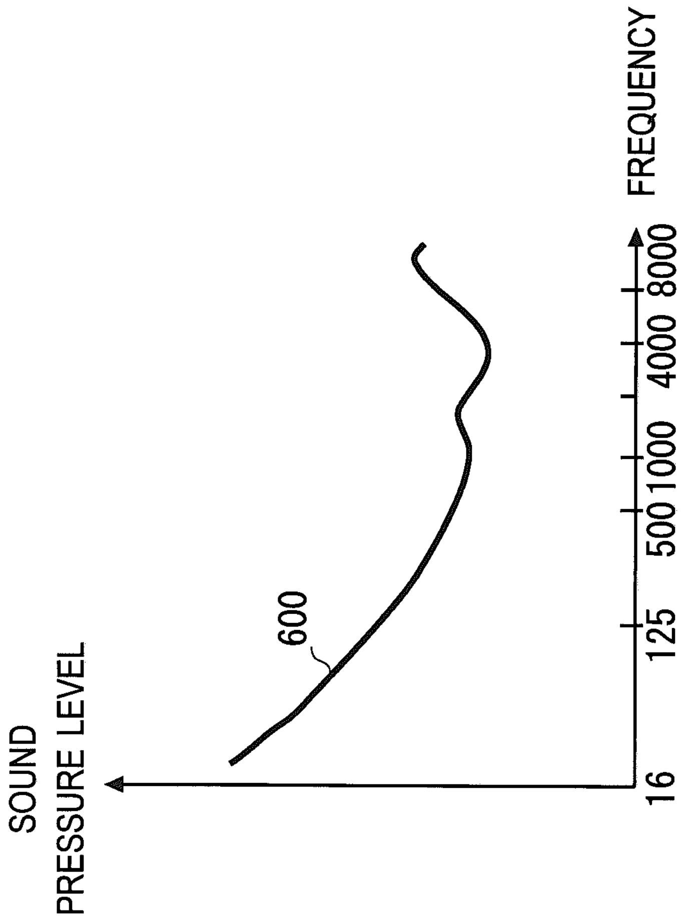
FIG. 16 is a graph showing the relation between frequency and sound pressure level along an equal-loudness curve.

First, the relationship between the sound pressure level of sounds of different frequencies and their magnitude as perceived by humans (hereinafter referred to as "loudness") will be described with reference to the loudness curve shown in FIG. 16. In the graph of FIG. 16, the horizontal axis corresponds to frequency (in the unit of MHz), and the vertical axis corresponds to sound pressure level. As shown in FIG. 16, connecting one after another the sound pressure levels (in the unit of dB) of equal loudness (in the unit of phon) at different frequencies forms an equal-loudness curve 600.

As will be understood from the equal-loudness curve 600 in FIG. 16, on the equal-loudness curve, the sound pressure level is lowest in the medium band (3 to 5 kHz). The lower the frequency is below the medium band, and the higher the frequency is above the medium band, the higher the sound pressure level on the equal-loudness curve is. This means that the human hearing is most sensitive in the medium band and grows less and less sensitive in the lower and higher bands.

On the other hand, as described previously, it is known that wind noise concentrates in the low band. In the low band, if the attenuation control value is too small, the degree of attenuation is so large that the components of the source sound other than wind noise is attenuated. This causes sound distortion, possibly making the source sound unhearable. With this taken into consideration, to minimize the sound distortion that may result from wind noise attenuation processing, the attenuation control values αk[1] to αk[n] are set one for each of the sub-bands (thus the attenuation control values αk[1] to αk[n] may differ among them).

Here, preferably, with consideration given to the fact that, in a band in which the sound pressure level on the equal-loudness curve 600 is relatively high, attenuation processing causes relatively much sound distortion, the attenuation control values αk[1] to αk[n] are set such that, for a band in which the sound pressure level on the equal-loudness curve 600 is relatively high, the attenuation control value is relatively large. The attenuation control values αk[1] to αk[n] may be set at values faithful to the equal-loudness curve 600, or at values roughly approximate to it. For the low band, however, since the effect of wind noise is large there, it is preferable that the relevant attenuation control values be set at values slightly smaller than those based on the equal-loudness curve 600.

Figure 17:
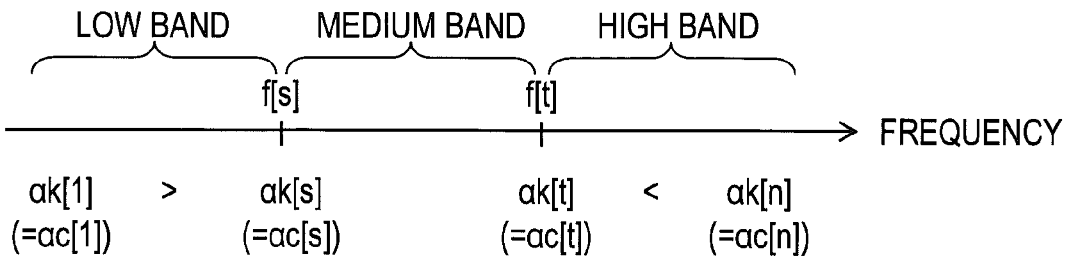
FIG. 17 is a diagram showing how the frequency band of a sound signal is divided into a low, a medium, and a high band, in the second embodiments of the invention.

The attenuation control values αk[1] to αk[n] may be fixed values. In that case, the attenuation control values αk[1] to αk[n] for the sub-bands are set at fixed values according to the sound pressure level on the equal-loudness curve 600. Suppose now that 1<s<t<n, and that, as shown in FIG. 17, the band higher than the frequency f[s] but equal to or lower than the frequency f[t] is the medium band (3 to 5 kHz). That is, in the example under discussion, suppose that the frequencies f[s] and f[t] are 3 kHz and 5 kHz respectively. Then, in a case where the attenuation control values are set at values roughly approximate to the equal-loudness curve 600, the attenuation control values αk[1] to αk[s] are set at fixed values αc[1] to αc[s] such that, the lower the corresponding frequencies are, the larger the attenuation control values are, and the attenuation control values αk[t] to αk[n] are set at fixed values αc[t] to αc[n] such that, the higher the corresponding frequencies are, the larger the attenuation control values are. Thus the fixed values αc[1] to αc[s] are substituted in the αk[1] to αk[s] respectively, and the fixed values αc[t] to αc[n] are substituted in the αk[t] to αk[n] respectively.

Figure 18:
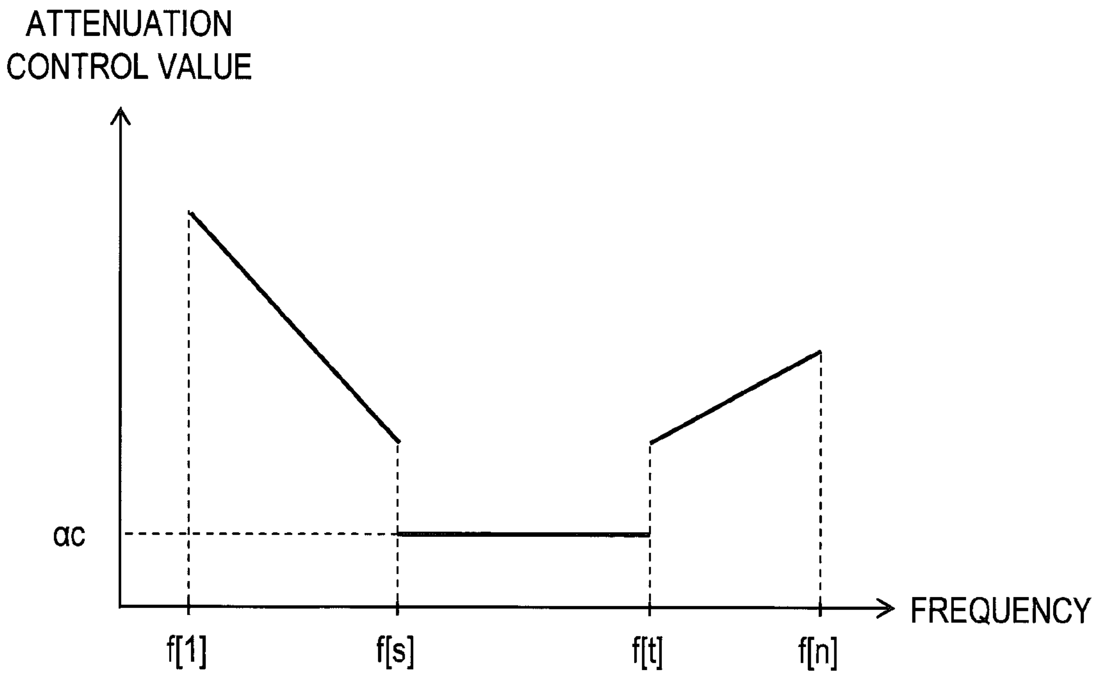
FIG. 18 is a diagram illustrating an example of how the attenuation control value is set in relation to frequency, in the second embodiments of the invention.

The attenuation control values αk[s+1] to αk[t−1] can be set at a value αc smaller than the above fixed values αc[s] and αc[t]. When these fixed values αc, αc[1] to αc[s], and αc[t] to αc[n] are adopted, then the following inequalities hold: "$0<\alpha c<\alpha c[s]\leqq\alpha c[s-1]\leqq \ldots \leqq\alpha c[1]<1$" and "$0<\alpha c<\alpha c[t]\leqq\alpha c[t+1]\leqq \ldots \leqq\alpha c[n]<1$". The frequency dependence of the attenuation control values as observed when these fixed values are adopted as the corresponding attenuation control values is shown in FIG. 18.

The attenuation control values αk[1] to αk[n] may be, instead of fixed, left variable. In that case, preferably, the values obtained by subtracting or adding variances from or to the above fixed values are adopted as the attenuation control values. Those variances may be set according to the above correlation values Kav[1] to Kav[n], or may be set according to the differences (Th[1]−Kav[1]) to (Th[n]−Kav[n]) between the threshold values Th[1] to Th[n] and the correlation values Kav[1] to Kav[n]. Here, preferably, according to the correlation values, or according to the differences between the threshold values and the correlation values, the variances to be subtracted or added are set one for each of the sub-bands.

Now, with respect to the x-th sub-band as one of the interest, an example of a specific method of setting the attenuation control value αk[x] by use of a variance will be described. As described above, when the fixed value corresponding to the attenuation control value αk[x] is αc[x], the attenuation control value αk[x] is set according to formula (7-1) or (7-2) below. When formula (7-1) is used, the value obtained by subtracting a first variance (1−αc[x])×(Th[x]−Kav[x]) from the fixed value αc[x] is adopted as the attenuation control value αk[x]. Hence αk[x]<αc[x]. When formula (7-2) is used, the value obtained by adding a second variance (1−αc[x])×Kav[x] to the fixed value αc[x] is adopted as the attenuation control value αk[x]. Hence αk[x]>αc[x]. The stronger wind noise is, the smaller the correlation value Kav[x] is, and the larger the value (Th[x]−Kav[x]) is. Hence, the stronger wind noise is, the larger the above first variance is, and the smaller the above second variance is. On the other hand, the smaller the attenuation control value αk[x] is, the larger the degree to which the sound signal is attenuated is. Since the degree of attenuation should be increased as wind noise becomes stronger, the attenuation control value αk[x] needs to be set at the smaller value the larger the effect of wind noise. This requirement is met according to formula (7-1) or (7-2).

$$\alpha k[x]=\alpha c[x]-(1-\alpha c[x])\times(Th[x]-Kav[x]) \quad (7\text{-}1)$$

$$\alpha k[x]=\alpha c[x]+(1-\alpha c[x])\times Kav[x] \quad (7\text{-}2)$$

By setting the attenuation control values based on a psychological model of the human hearing, such as a loudness curve, as described above, it is possible to make the sound signal having undergone wind noise reduction processing one with little distortion to the human hearing.

Although the above description deals with methods of setting the attenuation control values αk[1] to αk[n] based on a psychological model of the human hearing, such as a loudness curve, or based on the correlation values Kav[1] to Kav[n], it is also possible to set the αk[1] to αk[n] to suit the reproduction environment. The reproduction environment includes, for example, the size and diameter of the speakers from which the sound signals based on the signals Lx(t) and Rx(t) are output for playback.

Calculation Processing in Signal Attenuator: Now the calculation processing performed in the signal attenuators 503L_1 to 503L_n and 503R_1 to 503R_n according to the attenuation control values set as described above will be described. As their representatives, the calculation processing in the signal attenuators 503L_x and 503R_x will be described. The signal attenuators 503L_x and 503R_x perform calculation processing on the signals L(f) and R(f) in the x-th sub-band to output the signals Lx(f) and Rx(f) in the x-th sub-band. Here, for the sake of simplicity, the input signals to the signal attenuators 503L_x and 503R_x are also referred to simply as the signals L(f) and R(f), and the output signals from the signal attenuators 503L_x and 503R_x are also referred to simply as the signals Lx(f) and Rx(f) (i.e. with the limitation to the x-th sub-band omitted).

By use of the attenuation control value α[x] set, for example, by the wind noise checker 502_*x*, the signal attenuators 503L_x and 503R_x perform calculation processing according to formulae (8) and (9) respectively to generate the signals Lx(f) and Rx(f) (strictly speaking, the signals L(f), R(f), Lx(f), and Rx(f) in formulae (8) and (9) are those in the x-th sub-band). Specifically, exponential calculation using the attenuation control value α[x] as an exponent (index) is performed on the signals L(f) and R(f) to generate the signals Lx(f) and Rx(f).

$$Lx(f)=L(f)^{\alpha[x]} \tag{8}$$

$$Rx(f)=R(f)^{\alpha[x]} \tag{9}$$

When it is judged that there is no wind noise, the attenuation control value α[x] equals 1; hence formulae (8) and (9) are Lx(f)=L(f) and Rx(f)=R(f) respectively. Thus, when it is judged that there is no wind noise, the L and R signals input can be output without attenuation. By contrast, when it is judged that there is wind noise, the attenuation control value α[x] takes a value smaller than 1. Thus, according to formulae (8) and (9), the L and R signals input are attenuated.

In a case where calculation processing according to formulae (8) and (9) is performed, when, as described above, the value αk[x] adopted as the attenuation control value α[x] is set based on the sound pressure level on the equal-loudness curve, for example, the fixed value (corresponding to the above-mentioned αc[x]) of the attenuation control value for 100 to 300 Hz is 0.85, and the fixed value of the attenuation control value for 650 to 850 Hz is 0.80.

As a result of the attenuation control values being set in this way, in a band (100 to 300 Hz) where the sound pressure level on the equal-loudness curve is relatively high, the attenuation control values are relatively large. This makes it possible to obtain, for the source sound in that band (100 to 300 Hz), in which the human hearing has less sensitivity, the loudness that fits the human hearing. By contrast, in a band (650 to 850 Hz) where the human hearing is relatively sensitive, the attenuation control values are relatively low. This makes it possible to reproduce sound signals with wind noise reduced satisfactorily to the human hearing.

The calculation processing may be performed not according to formulae (8) and (9) but according to formulae (10) and (11) below to generate signals Lx(f) and Rx(f). Specifically, by use of the attenuation control value α[x] set by the wind noise checker 502_*x*, the signal attenuators 503L_x and 503R_x can generate the signals Lx(f) and Rx(f) according to formulae (10) and (11) respectively (strictly speaking, the signals L(f), R(f), Lx(f), and Rx(f) in formulae (10) and (11) are those in the x-th sub-band). In this case, multiplication using the attenuation control value α[x] as a factor is performed on the signals L(f) and R(f) to generate the signals Lx(f) and Rx(f).

$$Lx(f)=\alpha[x]\times L(f) \tag{10}$$

$$Rx(f)=\alpha[x]\times R(f) \tag{11}$$

In a case where signal attenuation is performed according to formulae (8) and (9), as compared with where it is performed according to formulae (10) and (11), it is possible to reduce wind noise more when the effect of wind noise is very large, and to reduce wind noise less when the effect of wind noise is no very large.

Presented below are Examples 6 to 9 as specific examples of the wind noise reduction device having the basic configuration described above. Among Examples 6 to 8 presented below, the method of determining the above-mentioned threshold value Th[x] for checking the presence of wind noise differs. Accordingly, the description of Examples 6 to 8 centers around the method of determining the threshold value Th[x].

Example 6

As an example of the wind noise reduction device having the configuration of FIG. 14, Example 6 will be described below. In Example 6, the threshold values Th[1] to Th[n] that the wind noise checkers 502_1 to 502_*n* use when checking the presence of wind noise are fixed.

Wind noise tends to occur in a frequency band ranging from the low band (50 Hz 5 to 1 kHz) to the medium band (3 to 5 kHz). Moreover, wind noise has the characteristics that it concentrates in the low band, and that it exerts the larger effect the lower the band. Accordingly, in Example 6, the threshold values Th[1] to Th[n] are fixed such that, the lower the frequency, the larger the corresponding threshold value. This makes more likely, the lower the frequency, a judgment that there is wind noise.

Specifically, the threshold values Th[1] to Th[n] are set at fixed values such that, the smaller the value of x, the larger the threshold value Th[x]. This setting makes it possible to check the presence of wind noise satisfactorily in a frequency band ranging from the low- to medium band, where wind noise mainly occurs. Here, preferably, the threshold values Th[1] to Th[n] are each set at 0.5 or more but 0.9 or less.

Example 7

As another example of the wind noise reduction device having the configuration of FIG. 14, Example 7 will be described below. In Example 7, the threshold values Th[1] to Th[n] that the wind noise checkers 502_1 to 502_*n* use when checking the presence of wind noise are variable, each varying every prescribed length of time T. In the following description, each time interval of the prescribed length of time T will be called a "frame". Starting at a reference point of time, every passage of the prescribed length of time T marks a 1st frame, a 2nd frame, . . . , a (F−1)-th frame, an F-th frame, and so forth (the reference point of time belongs to the 1st frame). Here, F represents an integer representing the frame number, fulfilling F≧2. The L and R signals are divided in the time direction with frames taken as unit intervals. The wind noise checkers 502_1 to 502_*n* check the presence of wind noise for each frame.

The threshold values Th[1] to Th[n] set for the 1st frame are represented by threshold values Th_1[1] to Th_1[n] respectively, and the threshold values Th[1] to Th[n] set for the 2nd frame are represented by threshold values Th_2[1] to Th_2 [n] respectively. Likewise, the threshold values Th[1] to Th[n] set for the (F−1)-th frame are represented by threshold values Th_(F−1) [1] to Th_(F−1) [n] respectively, and the threshold values Th[1] to Th[n] set for the F-th frame are represented by threshold values Th_F[1] to Th_F[n] respectively.

To check the presence of wind noise in the starting frame, namely the 1st frame, the threshold values Th_1[1] to Th_1 [n] are set at fixed values by the method described in connection with Example 6. In each of the following frames including the 2nd, the threshold values Th[1] to Th[n] in that—current—frame is set according to the result of the wind noise checking for the previous frame. Now, with the x-th sub-band taken as of interest, and the temporally adjacent (F−1)-th ad F-th frames taken as of interest, the method of setting the threshold value Th[x] used by the wind noise checker 502_*x* will be described. As practiced in the specific method described below, the threshold value Th[x] is so varied as to exhibit hysteresis (in other words, the threshold value Th[x] is given hysteresis).

First, a description will be given of how the threshold value is set when, in the (F-1)-th frame, it is judged that there is wind noise. When the correlation value Kav[x] is equal to or smaller than the threshold value Th_(F−1) [x] (i.e. when Kav[x]≦Th_(F−1) [x] holds), and thus it is judged that there is wind noise in the (F−1)-th frame, the threshold value Th_F [x] for wind noise checking in the F-th frame is set at a value larger by ΔTh than Th_(F−1) [x] (namely, Th_(F−1)[x]+ΔTh). Here, ΔTh>0. If, in the (F−1)-th frame, it is judged that there is wind noise, the probability is assumed to be high that there is wind noise also in the next frame, namely the F-th frame. With this taken into consideration, the threshold value Th_F[x] is so set as to make more likely a judgment that there is wind noise.

However, in a case where the upper limit value that the threshold value Th[x] can take is prescribed, the threshold value Th[x] is so set as not to exceed the upper limit value. For example, in a case where the upper limit value Thmax[x] is prescribed for the threshold value Th[x], it is checked whether or not the threshold value Th_(F−1)[x] in the (F−1)-th frame has reached the upper limit value Thmax[x]. If the threshold value Th_(F−1)[x] is equal to the upper limit value Thmax[x], the threshold value Th_F[x] in the F-th frame is set at the upper limit value Thmax[x], which is equal to the threshold value in the previous frame.

The upper limit value Thmax[x] may be equal (for example, 0.9) for all of Thmax[1] to Thmax[n], or may be different among Thmax[1] to Thmax[n] (i.e. the upper limit value may be made different among the different sub-bands). In a case where the upper limit value is made different among the different sub-bands, the method of setting the upper limit value may adopt the technology described in connection with Example 6. For example, the different upper limit values may be so set as to fulfill the inequality "Thmax[1] to Thmax[k]>Thmax[k+1] to Thmax[n]" (where 1<k<n and simultaneously (k+1)<n).

Next, a description will be given of how the threshold value is set when, in the (F−1)-th frame, it is judged that there is no wind noise. When the correlation value Kav[x] is larger than the threshold value Th_(F−1) [x] (i.e. when Kav[x]>Th_(F−1) [x] holds), and thus it is judged that there is no wind noise in the (F−1)-th frame, the threshold value Th_F[x] for wind noise checking in the F-th frame is set at a value smaller by ΔTh than Th_(F−1) [x] (namely, Th_(F−1)[x]−ΔTh). If, in the (F−1)-th frame, it is judged that there is no wind noise, the probability is assumed to be high that there is no wind noise also in the next frame, namely the F-th frame. With this taken into consideration, the threshold value Th_F[x] is so set as to make more likely a judgment that there is no wind noise.

However, in a case where the lower limit value that the threshold value Th[x] can take is prescribed, the threshold value Th[x] is so set as not to go below the lower limit value. For example, in a case where the lower limit value Thmin[x] is prescribed for the threshold value Th[x], it is checked whether or not the threshold value Th_(F−1)[x] in the (F−1)-th frame has reached the lower limit value Thmin[x]. If the threshold value Th_(F−1)[x] is equal to the lower limit value Thmin[x], the threshold value Th_F[x] in the F-th frame is set at the lower limit value Thmin[x], which is equal to the threshold value in the previous frame.

As with the upper limit value Thmax[x], the lower limit value Thmin[x] may be equal (for example, 0.5) for all of Thmin[1] to Thmin[n], or may be different among Thmin[1] to Thmin[n] (i.e. the lower limit value may be made different among the different sub-bands). In a case where the lower limit value is made different among the different sub-bands, the method of setting the lower limit value may adopt the technology described in connection with Example 6. For example, the different lower limit values may be so set as to fulfill the inequality "Thmin[1] to Thmin[k]>Thmin[k+1] to Thmin[n]" (where 1<k<n and simultaneously (k+1)<n).

Example 8

As yet another example of the wind noise reduction device having the configuration of FIG. 14, Example 8 will be described below. In Example 8, as in Example 7, the threshold values Th[1] to Th[n] are variable, each varying from one frame to another.

In Example 8, however, with consideration given to wind noise's characteristic that it concentrates in the low band, when it is judged that there is wind noise in the low band, within the same frame, the threshold values for bands other than the low band are set higher as a whole to make more likely, in all the sub-bands, a judgment that there is wind noise (the main difference from Example 7).

Now, assuming that the low band is the band in which the frequency f fulfils the inequality "f[0]<f≦f[s]" (see FIG. 17), the method of setting the threshold value in Example 8 will be described. In this case, to the low band belong the 1st to s-th sub-bands, and the threshold values set for the 1st to s-th sub-bands are Th[1] to Th[s] respectively. On the other hand, the (s+1)-th to n-th sub-bands do not belong to the low band, and the threshold values set for the (s+1)-th to n-th sub-bands are Th[s+1] to Th[n] respectively. First, the threshold values Th[1] to Th[s] are set at fixed values by the method described in connection with Example 6, and, for the 1st to s-th sub-bands, the presence of wind noise is checked.

Then, the number Nf of those of the 1st to s-th sub-bands in which it is judged that there is wind noise is counted, and the number Nf is compared with a predetermined value Nfth. Here, Nfth fulfills 1≦Nfth≦s. If the number Nf is equal to or larger than the predetermined value Nfth, the probability is assumed to be high that there is wind noise also in a frequency band higher than the frequency f[s], and thus the threshold values Th[s+1] to Th[n] are set at values larger by ΔTh than the fixed values set by the method described in connection with the Example 6. By contrast, if the number Nf is smaller than the predetermined value Nfth, the probability is assumed to be high that there is no wind noise also in a frequency band higher than the frequency f[s], and thus the threshold values Th[s+1] to Th[n] are set at values smaller by ΔTh than the fixed values set by the method described in connection with the Example 6.

Instead of all of the threshold values Th[s+1] to Th[n] for the sub-bands not belonging to the low band, only part of them may be varied according to the result of wind noise checking for the low band. Here, part of the threshold values Th[s+1] to Th[n] are, for example, those in bands (for example, in the medium band) where wind noise is relatively highly likely to occur. More specifically, for example, only the threshold values Th[s+1] to Th[k] for the bands in which the frequency f fulfills the inequality "f[s]<f≦f[k]" may be varied (where f[s]<f[k]<f[n]). In other words, the threshold values Th[k+1] to Th[n] may be kept at fixed values irrespective of the result of wind noise checking for the low band.

It is also possible to vary the threshold value for a sub-band of interest based on whether or not there is wind noise in the low-frequency-side sub-band adjacent to it. Specifically, in the setting of the threshold value for the x-th sub-band, whether or not there is wind noise in the (x−1)-th sub-band is taken into consideration. If it is judged that there is wind noise in the (x−1)-th sub-band, the threshold value for the x-th sub-band is set at a value larger by ΔTh than a predetermined fixed value; if it is judged that there is no wind noise in the (x−1)-th sub-band, the threshold value for the x-th sub-band is set at a value smaller by ΔTh than a predetermined fixed value.

It is also possible to calculate, for each of the sub-bands belonging to the low band, the absolute value of the difference between the correlation value and the threshold value, and set the variance from a fixed value based on the average of the absolute values thus calculated one for each of the sub-bands, namely based on the average of |Kav[1]−Th[1]| to |Kav[s]−Th[s]|. Here, the variance is that of the threshold value for a sub-band not belonging to the low band. Specifically, for example, the variance from a predetermined fixed value is increased such that, the larger the average, the larger the threshold values Th[s+1] to Th[k]. It is also possible to set the variance from a fixed value based on the above-mentioned number Nf. Specifically, for example, the variance from a predetermined fixed value is increased such that, the larger the number Nf, the larger the threshold values Th[s+1] to Th[k].

It is also possible to calculate, for each of the sub-bands belonging to the low band, the difference between the threshold value and the correlation value, and set the variance from a fixed value based on the average of the differences thus calculated one for each of the sub-bands, namely based on the average of (Th[1]−Kav[1]) to (Th[s]−Kav[s]). Here, the variance is that of the threshold value for a sub-band not belonging to the low band. In this way, it is possible to vary the threshold value both in the increasing and decreasing directions. Specifically, when it is judged that there is wind noise in the low band, the above-mentioned average is positive, in which case the threshold value for a sub-band not belonging to the low band is increased; by contrast, if it is judged that there is no wind noise in the low band, the above-mentioned average is negative, in which case the threshold value for a sub-band not belonging to the low band is decreased.

It is also possible, as described in connection with Example 7, to vary the threshold values Th[1] to Th[n] for the current frame based on the result of wind noise checking in the previous frame, then perform wind noise checking in the low band with respect to the current frame, and then vary, based on the result of this checking, the threshold value of a band not belonging to the low band in the current frame. Also in Example 8, the threshold values Th[1] to Th[n] are variable from one frame to another; thus it is preferable, as described in connection with Example 7, to set, for those threshold values, the upper limit values Thmax[1] to Thmax[n] (for example, 0.9) and the lower limit values Thmin[1] to Thmin[n] (for example, 0.5).

In Examples 6 to 8 described above, the threshold values Th[1] to Th[n] are each set, and the wind noise checkers 502_1 to 502_*n* each check the presence of wind noise. In the high band, where the effect of wind noise is small, the checking of the presence of wind noise may be omitted. To achieve this, for example, preferably, the threshold value Th[x] for a sub-band belonging to the high band is set at 0. This makes the wind noise checker 502_*x* that receives the L and R signals in a sub-band belonging to the high band to always yield a check result indicating that there is no wind noise. Alternatively, it is possible to omit the wind noise checker 502_*x* that receives the L and R signals in a sub-band belonging to the high band and set the attenuation control value α[x] for that sub-band always on the assumption that there is no effect of wind noise.

In the examples described above, correlation values are calculated one for each of unit intervals (or frames) and, based on those correlation values, the degree of effect of wind noise or the presence of wind noise for the corresponding unit intervals (or frames) is checked. It is also possible to check the degree of effect of wind noise or the presence of wind noise in a unit interval (or frame) of interest with consideration also given to the correlation values calculated for the unit interval (or frame) before or after the unit interval (or frame) of interest and/or the result of the check of the degree of effect of wind noise or the presence of wind noise for the unit interval (or frame) before or after the unit interval (or frame) of interest.

Example 9

Figure 19:
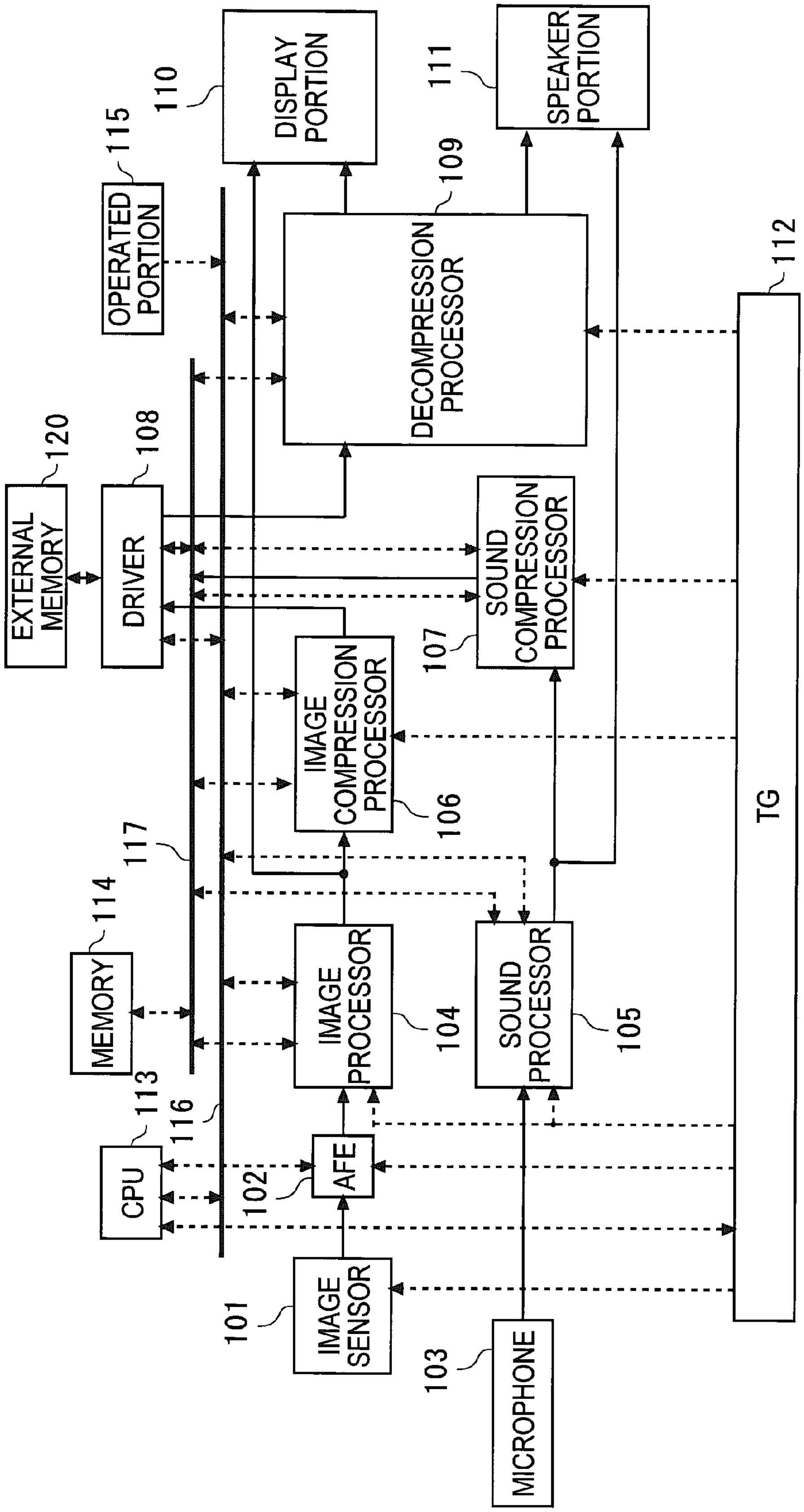
FIG. 19 is a block diagram showing the internal configuration of an image-sensing apparatus according to the second embodiment of the invention.

Next, Example 9 will be described. In Example 9, a description will be given of the configuration and operation of an electronic appliance to which the wind noise reduction device described above is applied. The electronic appliance is, for example, an image-sensing apparatus or sound-recording apparatus capable of recording a sound signal, or a sound-reproducing apparatus capable of reproducing a sound signal. As an example of the electronic appliance, the following description deals with an image-sensing apparatus. The image-sensing apparatus is, for example, a digital video camera capable of shooting and recording moving images and still images and of recording sound signals. FIG. 19 is a block diagram of the image-sensing apparatus of Example 9.

As shown in FIG. 19, the image-sensing apparatus of Example 9 comprises: an image sensor (solid-state image sensing device) 101, such as a CCD (charge-coupled device) or CMOS (complementary metal oxide semiconductor) sensor, that converts the light incident from the subject into an electrical signal; an AFE (analog front-end) 102 that converts the analog image signal output from the image sensor 101 into a digital image signal; a stereo microphone 103 that converts the sound input from outside into an electrical signal; an image processor 104 that performs various kinds of image processing including super-resolution processing on the digital image signal from the AFE 102; a sound processor 105 that converts the analog L and R signals from the stereo microphone 103 into digital L and R signals; an image compression processor 106 that performs on the image signal from the image processor 104 compression/encoding processing conforming to MPEG (Moving Picture Experts Group) or JPEG (Joint Photographic Experts Group); a sound compression processor 107 that performs on the L and R signals from the sound processor 105 audio compression/encoding processing conforming to AAC (Advance Audio Coding) or the like; and a driver 108 that records the compressed/encoded signals compressed/encoded by the image compression processor 106 and the sound compression processor 107 to an external memory 120.

The image-sensing apparatus of FIG. 19 also comprises: a decompression processor 109 that decompresses and thereby decodes the compressed/encoded signals read out from the external memory 120 by the driver 108; a display portion 110 that displays the image based on the image signal obtained through the decoding by the decompression processor 109 or based on the image signal from the image processor 104; and a speaker portion 111 that converts into analog sound signals and outputs for playback the L and R signals obtained through the decoding by the decompression processor 109 or the L and R signals from the sound processor 105.

The image-sensing apparatus of FIG. 19 further comprises: a timing generator 112 that outputs timing control signals for coordinating the operation timing of different functional blocks; a CPU (central processing unit) 113 that controls the driving and operation of the entire image-sensing apparatus; a memory 114 that stores different programs for different operations, and temporarily stores data during the execution of programs; an operated portion 115 that the user operates to enter commands; a bus 116 across which data is exchanged between the CPU 113 and different functional blocks; and a bus 117 across which data is exchanged between the memory 114 and different functional blocks.

In this image-sensing apparatus, when a command to perform the operation to shoot a moving image is entered on the operated portion 115, an analog image signal obtained through the photoelectric conversion operation by the image sensor 101 is output to the AFE 102. Here, fed with timing control signals from the timing generator 112, the image sensor 101 performs horizontal and vertical scanning and outputs an image signal containing pixel-by-pixel data.

The AFE 102 converts the analog image signal into a digital image signal, which is fed to the image processor 104, which then performs various kinds of image processing including signal conversion processing for generating luminance and color-difference signals. The image signal having undergone the image processing by the image processor 104 is fed to the image compression processor 106, where it is compressed/encoded by a method conforming to MPEG compression.

The stereo microphone 103 outputs L and R signals, which are analog signals obtained as a result of sounds being input from the left and right sides. The L and R signals from the stereo microphone 103 are converted into digital signals in the sound processor 105, and are then fed to the sound compression processor 107, which then compresses and encodes the digitalized L and R signals by a method conforming to audio compression/encoding.

When the compressed/encoded image and sound signals are fed from the image compression processor 106 and the sound compression processor 107 to the driver 108, they are recorded to the external memory 120. Now an image signal having undergone the image processing by the image processor 104 is fed to the display portion 110, so that the image of the subject currently being shot by the image sensor 101 is displayed as a so-called preview image.

By contrast, when a command to shoot a still image is entered, as distinct from when a command to shoot a moving image is entered, a compressed signal containing an image signal alone is obtained in the image compression processor 106 by a compression/encoding method such as one conforming to JPEG, and is recorded to the external memory 120. The other basic operations are the same as those performed for the shooting of a moving image. When a still image is shot, not only is a compressed signal corresponding to the still image shot recorded to the external memory 120 according to a command entered on the operated portion 115, an image signal obtained through the image processing by the image processor 104 is fed to the display portion 110. This causes the image of the subject currently being shot by the image sensor 101 to be displayed as a so-called preview image.

When the operation for shooting a still or moving image is performed as described above, the timing generator 112 feeds timing control signals to the AFE 102, the image processor 104, the sound processor 105, the image compression processor 106, and the sound compression processor 107, so that these operate in synchronism with the frame-by-frame shooting operation by the image sensor 101 (it should be noted that "frames" in the shooting operation differ in concept from the "frames" described previously as being defined for sound signals). Moreover, when a still image is shot, based on the shutter release operation by the operated portion 115, the timing generator 112 feeds timing control signals to the image sensor 101, the AFE 102, the image processor 104, and the image compression processor 106 to coordinate the operation timing of these.

When a command to reproduce a moving or still image recorded in the external memory 120 is entered on the operated portion 115, compressed signals recorded in the external memory 120 are read out by the driver 108 and are fed to the decompression processor 109. When a moving image is reproduced, the decompression processor 109 decompresses/decodes the compressed signals by methods conforming to MPEG compression/encoding and audio compression/encoding to obtain the image and sound signals. The image signal is fed to the display portion 110 to reproduce the image, and the L and R signals are fed to the speaker portion 111 to reproduce the sounds. In this way, a moving image and sounds based on compressed signals recorded in the external memory 120 are reproduced.

By contrast, when a still image is reproduced, the decompression processor 109 performs decompression/decoding, by a method conforming to JPEG compression/encoding, on the signal read out from the external memory 120 by the driver 108 to obtain the image signal. This image signal is then fed to the display portion 110 to reproduce the image. In this way, a still image based on a compressed signal recorded in the external memory 120 is reproduced.

Figure 20:
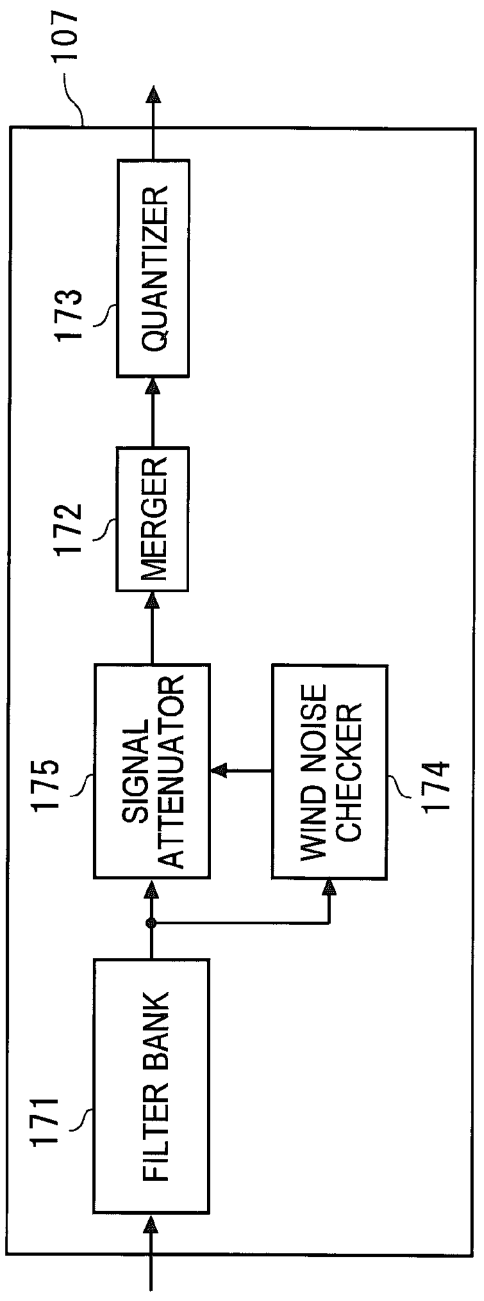
FIG. 20 is a block diagram showing the internal configuration of a sound compression processor applicable to the image-sensing apparatus of FIG. 19.

In this image-sensing apparatus, the sound compression processor 107 is furnished with a wind noise reduction function. FIG. 20 is a configuration block diagram of the sound compression processor 107 furnished with a wind noise reduction function. As shown in FIG. 20, the sound compression processor 107 comprises: a filter bank 171 that converts the L and R signals from the sound processor 105 from time-axial signals into frequency-axial signals respectively; a merger 172 that merges together the L and R signals converted into frequency-axial signals by the filter bank 171 so as to arrange them chronologically; and a quantizer 173 that quantizes the L and R signals merged together by the merger 172.

The sound compression processor 107 further comprises: a wind noise checker 174 that subdivides the entire band in which the frequency-axial L and R signals from the filter bank 171 lie into a plurality of sub-bands and that checks, for each of the sub-bands, whether or not there is wind noise; and a signal attenuator 175 that, for each of the sub-bands, attenuates the L and R signals from the filter bank 171 according to the result of the check by the wind noise checker 174 and that outputs the attenuated L and R signals to the merger 172.

The wind noise checker 174 is built with the wind noise checkers 502_1 to **502_*n* in FIG. 14, and the signal attenuator 175 is built with the signal attenuators 503L_1 to 503L_n and 503R_1 to 503R_n in FIG. 14. In this way, by adding the wind noise checker 174 and the signal attenuator 175 that perform the operations described above (including those described in connection with Examples 6 to 8) to the portions conventionally required, namely the filter bank 171, the merger 172, and the quantizer 173, it is possible to furnish the sound compression processor 107** additionally with a wind noise reduction function. That is, a wind noise reduction function can be easily added to a conventional configuration, proving to be highly practical.

In a case where the sound compression processor 107 configured as shown in FIG. 20 is incorporated in an image-sensing apparatus, when the L and R signals acquired by the stereo microphone 103 are stored in the external memory 120, they can be stored in the form of compressed L and R signals with wind noise reduced. Moreover, after these compressed signals obtained by the sound compression processor 107 are stored in the external memory 120, by decompressing them in the decompression processor 109 and then outputting them from the speaker portion 111, it is possible to output, for playback, sounds having wind noise reduced.

Figure 21:
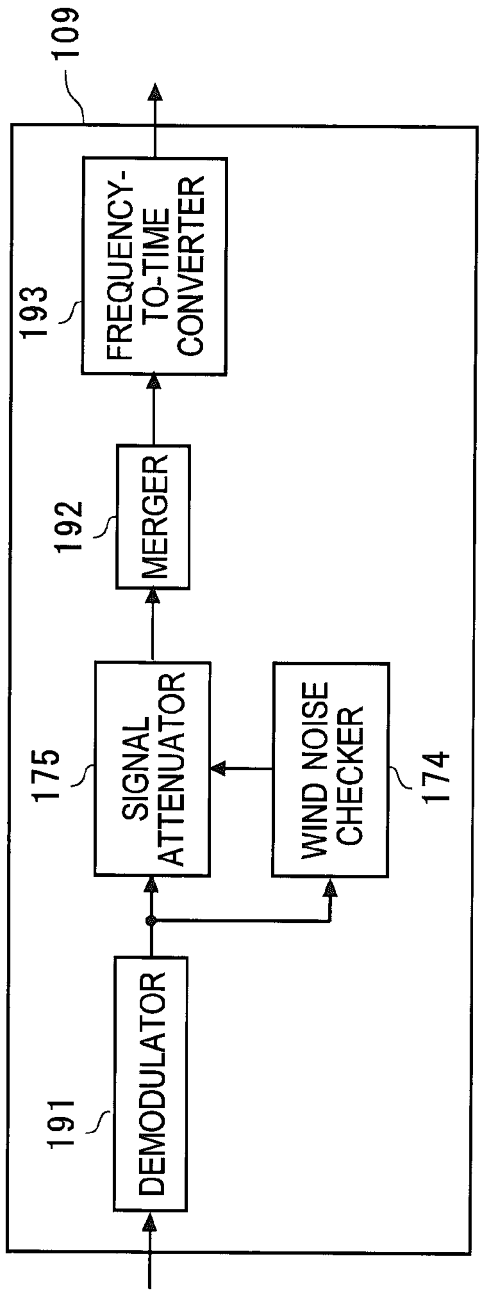
FIG. 21 is a block diagram showing the internal configuration of a decompression processor applicable to the image-sensing apparatus of FIG. 19.
Figure 22:
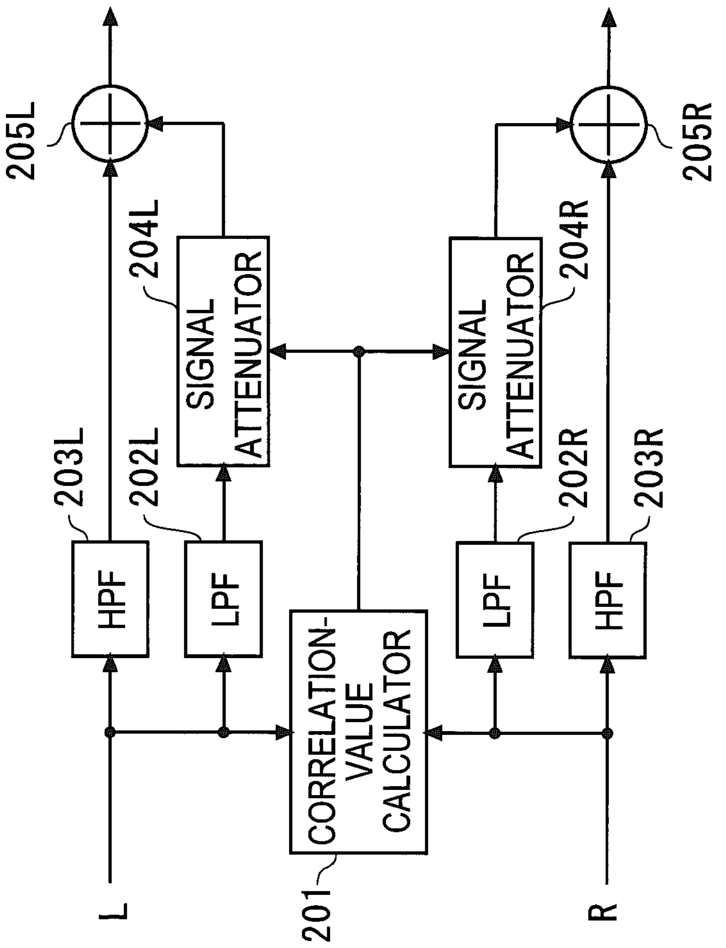
FIG.22 PRIOR ART
FIG. 22 is a block diagram showing the internal configuration of a conventional wind noise reduction device.
Figure 23A:
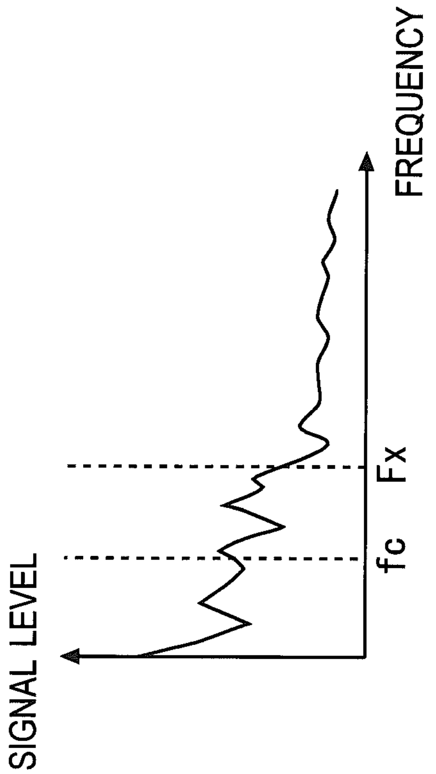
FIG.23A PRIOR ART
FIGS. 23A and 23B are diagrams illustrating the wind noise reduction processing performed by the wind noise reduction device of FIG. 22.
Figure 23B:
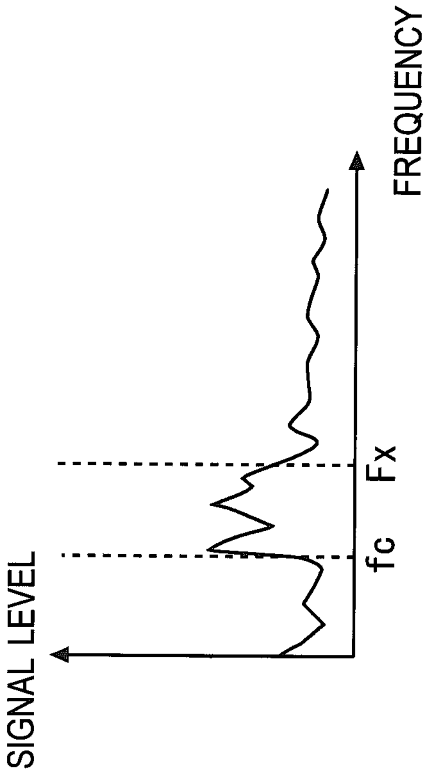
FIG.23B PRIOR ART

The above description deals with an example in which the sound compression processor 107 is furnished with a wind noise reduction function. Instead of the sound compression processor 107, the decompression processor 109 may be furnished with a wind noise reduction function. Specifically, as shown in FIG. 21, the decompression processor 109, comprising a demodulator 191, a merger 192, and a frequency-to-time converter 193, may be additionally provided with the wind noise checker 174 and the signal attenuator 175. In this case, the wind noise checker 174 and the signal attenuator 175 are arranged at the stage succeeding the demodulator 191. The demodulator 191 decodes compressed signals, such as those treated by Huffman coding or the like, and then demodulates them to acquire frequency-axial L and R signals.

In this case, in the signal attenuator 175 in the decompression processor 109, wind noise reduction is performed on the frequency-axial L and R signals for each of the sub-bands, and the L and R signals having undergone the reduction processing are fed to the merger 192, which produces L and R signals having individual frequency-axial signals arranged chronologically. The thus obtained L and R signals are fed to the frequency-to-time converter 193, where they are converted into time-axial signals and are output to the speaker portion 111.

In this way, by adding the wind noise checker 174 and the signal attenuator 175 that perform the operations described above (including those described in connection with Examples 6 to 8) to the portions conventionally required, namely the demodulator 191, the merger 192, and the frequency-to-time converter 193, it is possible to furnish the decompression processor 109 additionally with a wind noise reduction function. That is, a wind noise reduction function can be easily added to a conventional configuration, proving to be highly practical. In a case where the decompression processor 109 configured as shown in FIG. 21 is incorporated in an image-sensing apparatus, when sound signals based on compressed signals recorded in the external memory 120 are output for playback, even if the recorded compressed signals are L and R signals containing wind noise, it is possible, when the decompression processor 109 performs decompression, to reduce the wind noise.

When an image-sensing apparatus is configured as in Example 9, compression/encoding or decompression/decoding involves division into frequency bands conforming to audio compression/encoding. Preferably, the unit for this division is equal to the unit described heretofore for subdividing the entire range of sound signals into the 1st to n-th sub-bands. This permits the necessary calculation processing to be performed efficiently, and thus allows implementation with a small amount of processing.

Although the above description deals with, as an example, an apparatus capable of both recording and reproducing sounds, like the image-sensing apparatus configured as shown FIG. 19, it is also possible to form an electronic appliance capable of either recording or reproducing sounds. In that case, the electronic appliance can be called a recording apparatus or reproducing apparatus. A recording apparatus as an electronic appliance comprises, of the functional blocks shown in FIG. 19, at least those for the recording of sound signals, and in addition comprises the sound compression processor configured as shown in FIG. 20. A reproducing apparatus as an electronic appliance comprises, of the functional blocks shown in FIG. 19, at least those for the reproduction of sound signals, and in addition comprises the decompression processor (sound decompression processor) configured as shown in FIG. 21.

Although Example 9 deals with an image-sensing apparatus to describe how the present invention is applied to an electronic appliance, the invention can be applied not only to image-sensing apparatuses but to any electronic appliances capable of recording and/or reproducing sounds. Electronic appliances to which the invention is applicable include: IC recorders; cellular phones; electronic appliances capable of recording sound signals to a recording medium such as an optical disc, magnetic disk, memory, or the like; and electronic appliances capable of reproducing sound signals read out from such a recording medium.

What is claimed is:

1. A wind noise reduction device for reducing wind noise contained in an input sound signal by utilizing a sound signal lying in a first band and a sound signal lying in a second band which is higher in frequency than the first band, comprises:

a first corrector, which generates a first corrected sound signal based on a first sound signal, comprising:

a signal generator which generates the first sound signal lying in the first band based on a second sound signal which lies in the second band and is contained in the input sound signal, wherein the first sound signal is different from a third sound signal which lies in the first band and is contained in the input sound signal;

a second corrector which generates a second corrected sound signal, lying in the second band, by reducing a signal level of a forth sound signal which lies in the second band and is contained in the input sound signal; and a corrected sound signal outputter which outputs a corrected sound signal based on the first corrected sound signal and second corrected sound signal.

2. The wind noise reduction device according to claim 1, wherein the first corrector generates the first corrected sound signal further based on the third sound signal.

3. The wind noise reduction device according to claim 1, wherein the input sound signal is composed of a plurality of channel signals, the wind noise reduction device further comprises:

a wind noise checker which checks a degree of effect of the wind noise on the input sound signal based on cross-correlation, between different channels, among components of the channel signals in a predetermined band including the band of the wind noise, and the first corrector generates the first corrected sound signal further based on a result of the checking by the wind noise checker.

4. The wind noise reduction device according to claim 1, wherein the input sound signal is composed of a plurality of channel signals, the wind noise reduction device further comprises:

a wind noise checker which checks a degree of effect of the wind noise on the input sound signal based on cross-correlation, between different channels, among components of the channel signals in a predetermined band including the band of the wind noise, and the second corrector generates the second corrected sound signal further based on a result of the checking by the wind noise checker.

5. The wind noise reduction device according to claim 1, wherein the input sound signal is fed as a signal on a frequency axis to the wind noise reduction device, and is composed of a plurality of channel signals, and the second corrector divides the second band of the input sound signal into a plurality of sub-bands to generate the second corrected sound signal on the frequency axis by reducing signal levels of a plurality of sound signals in the plurality of sub-bands, and finds, for each of the plurality of sub-bands, cross-correlation, between different channel signals, among the plurality of sound signals in the plurality of sub-bands to determine, for each of the plurality of sub-bands, the degree of reduction of the signal levels based on the cross-correlation.

6. The wind noise reduction device according to claim 1, wherein the input sound signal is fed as a signal on a time axis to the wind noise reduction device, and is composed of a plurality of channel signals, the first corrected sound signal generated by the first corrector is a signal on the time axis, the wind noise reduction device further comprises:

an extractor which extracts, from the input sound signal, components in a predetermined band not including the first band but including the second band; and a time-to-frequency converter which converts, from the time axis to the frequency axis, a signal format of a composite signal of the first corrected sound signal and a signal extracted by the extractor, the second corrector generates the second corrected sound signal on the frequency axis by reducing a signal level of a sound signal in the second band in the composite signal on the frequency axis, and the corrected sound signal outputter outputs the corrected sound signal on the frequency axis based on the second corrected sound signal on the frequency axis obtained from the second corrector and a sound signal containing the first corrected sound signal on the frequency axis obtained from the time-to-frequency converter.

7. The wind noise reduction device according to claim 6, wherein the second corrector divides the second band of the composite signal on the frequency axis into a plurality of sub-bands to generate the second corrected sound signal on the frequency axis by reducing signal levels of a plurality of sound signals in the plurality of sub-bands, and finds, for each of the plurality of sub-bands, cross-correlation, between different channel signals, among the plurality of sound signals in the plurality of sub-bands to determine, for each of the plurality of sub-bands, the degree of reduction of the signal levels based on the cross-correlation.

8. The wind noise reduction device according to claim 1, wherein the input sound signal is composed of a plurality of channel signals, and the second corrector takes as a band of interest the entire second band or part thereof, averages sound signals in the band of interest contained in the input sound signal corresponding to the plurality of channel signals to thereby reduce a signal level of a sound signal in the band of interest in a channel being affected relatively much by the wind noise, and generates the second corrected sound signal from a signal resulting from the averaging.

9. The wind noise reduction device according to claim 1, wherein the input sound signal is composed of a plurality of channel signals, and the second corrector takes as a band of interest the entire second band or part thereof, identifies, of sound signals in the band of interest contained in the input sound signal corresponding to the plurality of channel signals, a sound signal having a lowest signal level as a minimum sound signal and another signal as a non-minimum sound signal, replaces the non-minimum sound signal with the minimum sound signal to thereby reduce a signal level of a sound signal in the band of interest in a channel being affected relatively much by the wind noise, and generates the second corrected sound signal from a signal resulting from the replacement.

10. A sound-recording apparatus comprising:

the wind noise reduction device according to claim 1; and a microphone which generates the input sound signal to the wind noise reduction device.

11. An image-sensing apparatus comprising:

the wind noise reduction device according to claim 1;

a microphone which generates the input sound signal to the wind noise reduction device; and an image-sensing section which acquires an image.

12. A wind noise reduction device which receives an input sound signal composed of a plurality of channel signals acquired by a plurality of microphones, and which reduces wind noise contained in the input sound signal, the wind noise reduction device comprising:

a wind noise checker which divides a predetermined band included in an entire frequency band of the input sound signal into n sub-bands (where n is an integer of 2 or more), and which calculates, for each sub-band, a correlation value indicating cross-correlation between the plurality of channel signals to thereby check, for each sub band, presence of wind noise; and a signal attenuator which attenuates, of the input sound signal, only a sound signal in a sub-band where wind noise is judged to be present by the wind noise checker, wherein for each sub-band, the correlation value is so calculated as to be smaller the lower the cross-correlation between the plurality of channel signals, and the wind noise checker has a threshold value set for each sub-band, compares, for each sub-band, the correlation value with the threshold value, and when the correlation value is smaller than the threshold value in a sub-band of interest, judges that wind noise is present in the sub-band of interest.

13. An electronic appliance which receives an input sound signal composed of a plurality of channel signals acquired by a plurality of microphones, and which records or reproduces a sound signal based on the input sound signal, the electronic appliance comprising:

a wind noise reduction device which divides a predetermined band included in an entire frequency band of the input sound signal as expressed on a frequency axis into n sub-bands (where n is an integer of 2 or more), and performs wind noise reduction processing for each sub-band, wherein the wind noise reduction device according to claim 12 is used as the wind noise reduction device.

14. The wind noise reduction device according to claim 12, wherein a degree of attenuation by the signal attenuator for each sub-band is determined by an attenuation control value set for each sub-band, and for each sub-band, the attenuation control value varies according to the correlation value.

15. The wind noise reduction device according to claim 12, wherein a degree of attenuation by the signal attenuator for each sub-band is determined by an attenuation control value set for each sub-band, and for each sub-band, the signal attenuator attenuates an attenuation target sound signal through exponential calculation using the corresponding attenuation control value as an exponent of exponential calculation.

16. The wind noise reduction device according to claim 12, wherein a degree of attenuation by the signal attenuator for each sub-band is determined by an attenuation control value set for each sub-band, and for each sub-band, the signal attenuator attenuates an attenuation target sound signal through multiplication using the corresponding attenuation control value as a factor of multiplication.

17. The wind noise reduction device according to claim 12, wherein the lower a frequency of a sub-band, the larger the corresponding threshold value is set and, the higher a frequency of a sub-band, the smaller the corresponding threshold value is set.

18. The wind noise reduction device according to claim 12, wherein the input sound signal is divided in a time direction every predetermined length of time into frames serving as unit intervals, and presence of wind noise is checked for each frame, and for each sub-band, the wind noise checker varies the corresponding threshold value in a frame of interest based on a result of checking of presence of wind noise in a frame preceding the frame of interest.

19. The wind noise reduction device according to claim 12, wherein the n sub-bands include a first sub-band and a second sub-band different from each other, and frequencies belonging to the second sub-band are higher than frequencies belonging to the first sub-band, and the wind noise checker varies the threshold value for the second sub-band based on a result of checking of presence of wind noise for the first sub-band.

* * * * *